(12) United States Patent
Shah et al.

(10) Patent No.: US 11,053,329 B2
(45) Date of Patent: Jul. 6, 2021

(54) MULTIPLE NON-COORDINATING ANION ACTIVATORS FOR PROPYLENE-ETHYLENE-DIENE MONOMER POLYMERIZATION REACTIONS

(71) Applicant: ExxonMobil Chemical Patents Inc., Baytown, TX (US)

(72) Inventors: Rhutesh K. Shah, Katy, TX (US); Jo Ann M. Canich, Houston, TX (US); Edward J. Blok, Huffman, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 79 days.

(21) Appl. No.: 16/356,826

(22) Filed: Mar. 18, 2019

(65) Prior Publication Data

US 2019/0284319 A1 Sep. 19, 2019

Related U.S. Application Data

(60) Provisional application No. 62/644,971, filed on Mar. 19, 2018.

(51) Int. Cl.
| | |
|---|---|
| *C08F 4/6592* | (2006.01) |
| *C08F 236/20* | (2006.01) |
| *C08F 4/643* | (2006.01) |
| *C08F 4/659* | (2006.01) |
| *C08F 4/649* | (2006.01) |
| *C08F 2/38* | (2006.01) |
| *C08F 210/18* | (2006.01) |
| *C08F 210/16* | (2006.01) |
| *C08J 3/24* | (2006.01) |
| *C09J 123/16* | (2006.01) |
| *B60C 1/00* | (2006.01) |
| *C08L 23/16* | (2006.01) |

(52) U.S. Cl.
CPC ........... *C08F 4/6592* (2013.01); *C08F 2/38* (2013.01); *C08F 4/6495* (2013.01); *C08F 4/65908* (2013.01); *C08F 4/65912* (2013.01); *C08F 210/16* (2013.01); *C08F 210/18* (2013.01); *C08F 236/20* (2013.01); *C08J 3/24* (2013.01); *C09J 123/16* (2013.01); *B60C 1/00* (2013.01); *B60C 1/0016* (2013.01); *C08F 2420/01* (2013.01); *C08F 2420/02* (2013.01); *C08F 2500/16* (2013.01); *C08F 2800/10* (2013.01); *C08F 2810/20* (2013.01); *C08L 23/16* (2013.01)

(58) Field of Classification Search
CPC ............................. C08F 4/6592; C08F 236/20
See application file for complete search history.

(56) References Cited

U.S. PATENT DOCUMENTS

| | | | |
|---|---|---|---|
| 9,382,361 B2 | 7/2016 | Yoon | |
| 9,458,254 B2 | 10/2016 | Canich et al. | |
| 9,796,795 B2 | 10/2017 | Canich et al. | |
| 9,803,037 B1 | 11/2017 | Canich et al. | |
| 2001/0014725 A1 | 8/2001 | Becke et al. | ............ C07C 17/23 |
| 2007/0015657 A1 | 1/2007 | Rieger et al. | ......... C08F 110/06 |
| 2012/0316302 A1 | 12/2012 | Stewart | ................ C08F 210/16 |
| 2017/0292013 A1 | 10/2017 | Blok et al. | |
| 2017/0342175 A1 | 11/2017 | Hagadorn et al. | |
| 2018/0094088 A1 | 4/2018 | Crowther et al. | |
| 2018/0171040 A1 | 6/2018 | Ye et al. | |
| 2019/0284311 A1 | 9/2019 | Canich et al. | ........ C08F 4/6592 |
| 2019/0284318 A1 | 9/2019 | Canich et al. | ........ C08F 4/6592 |

FOREIGN PATENT DOCUMENTS

| | | |
|---|---|---|
| WO | 2016/053541 | 4/2016 |
| WO | 2016/053542 | 4/2016 |
| WO | 2017/204830 | 11/2017 |

OTHER PUBLICATIONS

U.S. Appl. No. 16/192,493, filed Nov. 15, 2018.
U.S. Appl. No. 16/182,856, filed Nov. 7, 2018.
U.S. Appl. No. 16/153,256, filed Oct. 5, 2018.

*Primary Examiner* — Caixia Lu

(57) ABSTRACT

This invention relates to production of propylene-predominant copolymers using a transition metal complex and at least two different non-coordinating anion activators. An olefinic feed comprising a $C_3$-$C_{40}$ alpha olefin, ethylene, and a diene monomer is contacted under polymerization reaction conditions with a catalyst system comprising a first non-coordinating anion activator, a second non-coordinating borate activator differing from the first non-coordinating anion activator, and a transition metal complex comprising a tetrahydro-s-indacenyl or tetrahydro-as-indacenyl group bound to a group 3-6 transition metal. A molar ratio of the first non-coordinating anion activator to the second non-coordinating anion activator is sufficient to produce a melt flow rate under the polymerization reaction conditions for the resulting copolymer of about 30 g/10 min or below as determined by ASTM D-1238 (230° C., 2.16 kg).

58 Claims, 2 Drawing Sheets

MULTIPLE NON-COORDINATING ANION ACTIVATORS FOR PROPYLENE-ETHYLENE-DIENE MONOMER POLYMERIZATION REACTIONS

PRIORITY

This application claims priority to and the benefit of U.S. Ser. No. 62/644,971, filed Mar. 19, 2018, is incorporated by reference in its entirety.

CROSS REFERENCE TO RELATED APPLICATIONS

This invention relates to U.S. Ser. No. 16/356,588, filed concurrently herewith, entitled "Processes for Producing High Propylene Content PEDM Using Tetrahydroindacenyl Catalyst Systems", which claims priority to and the benefit of U.S. Provisional Patent Application 62/644,971, filed Mar. 19, 2018. This invention also relates to U.S. Ser. No. 16/356,772, filed concurrently herewith, entitled "Processes for Producing High Propylene Content PEDM Having Low Glass Transition Temperatures Using Tetrahydroindacenyl Catalyst Systems", which claims priority to and the benefit of U.S. Provisional Patent Application 62/644,971, filed Mar. 19, 2018.

FIELD

This invention relates to propylene-ethylene-diene monomer copolymers prepared using a catalyst system comprising at least two activators and a transition metal complex comprising an indacenyl ligand.

BACKGROUND

A number of catalysts have been developed for synthesizing polyolefins. The choice of catalyst may allow tailoring of various polyolefin properties, such as molecular weight, branching, tacticity, crystallinity, melt index, and similar features. Both metallocene and non-metallocene transition metal complexes have been used as olefin polymerization catalysts, depending upon the particular polyolefin properties being targeted. Activators such as alumoxanes and non-coordinating anion activators are commonly used as co-catalysts in conjunction with both types of transition metal complexes.

The transition metal complex chosen to promote polymerization of a given olefinic feed may be selected such that a high level of catalytic activity occurs or a desired molecular weight is obtained, for example. Olefins may react at diverse rates and with different productivities when combined with various transition metal complexes, which may be a consequence of both the structure of the olefin and the active site(s) of the catalytic transition metal complex. For instance, some transition metal complexes may have an active site that is more satisfactory for polymerizing ethylene while others may be more suitable for polymerizing propylene.

Propylene-ethylene-diene monomer copolymers (PEDM) feature propylene as a predominant monomer as compared to the molar amounts of ethylene and diene monomers that are present. In contrast, ethylene-propylene-diene monomer copolymers (EPDM) typically have ethylene as the predominant monomer, by mol. %.

US 2017/0292013, at paragraphs [0100] to [0103], discloses PEDM polymers produced using [cyclopentadienyl (2,7-di-t-butylfluorenyl)di-p-trieihylsilanephenyimethane] hafnium dimethyl [(p-Me$_3$Si-Ph)$_2$-C—(Cp)(2,7-di-tBu-9-Flu)HfMe$_2$] combined with N,N-dimethylanilinium tetrakis (pentafluorophenyl)borate ([Me$_2$NH]+[(F$_5$Ph)$_4$B]$^-$).

U.S. Pat. No. 9,382,361 discloses production of EPDM using two separate catalyst system feeds of (p-Me$_3$Si-Ph)$_2$-C—(Cp)(2,7-di-tBu-9-Flu)HfMe$_2$/([Me$_2$NH]$^+$[(F$_5$Ph)$_4$B]$^-$) and (p-Me$_3$Si-Ph)$_2$-C—(Cp)(2,7-di-tBu-9-Flu)HfMe$_2$/N,N-dimethylaniliniumtetrakis (perfluoronaphthyl)borate ([Me$_2$NH]$^+$[(F$_7$Naph)$_4$B]$^-$).

US 2018/0171040 discloses use of dual metallocene catalyst systems supported on fluorided silica treated with methylalumoxane to prepare ethylene polymers.

U.S. Pat. No. 9,382,361 and US 2017/0292013 disclose (p-Me$_3$Si-Ph)$_2$-C—(Cp)(2,7-di-tBu-9-Flu)HfMe$_2$ for use in production of ethylene polymers. Interestingly, when this transition metal complex is used to produce propylene polymers, the overall catalyst activity is low. This effect is thought to be related to the preference of this catalyst toward ethylene.

U.S. Pat. No. 9,796,795 discloses propylene polymers produced using mono-tetrahydroindacenyl complexes, such as dimethylsilyl (2,7,7-trimethylindacenyl)(t-butylamido) titaniumdimethyl (Me$_2$Si(t-BuN)(2,7,7-Me$_3$indacenyl) TiMe$_2$), activated with [Me$_2$NH]$^+$[(F$_7$Ph)$_4$B]$^-$.

U.S. Pat. No. 9,803,037 discloses tetrahydroindacenyl complexes activated with non-coordinating anion activators.

Additional references of interest include: U.S. Pat. No. 9,458,254; US 2018/0094088; WO 2017/204830; US 2017/0342175; U.S. Ser. No. 16/192,493, filed Nov. 15, 2018; U.S. Ser. No. 16/182,856, filed Nov. 7, 2018; and U.S. Ser. No. 16/153,256, filed Oct. 5, 2018.

For some catalyst systems, different non-coordinating anion activators may perform similarly during a given polymerization reaction. However, in many reactions the activators perform differently, leading to rapidly increasing costs if a more complex or higher molecular weight activator is needed. For example, [Me$_2$NH]$^+$[(F$_5$Ph)$_4$B]$^-$ is significantly lower in cost as compared to [Me$_2$NH]$^+$[(F$_7$Naph)$_4$B]$^-$ and is often selected for cost reasons. When [Me$_2$NH]$^+$[(F$_7$Naph)$_4$B]$^-$ is the activator of choice, not only is it often more expensive on a weight basis, but the higher molecular weight of [Me$_2$NH]$^+$[(F$_7$Naph)$_4$B]$^-$ means a larger mass of this activator needs to be present in a polymerization reaction to attain a desired activator loading on a molar basis than if a lower molecular weight activator had been used to obtain a catalytic effect.

Therefore, there is a need in the art to provide non-coordinating anion activator(s) that are both reasonably priced and functional for synthesizing a desired polymer product.

SUMMARY

This invention relates to polymerization methods for producing propylene-ethylene-diene monomer (PEDM) copolymers using a combination of two or more non-coordinating anion activators, particularly two or more borate non-coordinating anions.

This invention further relates to a method comprising:
1) contacting a catalyst system with an olefinic feed comprising a C$_3$-C$_{40}$ alpha olefin, ethylene, and a diene monomer under polymerization reaction conditions, wherein the C$_3$-C$_{40}$ alpha olefin is present in the olefinic feed at a molar excess relative to the combined molar amount of the ethylene and the diene monomer; and 2) obtaining a copolymer comprising 1 to 35 mol. % ethylene, 98.9 to 65 mol. % $C_3$-$C_{40}$ alpha olefin, and 0.1 to 10 mol. % diene monomer.

The catalyst system comprises a first non-coordinating anion activator, a second non-coordinating anion activator differing from the first non-coordinating anion activator, and a transition metal complex represented by the formula:

$$T_y Cp'_m MG_n X_q$$

wherein:

M is a group 3, 4, 5, or 6 transition metal;

Cp' is an optionally substituted tetrahydro-s-indacenyl or tetrahydro-as-indacenyl group;

G is a heteroatom containing group having a formula of $JR'_{z-y}$, wherein J is N, P, O or S, R' is a $C_1$ to $C_{100}$ optionally substituted hydrocarbyl, halocarbyl, silylcarbyl, or germylcarbyl group, and z is 2 when J is N or P, and z is 1 when J is O or S;

T is a bridging group extending between Cp' and J;

y is 0 or 1, indicating an absence (y=0) or a presence (y=1) of T;

each X is, independently, a leaving group, or two Xs are joined and bound to M to form a metallocycle ring, or two Xs are joined to form a chelating ligand, a diene ligand, or an alkylidene;

m=1;

n=1, 2 or 3; and q=1, 2 or 3;

wherein a sum of m+n+q is equal to the oxidation state of M (typically 3, 4, 5 or 6).

The molar ratio of the first non-coordinating anion activator to the second non-coordinating anion activator is preferably sufficient to produce a melt flow rate for the copolymer of about 30 g/10 min or below as determined by ASTM D-1238 (230° C., 2.16 kg).

This invention also relates to PEDM copolymers comprising 1 to 35 mol. % ethylene, 98.9 to 65 mol. % $C_3$-$C_{40}$ alpha olefin, and 0.1 to 10 mol. % diene monomer and having a melt flow rate of about 30 g/10 min or below as determined by ASTM D-1238 (230° C., 2.16 kg).

Without wishing to be bound by theory, it is believed that the foregoing catalyst systems comprising two different non-coordinating anion activators, particularly borate non-coordinating anion activators, interact synergistically with one another. Further, the melt flow rate of the copolymers produced herein preferably changes non-linearly as a function of the molar ratio of the first non-coordinating anion activator to the second non-coordinating anion activator.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, as will occur to one of ordinary skill in the art and having the benefit of this disclosure.

DETAILED DESCRIPTION

Figure 1:
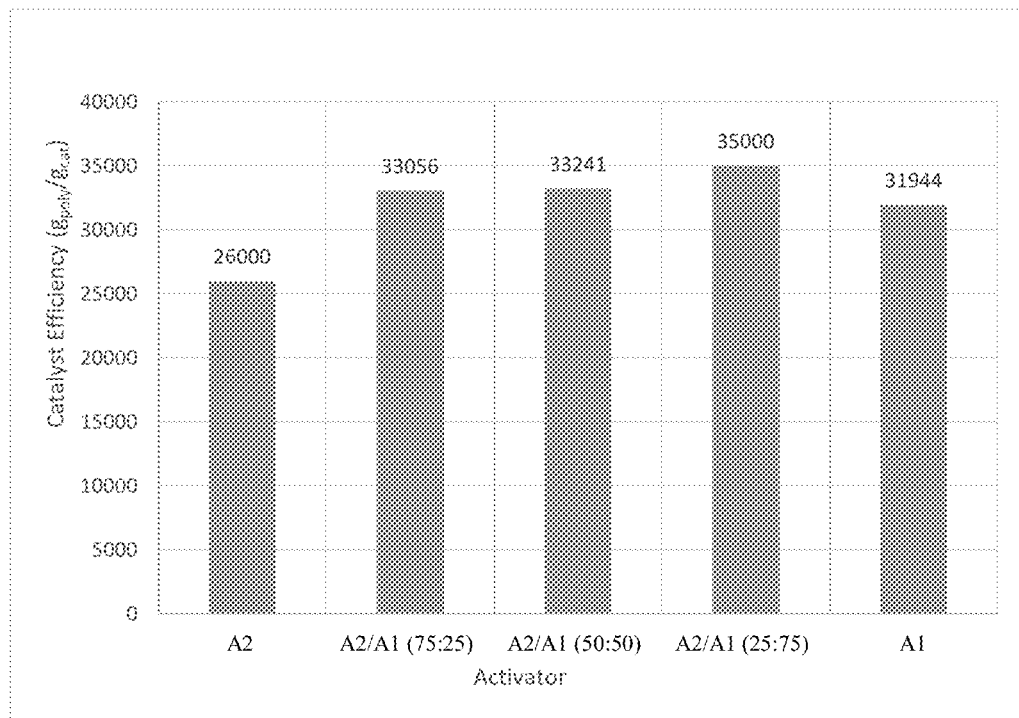
FIG. 1 shows a plot of catalytic efficiency in the presence of various amounts of Activator 1 ($[Me_2NH]^+[(F_5Ph)_4B]^-$) and Activator 2 ($[Me_2NH]^+[(F_7Naph)_4B]^-$) for Examples 1 through 5.

Unless otherwise indicated, room temperature is about 23° C.

For the purposes of the present disclosure, the new numbering scheme for groups of the Periodic Table is used. In said numbering scheme, the groups (columns) are numbered sequentially from left to right from 1 through 18, excluding the f-block elements (lanthanides and actinides). Under this scheme, the term "transition metal" refers to any atom from Groups 3-12 of the Periodic Table, inclusive of the lanthanides and actinide elements. Ti, Zr and Hf are group 4 transition metals, for example.

As used herein, Mn is number average molecular weight, Mw is weight average molecular weight, and Mz is z average molecular weight, wt. % is weight percent, and mol. % is mole percent. Molecular weight distribution (MWD), also referred to as polydispersity index (PDI), is defined to be Mw divided by Mn. Unless otherwise noted, all molecular weight units (e.g., Mw, Mn, and Mz) are in units of g/mol (g mol$^{-1}$).

For purposes of this disclosure, when a polymer or copolymer is referred to as comprising an olefin, the olefin present in such polymer or copolymer is the polymerized form of the olefin. For example, when a copolymer is said to have an "ethylene" content of 35 wt. % to 55 wt. %, it is to be understood that the mer unit in the copolymer is derived from ethylene in the polymerization reaction and said derived units are present at 35 wt. % to 55 wt. %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different," as used to refer to mer units, indicates that the mer units differ from each other by at least one atom or are different isomerically. Accordingly, the definition of copolymer, as used herein, includes terpolymers and the like. An "ethylene polymer" or "ethylene copolymer" is a polymer or copolymer comprising at least 50 mol. % ethylene derived units, a "propylene polymer" or "propylene copolymer" is a polymer or copolymer comprising at least 50 mol. % propylene derived units, and so on. Such "ethylene polymers" or "ethylene copolymer" may be referred to herein as being "ethylene-predominant," and such "propylene polymers" or "propylene copolymers" may be referred to herein as being "propylene-predominant," and so on.

As used in the present disclosure, Me is methyl, Et is ethyl, Pr is propyl, cPr is cyclopropyl, nPr is n-propyl, iPr is isopropyl, Bu is butyl, nBu is n-butyl, iBu is isobutyl, sBu is sec-butyl, tBu is tert-butyl, Cy is cyclohexyl, Oct is octyl, Ph is phenyl, Naph is naphthyl, and Bn is benzyl.

The terms "group," "radical," and "substituent" may be used interchangeably.

The term "hydrocarbon" refers to a class of compounds having hydrogen bound to carbon, and encompasses (i) saturated hydrocarbon compounds, (ii) unsaturated hydrocarbon compounds, and (iii) mixtures of hydrocarbon compounds (saturated and/or unsaturated), including mixtures of hydrocarbon compounds having different numbers of carbon atoms. The term "$C_n$," refers to hydrocarbon(s) or a hydrocarbyl group having n carbon atom(s) per molecule or group, wherein n is a positive integer. Such hydrocarbon compounds may be one or more of linear, branched, cyclic, acyclic, saturated, unsaturated, aliphatic, or aromatic.

The terms "hydrocarbyl radical," "hydrocarbyl group," or "hydrocarbyl" may be used interchangeably and are defined to mean a group consisting of hydrogen and carbon atoms only and bearing at least one unfilled valence position when removed from a parent compound. Preferred hydrocarbyls are $C_1$-$C_{100}$ radicals that may be linear, branched, or cyclic, and when cyclic, aromatic or non-aromatic. Examples of such radicals include, but are not limited to, alkyl groups such as methyl, ethyl, n-propyl, isopropyl, n-butyl, isobutyl, sec-butyl, tert-butyl, pentyl, iso-amyl, hexyl, octyl cyclopropyl, cyclobutyl, cyclopentyl, cyclohexyl, cyclooctyl, and the like, and aryl groups, such as phenyl, benzyl, naphthyl, and the like.

The term "hydrocarbyl group having 1 to about 100 carbon atoms" refers to a moiety selected from a linear or branched $C_1$-$C_{100}$ alkyl, a $C_3$-$C_{100}$ cycloalkyl, a $C_6$-$C_{100}$ aryl, a $C_2$-$C_{100}$ heteroaryl, a $C_7$-$C_{100}$ alkylaryl, a $C_7$-$C_{100}$ arylalkyl, and any combination thereof.

Unless otherwise indicated, (e.g., the definition of "substituted hydrocarbyl"), the term "substituted" means that at least one hydrogen atom has been replaced with at least one non-hydrogen group, such as a hydrocarbyl group, a heteroatom, (such as Br, Cl, F, I, B, O, N, S, P, Si, Pb, Ge, Sn, As, Sb, Se, or Te) or a heteroatom containing group, such as a functional group such as S=O, S(=O)$_2$, NO$_2$, —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*$_3$, —PbR*$_3$, —(CH$_2$)q-SiR*$_3$, and the like, where q is 1 to 10 and each R* is independently H or a hydrocarbyl or halocarbyl radical, and two or more R* may join together to form a substituted or unsubstituted, completely saturated, partially unsaturated, or aromatic cyclic or polycyclic ring structure, or where at least one heteroatom has been inserted within a hydrocarbyl ring. Suitable hydrocarbyl R* groups may include alkyl, alkenyl, alkynyl, aryl, heteroaryl, cycloalkyl, heterocyclyl, and the like, any of which may be optionally substituted.

The term "substituted hydrocarbyl" means a hydrocarbyl radical in which at least one hydrogen atom of the hydrocarbyl radical has been substituted with at least one heteroatom (such as Br, Cl, F, I, B, O, N, S, P, Si, Pb, Ge, Sn, As, Sb, Se, or Te) or a heteroatom containing group, such as a functional group such as S=O, S(=O)$_2$, NO$_2$, —NR*$_2$, —OR*, —SeR*, —TeR*, —PR*$_2$, —AsR*$_2$, —SbR*$_2$, —SR*, —BR*$_2$, —SiR*$_3$, —GeR*$_3$, —SnR*3, —PbR*$_3$, —(CH$_2$)q-SiR*$_3$, and the like, where q is 1 to 10 and each R* is independently H or a hydrocarbyl or halocarbyl radical, and two or more R* may join together to form a substituted or unsubstituted, completely saturated, partially unsaturated, or aromatic cyclic or polycyclic ring structure, or where at least one heteroatom has been inserted within a hydrocarbyl ring. Suitable hydrocarbyl R* groups may include alkyl, alkenyl, alkynyl, aryl, heteroaryl, cycloalkyl, heterocyclyl, and the like, any of which may be optionally substituted.

The term "optionally substituted" means that a group may be unsubstituted or substituted. For example, the term "optionally substituted hydrocarbyl" refers to replacement of at least one hydrogen atom or carbon atom in a hydrocarbyl group with a heteroatom or heteroatom containing group. Unless otherwise specified, any of the hydrocarbyl groups herein may be optionally substituted.

Halocarbyl radicals (also referred to as halocarbyls, halocarbyl groups or halocarbyl substituents) are radicals in which one or more hydrocarbyl hydrogen atoms have been substituted with at least one halogen (e.g., F, Cl, Br, I) or halogen-containing group (e.g., CF$_3$). Substituted halocarbyl radicals are radicals in which at least one halocarbyl hydrogen or halogen atom has been substituted with at least one functional group such as NR*$_2$, OR*, SeR*, TeR*, PR*$_2$, AsR*$_2$, SbR*$_2$, SR*, BR*$_2$, SiR*$_3$, GeR*3, SnR*3, PbR*$_3$, and the like or where at least one non-carbon atom or group has been inserted within the halocarbyl radical such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$— and the like, where R* is independently a hydrocarbyl or halocarbyl radical provided that at least one halogen atom remains on the original halocarbyl radical. Additionally, two or more R* may join together to form a substituted or unsubstituted saturated, partially unsaturated or aromatic cyclic or polycyclic ring structure.

Silylcarbyl radicals (also referred to as silylcarbyls, silylcarbyl groups or silylcarbyl substituents) are radicals in which one or more hydrocarbyl hydrogen atoms have been substituted with at least one SiR*$_3$ containing group or where at least one —Si(R*)$_2$— has been inserted within the hydrocarbyl radical where R* is independently a hydrocarbyl or halocarbyl radical, and two or more R* may join together to form a substituted or unsubstituted saturated, partially unsaturated or aromatic cyclic or polycyclic ring structure. Silylcarbyl radicals can be bonded via a silicon atom or a carbon atom.

Substituted silylcarbyl radicals are silylcarbyl radicals in which at least one hydrogen atom has been substituted with at least one functional group such as NR*$_2$, OR*, SeR*, TeR*, PR*$_2$, AsR*$_2$, SbR*$_2$, SR*, BR*$_2$, GeR*$_3$, SnR*$_3$, PbR$_3$ and the like or where at least one non-hydrocarbon atom or group has been inserted within the silylcarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Ge(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic or polycyclic ring structure.

Germylcarbyl radicals (also referred to as germylcarbyls, germylcarbyl groups or germylcarbyl substituents) are radicals in which one or more hydrocarbyl hydrogen atoms have been substituted with at least one GeR*$_3$ containing group or where at least one —Ge(R*)$_2$— has been inserted within the hydrocarbyl radical where R* is independently a hydrocarbyl or halocarbyl radical, and two or more R* may join together to form a substituted or unsubstituted saturated, partially unsaturated or aromatic cyclic or polycyclic ring structure. Germylcarbyl radicals can be bonded via a germanium atom or a carbon atom.

Substituted germylcarbyl radicals are germylcarbyl radicals in which at least one hydrogen atom has been substituted with at least one functional group such as NR*$_2$, OR*, SeR*, TeR*, PR*$_2$, AsR*$_2$, SbR*$_2$, SR*, BR*$_2$, SiR*$_3$, SnR*$_3$, PbR$_3$ and the like or where at least one non-hydrocarbon atom or group has been inserted within the germylcarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic or polycyclic ring structure.

The terms "linear" or "linear hydrocarbon" refer to a hydrocarbon or hydrocarbyl group having a continuous carbon chain without side chain branching.

The terms "cyclic" or "cyclic hydrocarbon" refer to a hydrocarbon or hydrocarbyl group having a closed carbon ring.

The terms "branched" or "branched hydrocarbon" refer to a hydrocarbon or hydrocarbyl group having a linear carbon chain or a closed carbon ring, in which a hydrocarbyl side chain extends from the linear carbon chain or the closed carbon ring.

The terms "saturated" or "saturated hydrocarbon" refer to a hydrocarbon or hydrocarbyl group in which all carbon atoms are bonded to four other atoms, with the exception of an unfilled valence position being present upon carbon in a hydrocarbyl group.

The terms "unsaturated" or "unsaturated hydrocarbon" refer to a hydrocarbon or hydrocarbyl group in which one or more carbon atoms are bonded to less than four other atoms, exclusive of an open valence position upon carbon being present. That is, the term "unsaturated" refers to a hydrocarbon or hydrocarbyl group bearing one or more double and/or triple bonds, with the double and/or triple bonds being between two carbon atoms and/or between a carbon atom and a heteroatom.

The terms "aromatic" or "aromatic hydrocarbon" refer to a hydrocarbon or hydrocarbyl group having a cyclic arrangement of conjugated pi-electrons that satisfies the Hückel rule.

The term "alkyl" refers to a hydrocarbyl group having no unsaturated carbon-carbon bonds, and which may be optionally substituted.

The term "aryl" is equivalent to the term "aromatic" as defined herein. The term "aryl" refers to both aromatic compounds and heteroaromatic compounds, which may be optionally substituted. Both mononuclear and polynuclear aromatic compounds are encompassed by these terms. As used herein, the term "aromatic" also refers to pseudoaromatic heterocycles which are heterocyclic substituents that have similar properties and structures (nearly planar) to aromatic heterocyclic ligands, but are not by definition aromatic. Examples of aryl groups include phenyl and naphthyl.

The terms "heteroaryl" and "heteroaromatic" refer to an aromatic ring containing a heteroatom and which satisfies the Hückel rule, such as an aryl group where a ring carbon atom (or two or three ring carbon atoms) has been replaced with a heteroatom, such as N, O, or S.

The term "perfluoroalkyl" refers to an alkyl group that has at least a majority of its hydrogen atoms replaced with fluorine atoms, and more typically all of its hydrogen atoms replaced with fluorine atoms.

The term "perfluoroaryl" refers to an aryl group that has at least a majority of its hydrogen atoms replaced with fluorine atoms, and more typically all of its hydrogen atoms replaced with fluorine atoms.

The term "independently," when referenced to selection of multiple items from within a given group, means that the selected choice for a first item does not necessarily influence the choice of any second or subsequent item. That is, independent selection of multiple items within a given group means that the individual items may be the same or different from one another.

Examples of saturated hydrocarbyl groups include, but are not limited to, methyl, ethyl, n-propyl, isopropyl, n-butyl, isobutyl, sec-butyl, tert-butyl, pentyl, iso-amyl (isopentyl), neopentyl, hexyl, octyl, cyclopropyl, cyclobutyl, cyclopentyl, cyclohexyl, cyclooctyl, and the like, including their substituted analogues. Examples of unsaturated hydrocarbyl groups include, but are not limited to, ethenyl, propenyl, allyl, butadienyl, cyclopropenyl, cyclobutenyl, cyclopentenyl, cyclohexenyl, cyclooctenyl and the like, including their substituted analogues.

The terms "alkene" and "olefin" are used synonymously herein. Similarly, the terms "alkenic" and "olefinic" are used synonymously herein. Unless otherwise noted, all possible geometric isomers are encompassed by these terms.

The term "alpha olefin" refers to an olefin having a terminal carbon-to-carbon double bond in the structure thereof (R"HC=CH$_2$, where R" is hydrogen or a hydrocarbyl group; preferably R" is an alkyl group). A "linear alpha olefin (LAO)" is an alpha olefin as defined in this paragraph, wherein R" is a linear alkyl group such a methyl, ethyl, n-propyl, n-butyl, n-pentyl, n-hexyl, n-heptyl, n-octyl and the like.

For the purposes of this invention, ethylene shall be considered an alpha olefin.

Examples of aromatic hydrocarbyl groups include, but are not limited to, phenyl, tolyl, xylyl, naphthyl, and the like. Heteroaryl and polynuclear heteroaryl groups may include, but are not limited to, pyridyl, quinolinyl, isoquinolinyl, pyrimidinyl, quinazolinyl, acridinyl, pyrazinyl, quinoxalinyl, imidazolyl, benzimidazolyl, pyrazolyl, benzopyrazolyl, oxazolyl, benzoxazolyl, isoxazolyl, benzisoxazolyl, imidazolinyl, thiophenyl, benzothiophenyl, furanyl and benzofuranyl. Polynuclear aryl groups may include, but are not limited to, naphthalenyl, anthracenyl, indanyl, indenyl, and tetralinyl.

The term "catalyst system" refers to the combination of a transition metal complex and at least two activators, or an activated reaction product thereof. When used to describe such a combination before activation, the term "catalyst system" refers to the unactivated transition metal complex (precatalyst) together with the activators (co-catalysts). When used to describe such a combination after activation, the term "catalyst system" refers to the activated complex and the activators or other charge-balancing moiety. The transition metal complex may be neutral as in a precatalyst, or a charged species with a counter ion as in an activated catalyst system. For the purposes of this invention and the claims thereto, when catalyst systems are described as comprising neutral stable forms of the components, it is well understood by one of ordinary skill in the art that the ionic form of the component is the form that reacts with one or more monomers to produce polymers. A polymerization catalyst system is a catalyst system that can polymerize one or more monomers to form a polymer or copolymer.

The following abbreviations may be used through this specification: Cp is cyclopentadiene or cyclopentadienyl; Me is methyl, Ph is phenyl, F$_5$Ph is pentafluorophenyl, Naph is naphthyl, F$_7$Naph is heptafluoronaphthyl, Et is ethyl, Pr is propyl, iPr is isopropyl, nPr is normal propyl, Bu is butyl, iBu is isobutyl, tBu is tertiary butyl, p-tBu is para-tertiary butyl, nBu is normal butyl, TMS is trimethylsilyl, TIBAL is triisobutylaluminum, TNOAL or TNOA is triisobutyl n-octylaluminum, MAO is methylalumoxane, pMe is paramethyl, Bz or Bn are interchangeably benzyl, THF is tetrahydrofuran, RT is room temperature (i.e., approximately 23° C.), and tol is toluene.

The present disclosure generally relates to polymerizations and, more specifically, polymerization reactions to produce propylene-ethylene-diene monomer copolymers having excellent melt flow properties.

As discussed above, various transition metal complexes are available for promoting olefin polymerization. Depending on the properties sought in the resulting polyolefin, as well as the structure(s) of the monomer(s) used, the transition metal complex that is chosen to catalyze the polymerization reaction may differ. For example, the transition metal complex [cyclopentadienyl(2,7-di-t-buylfluorenyl)di-p-triethysilanephenylmethane]hafnium dimethyl (Formula 1) may be among metallocene complexes that are suitable for polymerizing ethylene and ethylene-predominant olefinic feeds. Making the apparently simple switch from ethylene to propylene, however, may impact the catalytic efficiency and the polymer properties, which may necessitate the use of a different catalyst in some cases. The activator used as a co-catalyst with a given transition metal complex may impact the polymer properties that are obtained as well. For example, for certain transition metal complexes, $[Me_2NH]^+[(F_7Naph)_4B]^-$ may allow targeted melt flow rates to be realized at higher reaction temperatures when producing polypropylene or propylene-predominant copolymers, in comparison to those obtained with $[Me_2NH]^+[(F_5Ph)_4B]^-$. However, the much higher cost and greater molecular weight of $[Me_2NH]^+[(F_7Naph)_4B]^-$ may make this approach economically untenable.

As shown in the present disclosure, two different non-coordinating anion activators may be used in combination to provide surprising and unexpected results when forming polypropylene and propylene-predominant copolymers with indacenyl-based metallocene complexes, such as the transition metal complex $(Me_2Si(t\text{-}BuN)(2,7,7\text{-}Me_3\text{indacenyl})TiMe_2$ (see Formula 2) and similar transition metal complexes. In particular, Formula 1

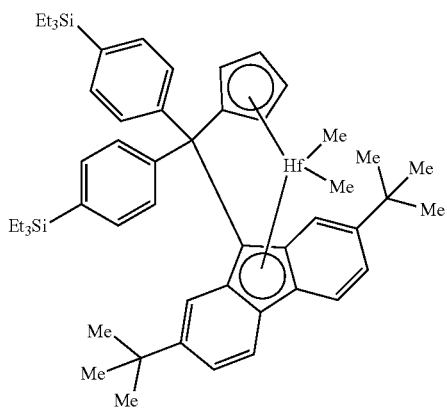

Formula 2

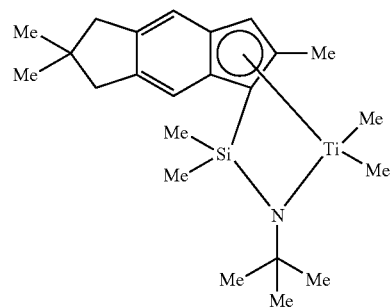

the present disclosure demonstrates that $[Me_2NH]^+[(F_5Ph)_4B]^-$ ("Activator 1") and $[Me_2NH]^+[(F_7Naph)_4B]^-$ ("Activator 2") may be used as co-catalysts in various combinations with one another in the presence of indacenyl-based metallocene complexes to provide melt flow rates at polymerization temperatures of 80° C. or more, preferably 100° C. or more, that are comparable to those obtained using Activator 2 alone, especially when polymerizing olefinic feeds comprising propylene or predominantly propylene. That is, the combination of Activator 1 and Activator 2 may afford a synergistic interaction with respect to their impact on the melt flow rate that is obtained following a polymerization reaction. Namely, the melt flow rate that is obtained when Activator 1 and Activator 2 are present in combination with one another during a polymerization reaction is not commensurate with the amount of Activator 2 that is present (i.e., there may be a non-linear change in the melt flow rate as a function of the amount of Activator 2 that is present). By lowering the amount of Activator 2 needed to produce a targeted melt flow rate, advantageous reductions in activator costs may be realized compared to using Activator 2 alone.

Moreover, by changing the molar ratio of Activator 1 to Activator 2 in a polymerization reaction, additional tailoring of the polymer molecular weight may be realized while still maintaining melt flow rates at a desired level. Thus, the present disclosure may afford greater synthetic flexibility than is attainable when using a single non-coordinating anion activator in a polymerization reaction.

Transition metal complexes represented by Formula 3 below may be used in various embodiments of the present disclosure, as discussed further below:

$$T_y Cp'_m M G_n X_q \qquad \text{Formula 3}$$

wherein:
M is a group 3, 4, 5, or 6 transition metal, preferably group 4;
Cp' is an optionally substituted tetrahydro-s-indacenyl or tetrahydro-as-indacenyl group;
G is a heteroatom containing group represented by the formula: $JR'_{z-y}$, wherein J is N, P, O or S, each R' is independently a $C_1$ to $C_{100}$ optionally substituted hydrocarbyl, halocarbyl, silylcarbyl, or germylcarbyl group, and z is 2 when J is N or P, and z is 1 when J is O or S;
T is a bridging group extending between Cp' and J;
y is 0 or 1, indicating an absence or a presence of T;
each X is independently a leaving group, or two X are joined and bound to M to form a metallocycle ring;
m=1; n=1, 2 or 3; and q=1, 2 or 3; wherein the sum of m+n+q is equal to the oxidation state of M (i.e., 0 to 7, preferably 3, 4, 5, or 6).

In more particular embodiments, a preferred transition metal complex useful herein is represented by Formula 2, shown above.

According to certain embodiments of the present disclosure, polymerization methods for producing propylene-predominant copolymers comprise: contacting a catalyst system with an olefinic feed comprising a $C_3$-$C_{40}$ alpha olefin, ethylene, and a diene monomer under polymerization reaction conditions, the catalyst system comprising a first non-coordinating anion activator, a second non-coordinating anion activator differing from the first non-coordinating anion activator, and a transition metal complex having Formula 3, with the variables being defined as above, and obtaining a copolymer comprising 1 to 35 mol. % ethylene, 98.9 to 65 mol. % $C_3$-$C_{40}$ olefin, and 0.1 to 10 mol. % diene monomer. The $C_3$-$C_{40}$ olefin, preferably an alpha olefin, may be present in the olefinic feed at a molar excess relative to a combined molar amount of the ethylene and the diene monomer.

The molar ratio of the first non-coordinating anion activator to the second non-coordinating anion activator should be selected to produce a melt flow rate for the copolymer under the polymerization reaction conditions of about 30 g/10 min or below as determined by ASTM D-1238 (230° C., 2.16 kg), preferably 25 g/10 min or less, preferably 20 g/10 min or less, preferably 15 g/10 min or less, preferably 12 g/10 min or less, preferably 10 g/10 min or less, preferably 8 g/10 min or less, or preferably 5 g/10 min or less. As will be appreciated by one having ordinary skill in the art, in order to produce a copolymer comprising 1 to 35 mol. % ethylene, 98.9 to 65 mol. % $C_3$-$C_{40}$ olefin, and 0.1 to 10 mol. % diene monomer, the olefinic feed typically comprises ethylene, $C_3$-$C_{40}$ olefin, and diene monomer in similar concentration ranges.

Accordingly, catalyst systems are also provided by the present disclosure. The catalyst systems comprise a first non-coordinating anion activator, a second non-coordinating anion activator differing from the first non-coordinating anion activator, and a transition metal complex represented by Formula 2 or Formula 3 described above or by Formula 4 or Formula 5 described below. The first non-coordinating anion activator and the second non-coordinating anion activator are present in a molar ratio such that a melt flow rate for a polymer formed under polymerization reaction conditions in the presence of the catalyst systems changes non-linearly as a function of the molar ratio of the first non-coordinating anion activator to the second non-coordinating anion activator. That is, the influence of each non-coordinating anion activator upon the observed melt flow rate differs from that expected based upon the relative molar amounts of each non-coordinating anion activator (e.g., due to an unexpected synergistic interaction between the two). Further details concerning the catalyst systems of the present disclosure and polymerization methods conducted using the catalyst systems are provided herein below.

Particularly suitable transition metals M in the transition metal complexes represented by Formula 3 of the present disclosure may be Group 4 transition metals, such as Ti, Zr or Hf, with Ti being especially suitable for promoting olefin polymerization in the various embodiments of the present disclosure. The oxidation state of the selected transition metal may range from 0 to +7, with an oxidation state of +3 or +4 being preferred, particularly +4. The ligands bound to the transition metal and the oxidation state of the transition metal may be selected such that the complexes are electrically neutral, unless otherwise indicated.

In some embodiments, the Cp' group of Formula 3 may be a tetrahydro-s-indacenyl group, optionally in which 1) the 3- and/or 4-positions of the tetrahydro-s-indacenyl group are not substituted with an aryl or substituted aryl group, 2) the 3-position of the tetrahydro-s-indacenyl group is not directly bonded to a group 15 or group 16 heteroatom, 3) no additional rings are fused to the tetrahydro-s-indacenyl group, 4) T is not bonded to the 2-position of the tetrahydro-s-indacenyl group, and 5) the 5, 6, or 7-position of the tetrahydro-s-indacenyl group is geminally disubstituted.

In still more particular embodiments, the transition metal complex may comprise a tetrahydro-s-indacenyl group and be represented by Formula 4 below:

Formula 4

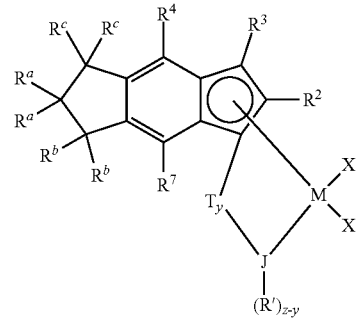

wherein:

M is a group 4 transition metal;

each $R^a$ is independently a $C_1$-$C_{10}$ alkyl group;

each $R^b$ and $R^c$ is independently hydrogen or a $C_1$-$C_{10}$ alkyl group;

each $R^2$, $R^3$, $R^4$, and $R^7$ is independently hydrogen or a $C_1$-$C_{50}$ optionally substituted hydrocarbyl, halocarbyl, silylcarbyl or germylcarbyl group, optionally provided that:

1) $R^3$ and/or $R^4$ are not aryl or substituted aryl,

2) $R^3$ is not directly bonded to a group 15 or 16 heteroatom, and 3) adjacent $R^4$, $R^c$, $R^a$, $R^b$, or $R^7$ do not join together to form a fused ring system;

J is N, O, S or P;

z is 2 when J is N or P, and is 1 when J is O or S (preferably J is N, y=1, and z=2);

each R' is, independently, a $C_1$-$C_{100}$ substituted or unsubstituted hydrocarbyl, halocarbyl, silylcarbyl or germylcarbyl;

T is a bridging group and y is 0 or 1 indicating the absence (y=0) or presence (y=1) of T; and each X is, independently, a leaving group, or two Xs are joined and bound to the metal atom to form a metallocycle ring, or two Xs are joined to form a chelating ligand, a diene ligand, or an alkylidene.

In other more particular embodiments the transition metal complex may comprise a tetrahydro-as-indacenyl group and be represented by the Formula 5 below:

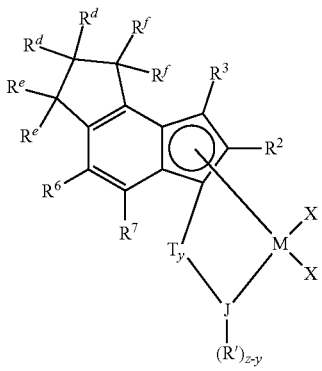

Formula 5 wherein:
M is a group 4 transition metal;
each $R^d$, $R^e$ and $R^f$ is independently hydrogen or a $C_1$-$C_{10}$ alkyl group;
each $R^2$, $R^3$, $R^6$, and $R^7$ is independently hydrogen or a $C_1$-$C_{50}$ optionally substituted hydrocarbyl, halocarbyl, silylcarbyl or germylcarbyl group; J is N, O, S or P;
z is 2 when J is N or P, and is 1 when J is O or S (preferably J is N, y=1, and z=2); each R' is, independently, a $C_1$-$C_{100}$ substituted or unsubstituted hydrocarbyl, halocarbyl, silylcarbyl or germylcarbyl;
T is a bridging group and y is 0 or 1 indicating the absence (y=0) or presence (y=1) of T; and
each X is, independently, a leaving group, or two Xs are joined and bound to the metal atom to form a metallocycle ring, or two Xs are joined to form a chelating ligand, a diene ligand, or an alkylidene.

Particularly suitable examples of transition metal complexes represented by Formula 4 or Formula 5 include those in which the transition metal complex represented by Formula 4 has each $R^a$ being methyl, and $R^b$ and $R^c$ each being hydrogen, or the transition metal complex represented by Formula 5 has each $R^d$ being methyl, and $R^e$ and $R^f$ each being hydrogen. Other useful transition metal complexes include those represented by Formula 4 where $R^2$ is methyl, ethyl, propyl, butyl, pentyl, hexyl, heptyl, octyl, nonyl, decyl, undecyl, dodecyl or an isomer thereof, and $R^3$, $R^4$ and $R^7$ are all hydrogen. Other useful transition metal complexes include those represented by Formula 5 wherein $R^2$ is methyl, ethyl, propyl, butyl, pentyl, hexyl, heptyl, octyl, nonyl, decyl, undecyl, dodecyl or an isomer thereof, and $R^3$, $R^6$, and $R^7$ are all hydrogen. In more particular examples of transition metal complexes represented by Formulas 4 and 5, M is Ti.

In any embodiment of Formulas 3, 4 or 5 described herein, $JR'_{z-y}$ may be NR', where each R' is independently a $C_1$ to $C_{100}$ optionally substituted hydrocarbyl group (such as an optionally substituted halocarbyl, silylcarbyl, or germylcarbyl group).

In embodiments of Formulas 3, 4 or 5, J is N, S, O, P, preferably N, and R' is a $C_1$-$C_{100}$ substituted or unsubstituted hydrocarbyl, halocarbyl, or silylcarbyl, preferably methyl, ethyl, propyl, butyl, pentyl, hexyl, heptyl, octyl, nonyl, decyl, undecyl, dodecyl, phenyl or an isomer thereof, preferably t-butyl, neopentyl, cyclohexyl, cyclooctyl, cyclodecyl, adamantyl, or norbornyl.

In embodiments of Formulas 3, 4 or 5, y is 1 and J(R')z-y is NR', where R' is a $C_1$-$C_{100}$ substituted or unsubstituted hydrocarbyl, halocarbyl, or silylcarbyl, preferably methyl, ethyl, propyl, butyl, pentyl, hexyl, heptyl, octyl, nonyl, decyl, undecyl, dodecyl, phenyl or an isomer thereof, preferably t-butyl, neopentyl, cyclohexyl, cyclooctyl, cyclodecyl, adamantyl, or norbornyl.

In embodiments of Formulas 3, 4 or 5, y is 1 such that T is present. That is, in such embodiments, bridging group T forms a connection between Cp' and J. In more specific embodiments, T is $(CR^8R^9)_x$, $SiR^8R^9$, or $GeR^8R^9$, in which x is 1 or 2, and $R^8$ and $R^9$ are independently hydrogen or an optionally substituted hydrocarbyl, halocarbyl, silylcarbyl, or germylcarbyl group. Optionally, $R^8$ and $R^9$ may be bonded together to form a ring structure.

In any embodiment of the invention, T is a bridging group containing at least one Group 13, 14, 15, or 16 element, in particular boron or a Group 14, 15, or 16 element. Examples of suitable bridging groups include P(=S)R*, P(=Se)R*, P(=O)R*, R*$_2$C, R*$_2$Si, R*$_2$Ge, R*$_2$CCR*$_2$, R*$_2$CCR*$_2$CR*$_2$, R*$_2$CCR*$_2$CR*$_2$CR*$_2$, R*C=CR*, R*C=CR*CR*$_2$, R*$_2$CCR*=CR*CR*$_2$, R*C=CR*CR*=CR*, R*C=CR*CR*$_2$CR*$_2$, R*$_2$CSiR*$_2$, R*$_2$SiSiR*$_2$, R*$_2$SiOSiR*$_2$, R*$_2$CSiR*$_2$CR*$_2$, R*$_2$SiCR*$_2$SiR*$_2$, R*C=CR*SiR*$_2$, R*$_2$CGeR*$_2$, R*$_2$GeGeR*$_2$, R*$_2$CGeR*$_2$CR*$_2$, R*$_2$GeCR*$_2$GeR*$_2$, R*$_2$SiGeR*$_2$, R*C=CR*GeR*$_2$, R*B, R*$_2$C—BR*, R*$_2$C—BR*—CR*$_2$, R*$_2$C—O—CR*$_2$, R*$_2$CR*$_2$C—O—CR*$_2$CR*$_2$, R*$_2$C—O—CR*$_2$CR*$_2$, R*$_2$C—O—CR*=CR*, R*$_2$C—S—CR*$_2$, R*$_2$CR*$_2$C—S—CR*$_2$CR*$_2$, R*$_2$C—S—CR*$_2$CR*$_2$, R*$_2$C—S—CR*=CR*, R*$_2$C—Se—CR*$_2$, R*$_2$CR*$_2$C—Se—CR*$_2$CR*$_2$, R*$_2$C—Se—CR*$_2$CR*$_2$, R*$_2$C—Se—CR*=CR*, R*$_2$C—N=CR*, R*$_2$C—NR*—CR*$_2$, R*$_2$C—NR*—CR*$_2$CR*$_2$, R*$_2$C—NR*—CR*=CR*, R*$_2$CR*$_2$C—NR*—CR*$_2$CR*$_2$, R*$_2$C—P=CR*, R*$_2$C—PR*—CR*$_2$, O, S, Se, Te, NR*, PR*, AsR*, SbR*, 0-0, S—S, R*N—NR*, R*P—PR*, O—S, O—NR*, O—PR*, S—NR*, S—PR*, and R*N—PR* where R* is hydrogen or a $C_1$-$C_{20}$ hydrocarbyl, substituted hydrocarbyl, halocarbyl, substituted halocarbyl, silylcarbyl or germylcarbyl substituent and optionally two or more adjacent R* may join to form a substituted or unsubstituted, saturated, partially unsaturated or aromatic, cyclic or polycyclic substituent. Preferred examples for the bridging group T include $CH_2$, $CH_2CH_2$, $SiMe_2$, $SiPh_2$, $SiMePh$, $Si(CH_2)_3$, $Si(CH_2)_4$, O, S, NPh, PPh, NMe, PMe, NEt, NPr, NBu, PEt, PPr, $Me_2SiOSiMe_2$, and PBu. In a preferred embodiment of the invention, in any embodiment of any formula described herein, T is represented by the formula $ER^g_2$ or $(ER^g_2)_2$, where E is C, Si, or Ge, and each $R^g$ is, independently, hydrogen, halogen, $C_1$ to $C_{20}$ hydrocarbyl (such as methyl, ethyl, propyl, butyl, pentyl, hexyl, heptyl, octyl, nonyl, decyl, undecyl, or dodecyl) or a $C_1$ to $C_{20}$ substituted hydrocarbyl, and two $R^d$ can form a cyclic structure including aromatic, partially saturated, or saturated cyclic or fused ring system. Preferably, T is a bridging group comprising carbon or silicon, such as dialkylsilyl, and preferably T is selected from $CH_2$, $CH_2CH_2$, $C(CH_3)_2$, $SiMe_2$, $Me_2Si$—$SiMe_2$, cyclotrimethylenesilylene ($Si(CH_2)_3$), cyclopentamethylenesilylene ($Si(CH_2)_5$) and cyclotetramethylenesilylene ($Si(CH_2)_4$).

In more particular embodiments of Formula 3, the transition metal complex Cp' may comprise a tetrahydro-s-indacenyl group or a tetrahydro-as-indacenyl group, particularly when J is N and R' is methyl, ethyl, propyl, butyl, pentyl, hexyl, heptyl, octyl, nonyl, decyl, undecyl, dodecyl, phenyl or an isomer thereof. In more particular embodiments of Formula 3, the transition metal complex Cp' may comprise a tetrahydro-s-indacenyl group or a tetrahydro-as-indacenyl group, particularly when J is N and R' is t-butyl, neopentyl, cyclohexyl, cyclooctyl, cyclododecyl, adamantyl, or norbornyl. In yet still more specific embodiments of such transition metal complexes, R' is t-butyl.

In any embodiment of Formula 3, 4 or 5 described herein, each X is independently a leaving group, or two Xs are joined and bound to M to form a metallocycle ring, or two Xs are joined to form a chelating ligand, a diene ligand, or an alkylidene.

In any embodiment of Formula 3, 4 or 5 described herein, each X is independently selected from the group consisting of a $C_1$-$C_{20}$ hydrocarbyl group, an aryl group, a hydride, an amide, an alkoxide, a sulfide, a phosphide, a halide, an amine, a phosphine, an ether, and any combination thereof. In more particular embodiments, each X is independently selected from the group consisting of a $C_1$-$C_5$ alkyl group, a halide, and an aryl group. In still more particular embodiments, each X is a $C_1$-$C_5$ alkyl group, particularly each X is a methyl group.

In any embodiment of Formula 3, 4 or 5 described herein, each $R^2$, $R^3$, $R^6$, and $R^7$ is independently hydrogen, or a $C_1$-$C_{50}$ substituted or unsubstituted hydrocarbyl, halocarbyl, silylcarbyl or germylcarbyl, preferably methyl, ethyl, propyl, butyl, pentyl, hexyl, heptyl, octyl, nonyl, decyl, undecyl, and dodecyl or an isomer thereof.

In any embodiment of Formula 3, 4 or 5 described herein, each $R^2$, $R^3$, $R^4$, and $R^7$ is independently hydrogen, or a $C_1$-$C_{50}$ substituted or unsubstituted hydrocarbyl, halocarbyl, silylcarbyl or germylcarbyl, preferably methyl, ethyl, propyl, butyl, pentyl, hexyl, heptyl, octyl, nonyl, decyl, undecyl, and dodecyl or an isomer thereof.

In any embodiment of Formula 3, 4 or 5 described herein, each $R^a$ or $R^d$ is independently selected from methyl, ethyl, propyl, butyl, pentyl, hexyl, heptyl, octyl, nonyl, decyl, and isomers thereof, preferably methyl and ethyl, preferably methyl.

In any embodiment of Formula 3, 4 or 5 described herein, each $R^b$, $R^c$, $R^e$ or $R^f$ is independently selected from hydrogen, methyl, ethyl, propyl, butyl, pentyl, hexyl, heptyl, octyl, nonyl, decyl, and isomers thereof, preferably hydrogen or methyl, preferably hydrogen.

In any embodiment of Formula 3, 4 or 5 described herein, each $R^a$ is independently selected from methyl, ethyl, propyl, butyl, pentyl, hexyl, heptyl, octyl, nonyl, decyl, and isomers thereof, preferably methyl and ethyl, preferably methyl, and each $R^b$ and $R^c$ are independently selected from hydrogen, methyl, ethyl, propyl, butyl, pentyl, hexyl, heptyl, octyl, nonyl, decyl, and isomers thereof, preferably hydrogen or methyl, preferably hydrogen.

In any embodiment of Formula 3, 4 or 5 described herein, each $R^d$ is independently selected from hydrogen, methyl, ethyl, propyl, butyl, pentyl, hexyl, heptyl, octyl, nonyl, decyl, and isomers thereof, preferably methyl and ethyl, preferably methyl, and each $R^e$ and $R^f$ are independently selected from hydrogen, methyl, ethyl, propyl, butyl, pentyl, hexyl, heptyl, octyl, nonyl, decyl, and isomers thereof, preferably hydrogen or methyl, preferably hydrogen.

In any embodiment of Formula 3, 4 or 5 described herein, each $R^a$, $R^b$ and $R^c$ is independently selected from hydrogen, methyl, ethyl, propyl, butyl, pentyl, hexyl, heptyl, octyl, nonyl, decyl, and isomers thereof, preferably hydrogen or methyl.

In any embodiment of Formula 3, 4 or 5 described herein, each $R^d$, $R^e$ and $R^f$ is independently selected from hydrogen, methyl, ethyl, propyl, butyl, pentyl, hexyl, heptyl, octyl, nonyl, decyl, and isomers thereof, preferably hydrogen or methyl.

In more specific embodiments, transition metal complexes suitable for use in conjunction with the disclosure herein include, for example, dimethylsilylene(2,6,6-trimethyl-1,5,6,7-tetrahydro-s-indacen-1-yl)(t-butylamido)M(R)$_2$; dimethylsilylene(6,6-dimethyl-1,5,6,7-tetrahydro-s-indacen-1-yl)(t-butylamido)M(R)$_2$; dimethylsilylene(2,7,7-trimethyl-3,6,7,8-tetrahydro-as-indacen-3-yl)(t-butylamido)M(R)$_2$; dimethylsilylene(7,7-dimethyl-3,6,7,8-tetrahydro-as-indacen-3-yl)(t-butylamido)M(R)$_2$; dimethylsilylene(2,6,6-trimethyl-1,5,6,7-tetrahydro-s-indacen-1-yl)(cyclododecylamido)M(R)$_2$; dimethylsilylene(6,6-dimethyl-1,5,6,7-tetrahydro-s-indacen-1-yl)(cyclododecylamido)M(R)$_2$; dimethylsilylene(2,7,7-trimethyl-3,6,7,8-tetrahydro-as-indacen-3-yl)(cyclododecylamido)M(R)$_2$; dimethylsilylene(7,7-dimethyl-3,6,7,8-tetrahydro-as-indacen-3-yl)(cyclododecylamido)M(R)$_2$; dimethylsilylene(2,6,6-trimethyl-1,5,6,7-tetrahydro-s-indacen-1-yl)(cyclohexylamido)M(R)$_2$; dimethylsilylene(6,6-dimethyl-1,5,6,7-tetrahydro-s-indacen-1-yl)(cyclohexylamido)M(R)$_2$; dimethylsilylene(2,7,7-trimethyl-3,6,7,8-tetrahydro-as-indacen-3-yl)(cyclohexylamido)M(R)$_2$; dimethylsilylene(7,7-dimethyl-3,6,7,8-tetrahydro-as-indacen-3-yl)(cyclohexylamido)M(R)$_2$; dimethylsilylene(2,6,6-trimethyl-1,5,6,7-tetrahydro-s-indacen-1-yl)(adamantylamido)M(R)$_2$; dimethylsilylene(6,6-dimethyl-1,5,6,7-tetrahydro-s-indacen-1-yl)(adamantylamido)M(R)$_2$; dimethylsilylene(2,7,7-trimethyl-3,6,7,8-tetrahydro-as-indacen-3-yl)(adamantylamido)M(R)$_2$; dimethylsilylene(7,7-dimethyl-3,6,7,8-tetrahydro-as-indacen-3-yl)(adamantylamido)M(R)$_2$; dimethylsilylene(2,6,6-trimethyl-1,5,6,7-tetrahydro-s-indacen-1-yl)(neopentylamido)M(R)$_2$; dimethylsilylene(6,6-dimethyl-1,5,6,7-tetrahydro-s-indacen-1-yl)(neopentylamido)M(R)$_2$; dimethylsilylene(2,7,7-trimethyl-3,6,7,8-tetrahydro-as-indacen-3-yl)(neopentylamido)M(R)$_2$; dimethylsilylene(7,7-dimethyl-3,6,7,8-tetrahydro-as-indacen-3-yl)(neopentylamido)M(R)$_2$; dimethylsilylene(2-methyl-6,6-diethyl-1,5,6,7-tetrahydro-s-indacen-1-yl)(t-butylamido)M(R)$_2$; dimethylsilylene(6,6-diethyl-1,5,6,7-tetrahydro-s-indacen-1-yl)(t-butylamido)M(R)$_2$; dimethylsilylene(2-methyl-7,7-diethyl-3,6,7,8-tetrahydro-as-indacen-3-yl)(t-butylamido)M(R)$_2$; dimethylsilylene(7,7-diethyl-3,6,7,8-tetrahydro-as-indacen-3-yl)(t-butylamido)M(R)$_2$; dimethylsilylene(2-methyl-6,6-diethyl-1,5,6,7-tetrahydro-s-indacen-1-yl)(cyclododecylamido)M(R)$_2$; dimethylsilylene(6,6-diethyl-1,5,6,7-tetrahydro-s-indacen-1-yl)(cyclododecylamido)M(R)$_2$; dimethylsilylene(2-methyl-7,7-diethyl-3,6,7,8-tetrahydro-as-indacen-3-yl)(cyclododecylamido)M(R)$_2$; dimethylsilylene(7,7-dimethyl-3,6,7,8-tetrahydro-as-indacen-3-yl)(cyclododecylamido)M(R)$_2$; diethylsilylene(2,6,6-trimethyl-1,5,6,7-tetrahydro-s-indacen-1-yl)(t-butylamido)M(R)$_2$; diethylsilylene(6,6-dimethyl-1,5,6,7-tetrahydro-s-indacen-1-yl)(t-butylamido)M(R)$_2$; diethylsilylene(2,7,7-trimethyl-3,6,7,8-tetrahydro-as-indacen-3-yl)(t-butylamido)M(R)$_2$; diethylsilylene(7,7-dimethyl-3,6,7,8-tetrahydro-as-indacen-3-yl)(t-butylamido)M(R)$_2$; dimethylsilylene(2-methyl-3,6,7,8-tetrahydro-as-indacen-3-yl)(cyclohexylamido)M(R)$_2$; dimethylsilylene(2-methyl-3,6,7,8-tetrahydro-as-indacen-3-yl)(cyclododecylamido)M(R)$_2$; dimethylsilylene(2-methyl-3,6,7,8-tetrahydro-as-indacen-3-yl)(adamantylamido)M(R)$_2$; and dimethylsilylene(2-methyl-3,6,7,8-tetrahydro-as-indacen-3-yl)(t-butylamido)M(R)$_2$, in which M is Ti, Zr or Hf, particularly Ti, and R is a halogen or a $C_1$ to $C_{10}$ hydrocarbyl, such as methyl, ethyl, propyl, isopropyl, and benzyl, particularly methyl. Particularly suitable examples of transition metal complexes suitable for use in the disclosure herein include, for example, dimethylsilylene(2,7,7-trimethyl-3,6,7,8-tetrahydro-as-indacen-3-yl)(t-butylamido)titanium dimethyl; or dimethylsilylene(2,6,6-trimethyl-1,5,6,7-tetrahydro-s-indacen-1-yl)(t-butylamido)titanium dimethyl.

The present disclosure utilizes at least two different non-coordinating anion activators, typically non-coordinating borate anion activators, in combination to afford the benefits described herein. The activators, including the borate activators, are non-coordinating anions (NCA) which is defined to mean an anion either that does not coordinate to a transition metal in a complex or that does coordinate to a transition metal in a complex, but does so only weakly. Suitable NCAs include multicomponent NCA activators, such as N,N-dimethylanilinium tetrakis(pentafluorophenyl)borate and N,N-dimethylanilinium tetrakis(heptafluoronaphthyl)borate, that contain an acidic cationic group and the non-coordinating anion. Other suitable NCAs include neutral Lewis acids, such as tris(pentafluorophenyl)boron, that can react to form an activated species by abstraction of an anionic group. Typically, NCAs coordinate weakly enough to a transition metal that a neutral Lewis base, such as an olefinically or acetylenically unsaturated monomer can displace it to promote monomer activation. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon. The term non-coordinating anion includes neutral activators, ionic activators, and Lewis acid activators.

Non-coordinating borate activators suitable for use in the disclosure herein may be represented generically by Formula 6 below:

$$Z_d^+(A^{d-})$$  Formula 6 wherein Z is (L-H) or a reducible Lewis acid; L is a neutral Lewis base; H is hydrogen; (L-H) is a Bronsted acid; $A^{d-}$ is a non-coordinating anion having the charge d−, preferably a boron-containing non-coordinating anion having the charge d−; and d is 1, 2, or 3.

The cation component $Z_d^+$ in Formula 6 may include Bronsted acids such as protons or protonated Lewis bases or reducible Lewis acids capable of abstracting leaving group X from the transition metal complexes discussed above, resulting in a cationic transition metal species. Suitable examples of $Z_d^+$ may also be a moiety such as silver, tropylium, carboniums, ferroceniums and mixtures thereof, preferably carboniums and ferroceniums. Preferred reducible Lewis acids can be any triaryl carbonium (where the aryl can be substituted or unsubstituted, such as those represented by the formula ($Ar_3C^+$), where Ar is aryl or aryl substituted with a heteroatom, a $C_1$ to $C_{40}$ hydrocarbyl, or a substituted $C_1$ to $C_{40}$ hydrocarbyl. More preferably, suitable reducible Lewis acids include those represented by the formula ($Ph_3C^+$), where Ph is a substituted or unsubstituted phenyl, preferably substituted with a $C_1$ to $C_{40}$ hydrocarbyl or a substituted $C_1$ to $C_{40}$ hydrocarbyl, preferably $C_1$ to $C_{20}$ alkyls or aromatics or substituted $C_1$ to $C_{20}$ alkyls or aromatics. Still more preferably, $Z_d^+$ is triphenylcarbonium.

When $Z_d^+$ is $(L-H)_d^+$, it is preferably a Bronsted acid capable of donating a proton to the transition metal to promote formation of a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo-N,N-dimethylaniline, p-nitro-N,N-dimethylaniline, phosphoniums derived from triethylphosphine, triphenylphosphine, or diphenylphosphine, oxoniums derived from ethers such as dimethyl ether, diethyl ether, tetrahydrofuran, or dioxane, or sulfoniums derived from thioethers, such as diethyl thioether or tetrahydrothiophene, and mixtures thereof.

The anion component $A^{d-}$ in Formula 6 includes those having the formula $[M^{k+}G_g]^{d-}$ wherein k is 1, 2, or 3; g is 1, 2, 3, 4, 5, or 6 (preferably 1, 2, 3, or 4); g−k=d; M is a group 13 atom, preferably boron or aluminum, preferably boron, and G is independently a hydride, bridged or unbridged dialkylamido, halide, alkoxide, aryloxide, hydrocarbyl, substituted hydrocarbyl, halocarbyl, or substituted halocarbyl group having up to 20 carbon atoms, with the proviso that in not more than one occurrence is G a halide (i.e., g is 1 if G is a halide). Preferably, each G is a fluorinated hydrocarbyl group having 1 to 20 carbon atoms, more preferably each G is a fluorinated aryl group, and most preferably each G is a perfluorinated aryl group.

In at least one embodiment, the non-coordinating anion is a borate moiety represented by the formula $[BR^{4'}R^{5'}R^{6'}R^{7'}]^−$, where each of $R^{4'}$, $R^{5'}$, $R^{6'}$, and $R^{7'}$ is independently aryl (preferably phenyl or naphthyl), wherein at least one of $R^{4'}$, $R^{5'}$, $R^{6'}$, and $R^{7'}$ is substituted with from one to seven fluorine atoms. In at least one embodiment, each of $R^{4'}$, $R^{5'}$, $R^{6'}$, and $R^{7'}$ is independently naphthyl comprising one fluorine atom, two fluorine atoms, three fluorine atoms, four fluorine atoms, five fluorine atoms, six fluorine atoms, or seven fluorine atoms. In at least one embodiment, each of $R^{4'}$, $R^{5'}$, $R^{6'}$, and $R^{7'}$ is independently phenyl comprising one fluorine atom, two fluorine atoms, three fluorine atoms, four fluorine atoms, or five fluorine atoms.

As referenced above, the embodiments of the present disclosure feature activation of a suitable transition metal complex with a first non-coordinating anion activator and a second non-coordinating anion activator that differ from one another. Suitable substances that may be used as the first and second non-coordinating anion activators in the present disclosure include any combination of N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, $[Me_3NH^+][B(C_6F_5)_4^{−}]$, 1-(4-(tris(pentafluorophenyl)borate)-2,3,5,6-tetrafluorophenyl)pyrrolidinium; $[Me_3NH^+][B(C_6F_5)_4^{−}]$, 1-(4-(tris(pentafluorophenyl)borate)-2,3,5,6-tetrafluorophenyl) pyrrolidinium, sodium tetrakis(pentafluorophenyl)borate, potassium tetrakis(pentafluorophenyl)borate, and 4-(tris(pentafluorophenyl)borate)-2,3,5,6-tetrafluoropyridinium.

In more particular embodiments, the first non-coordinating anion activator is N,N-dimethylanilinium tetrakis(pentafluorophenyl)borate (Activator 1) and the second non-coordinating anion activator is N,N-dimethylanilinium tetrakis(perfluoronaphthyl)borate (Activator 2). In some embodiments, the first non-coordinating anion activator (N,N-dimethylanilinium tetrakis(pentafluorophenyl)borate) may be present in a molar excess with respect to the second non-coordinating anion activator (N,N-dimethylanilinium tetrakis(perfluoronaphthyl)borate). Use of the first non-coordinating anion activator in a molar excess relative to the second non-coordinating anion activator may allow advantageous cost savings to be realized when the two non-coordinating anion activators are selected as above.

Preferably the molar ratio of the first non-coordinating anion activator, preferably a first non-coordinating borate activator such as N,N-dimethylanilinium tetrakis(pentafluorophenyl)borate, to the second non-coordinating anion activator, preferably a second non-coordinating borate activator such as N,N-dimethylanilinium tetrakis(perfluoronaphthyl)borate, may range from 1:99 to 99:1, or from 1:50 to 50:1, or from 1:9 to 9:1, or from 1:3 to 3:1. In yet still more specific embodiments, the molar ratio of the first non-coordinating borate activator, particularly N,N-dimethylanilinium tetrakis(pentafluorophenyl)borate, to the second non-coordinating borate activator, particularly N,N-dimethylanilinium tetrakis(perfluoronaphthyl)borate, is from 1:3 to 3:1. In some embodiments, the first non-coordinating anion activator is present in a molar excess with respect to the second non-coordinating anion activator, such as at a ratio of the first non-coordinating anion activator to the second non-coordinating anion activator from at least 50:1, 25:1, 9:1 or 3:1.

Preferred "bulky" anions for use in the non-coordinating anion activators described herein include those represented by Formula 7 below

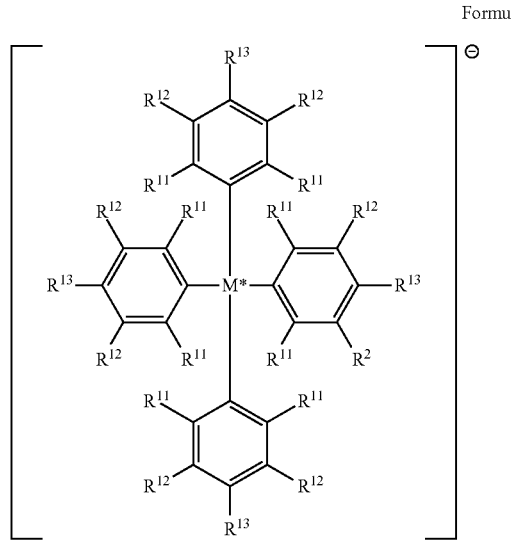

Formula 7 wherein:
M* is a group 13 atom, preferably B or Al, preferably B;
each $R^{11}$ is, independently, a halide, preferably a fluoride;
each $R^{12}$ is, independently, a halide, a $C_6$ to $C_{20}$ substituted aromatic hydrocarbyl group or a siloxy group of the formula —O—Si—$R^a$, where $R^a$ is a $C_1$ to $C_{20}$ hydrocarbyl or hydrocarbylsilyl group, preferably $R^{12}$ is a fluoride or a perfluorinated phenyl group;
each $R^{13}$ is a halide, a $C_6$ to $C_{20}$ substituted aromatic hydrocarbyl group or a siloxy group of the formula —O—Si—$R_a$, where $R^a$ is a $C_1$ to $C_{20}$ hydrocarbyl or hydrocarbylsilyl group, preferably $R^{13}$ is a fluoride or a $C_6$ perfluorinated aromatic hydrocarbyl group;
wherein $R^{12}$ and $R^{13}$ can form one or more saturated or unsaturated, substituted or unsubstituted rings, preferably $R^{12}$ and $R^{13}$ form a perfluorinated phenyl ring. Preferably the anion has a molecular weight of greater than 700 g/mol, and, preferably, at least three of the substituents on the M* atom each have a molecular volume of greater than 180 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: MV=8.3$V_S$, where $V_S$ is the scaled volume. $V_S$ is the sum of the relative volumes of the constituent atoms, and is calculated from the molecular formula of the substituent using Table 1 below of relative volumes. For fused rings, the $V_S$ is decreased by 7.5% per fused ring. The Calculated Total MV of the anion is the sum of the MV per substituent, for example, the MV of perfluorophenyl is 183 Å$^3$, and the Calculated Total MV for tetrakis(perfluorophenyl)borate is four times 183 Å$^3$, or 732 Å$^3$.

TABLE 1

| Element | Relative Volume |
| --- | --- |
| H | 1 |
| 1$^{st}$ short period, Li to F | 2 |
| 2$^{nd}$ short period, Na to Cl | 4 |
| 1$^{st}$ long period, K to Br | 5 |
| 2$^{nd}$ long period, Rb to I | 7.5 |
| 3$^{rd}$ long period, Cs to Bi | 9 |

Exemplary anions useful herein and their respective scaled volumes and molecular volumes are shown in Table 2 below. The dashed bonds indicate bonding to boron.

TABLE 2

| Ion | Structure of Boron Substituents | Molecular Formula of Each Substituent | $V_S$ | MV Per subst. (Å$^3$) | Calculated Total MV (Å$^3$) |
| --- | --- | --- | --- | --- | --- |
| tetrakis(perfluorophenyl)borate | | $C_6F_5$ | 22 | 183 | 732 |

TABLE 2-continued

| Ion | Structure of Boron Substituents | Molecular Formula of Each Substituent | $V_S$ | MV Per subst. ($Å^3$) | Calculated Total MV ($Å^3$) |
|---|---|---|---|---|---|
| tris(perfluorophenyl)-(perfluoronaphthyl)borate | | $C_6F_5$<br>$C_{10}F_7$ | 22<br>34 | 183<br>261 | 810 |
| (perfluorophenyl)tris-(perfluoronaphthyl)borate | | $C_6F_5$<br>$C_{10}F_7$ | 22<br>34 | 183<br>261 | 966 |
| tetrakis(perfluoronaphthyl)borate | | $C_{10}F_7$ | 34 | 261 | 1044 |
| tetrakis(perfluorobiphenyl)borate | | $C_{12}F_9$ | 42 | 349 | 1396 |
| $[(C_6F_3(C_6F_5)_2)_4B]$ | | $C_{18}F_{13}$ | 62 | 515 | 2060 |

In choosing a combination of activators, it is preferred that the two activators have Calculated Total MV's differing by at least 150 Å$^3$, alternatively by at least 200 Å$^3$, alternatively by at least 250 Å$^3$, or alternatively at least 300 Å$^3$.

In some embodiments of the invention, the ratio of the Calculated Total MV of the second non-coordinating borate activator to the Calculated Total MV of the first non-coordinating borate activator is about 1.2 or greater, alternatively about 1.3 or greater, or alternatively about 1.4 or greater.

In some embodiments of the invention, the Calculated Total MV of the first non-coordinating borate activator is 732 Å$^3$ or 810 Å$^3$, and the Calculated Total MV of the second non-coordinating borate activator is 966 Å$^3$ or greater, preferably 1044 Å$^3$ or greater.

The molar ratio of the first non-coordinating borate activator to the second non-coordinating borate activator may influence the catalytic efficiency of the catalyst system to some degree. In illustrative embodiments of the present disclosure, the catalyst system may feature a molar ratio of the first non-coordinating borate activator to the second non-coordinating borate activator such that a catalytic efficiency of about 25,000 g copolymer/g catalyst ($g_{poly}/g_{cat}$) or above is obtained. In more particular embodiments, a catalyst system comprising N,N-dimethylanilinium tetrakis(pentafluorophenyl)borate as a first non-coordinating borate activator, N,N-dimethylaniliniumtetrakis(perfluoronaphthyl)borate as a second non-coordinating borate activator, and a transition metal complex corresponding to Formula 2 has a catalytic efficiency of about 25,000 $g_{poly}/g_{cat}$ or above, or about 30,000 $g_{poly}/g_{cat}$ or above.

In some embodiments, the first and second non-coordinating borate activators may be used in combination an alumoxane activator, such as methylalumoxane (MAO); see, for example, U.S. Pat. Nos. 5,153,157 and 5,453,410; EP 0 573 120 BI, and International Patent Application Publications WO 94/07928 and WO 95/14044, which discuss the use of an alumoxane in combination with a non-coordinating anion activator.

In some embodiments, a combined amount of the first and second non-coordinating anion activators relative to the transition metal complex may be at least a 1:1 molar ratio. Alternate ranges at which the non-coordinating anion activators may be present with respect to the transition metal complex may range from 0.1:1 to 100:1, or from 0.5:1 to 200:1, or from 1:1 to 500:1, or from 1:1 to 1000:1, or from 1:1 to 100,000. A particularly useful range may be from 0.5:1 to 10:1, preferably 1:1 to 5:1 (combined molar amount of the first and second non-coordinating anion activators: transition metal complex).

In some embodiments, the catalyst systems of the present disclosure may be disposed on a solid support. The solid support may allow a catalytic reaction, such as polymerization of an olefinic feed, to be conducted under heterogeneous polymerization reaction conditions. In more specific embodiments, the solid support may be silica. Other suitable solid supports may include, but are not limited to, alumina, magnesium chloride, talc, inorganic oxides or chlorides including one or more metals from Groups 2, 3, 4, 5, 13 or 14 of the Periodic Table, and polymers such as polystyrene, or functionalized and/or crosslinked polymers. Other inorganic oxides that may suitably function as solid supports include, for example, titania, zirconia, boron oxide, zinc oxide, magnesia, or any combination thereof. Combinations of inorganic oxides may be suitably used as solid supports as well. Illustrative combinations of suitable inorganic oxides include, but are not limited to, silica-alumina, silica-titania, silica-zirconia, silica-boron oxide, and the like.

In some embodiments, the first and second non-coordinating anion activators may be disposed on silica or another suitable solid support before being combined with the transition metal complexes disclosed herein. In other embodiments, the transition metal complexes disclosed herein may be disposed upon silica or another suitable support before being combined with the first and second non-coordinating anion activators.

In some embodiments, suitable solid supports may have a surface area ranging from about 1 m$^2$/g to about 1000 m$^2$/g, or about 5 m$^2$/g to about 900 m$^2$/g, or about 50 m$^2$/g to about 500 m$^2$/g, or about 100 m$^2$/g to about 400 m$^2$/g. In some or other embodiments, suitable solid supports may have a pore volume ranging from about 0.01 cm$^3$/g to about 4 cm$^3$/g, or about 0.1 cm$^3$/g to about 3 cm$^3$/g, or about 0.8 cm$^3$/g to about 3 cm$^3$/g, or about 1 cm$^3$/g to about 2.5 cm$^3$/g. In some or other embodiments, suitable solid supports may have an average particle size ranging from about 0.1 µm to about 500 m, or about 0.3 µm to about 400 m, or about 0.5 µm to about 250 m, or about 1 µm to about 200 m, or about 5 µm to about 150 m, or about 10 µm to about 100 µm.

In still other embodiments, the first and second non-coordinating borate activators and the transition metal complex may be unsupported, such that the polymerization reaction is conducted under homogenous polymerization reaction conditions.

Examples of $C_3$-$C_{40}$ alpha olefins that may undergo polymerization according to the disclosure herein are not considered to be particularly limited. In illustrative embodiments, suitable $C_3$-$C_{40}$ alpha olefins may include one or more of propylene, 1-butene, 1-pentene, 1-hexene, 1-heptene, 1-octene, 1-nonene, 1-decene, 1-undecene, 1-dodecene, isomers thereof having a terminal carbon-carbon double bond, and any combination thereof. In more particular embodiments, propylene may be a particularly suitable $C_3$-$C_{40}$ alpha olefin.

Suitable amounts of $C_3$-$C_{40}$ alpha olefins that may be present in the olefinic feed may range from 98.9 to 65 mol. %. In more particular embodiments, the olefinic feed may comprise 65 to 70 mol. % $C_3$-$C_{40}$ alpha olefins, or 70 to 75 mol. % $C_3$-$C_{40}$ alpha olefins, or 75 to 80 mol. % $C_3$-$C_{40}$ alpha olefins, or 80 to 85 mol. % $C_3$-$C_{40}$ alpha olefins, or 85 to 90 mol. % $C_3$-$C_{40}$ alpha olefins, or 90 to 95 mol. % $C_3$-$C_{40}$ alpha olefins, or 90 to 98.9 mol. % $C_3$-$C_{40}$ alpha olefins, or 95 to 98.9 mol. % $C_3$-$C_{40}$ alpha olefins.

Suitable amounts of $C_3$-$C_{40}$ alpha olefins that may be present in the copolymer product may range from 98.9 to 65 mol. %. In more particular embodiments, the copolymer product may comprise 65 to 70 mol. % $C_3$-$C_{40}$ alpha olefins, or 70 to 75 mol. % $C_3$-$C_{40}$ alpha olefins, or 75 to 80 mol. % $C_3$-$C_{40}$ alpha olefins, or 80 to 85 mol. % $C_3$-$C_{40}$ alpha olefins, or 85 to 90 mol. % $C_3$-$C_{40}$ alpha olefins, or 90 to 95 mol. % $C_3$-$C_{40}$ alpha olefins, or 90 to 98.9 mol. % $C_3$-$C_{40}$ alpha olefins, or 95 to 98.9 mol. % $C_3$-$C_{40}$ alpha olefins.

Likewise, suitable diene monomers that may undergo polymerization according to the disclosure herein are not considered to be particularly limited. In illustrative embodiments, suitable diene monomers may be selected from among, for example, 5-ethylidene-2-norbornene, 1,4-hexadiene, 5-methylene-2-norbornene, 1,6-octadiene, 5-methyl-1,4-hexadiene, 3,7-dimethyl-1,6-octadiene, dicyclopentadiene, and any combination thereof. In more particular embodiments, 5-ethylidene-2-norbornene may be a particularly suitable diene monomer.

Suitable amounts of diene monomers that may be present in the olefinic feed may range from 0.1 to 10 mol. %. In more particular embodiments, the olefinic feed may comprise 0.1 to 1.0 mol. % diene monomers, or 1.0 to 2.0 mol. % diene monomers, or 2.0 to 3.0 mol. % diene monomers, or 3.0 to 4.0 mol. % diene monomers, or 4.0 to 5.0 mol. % diene monomers, or 5.0 to 6.0 mol. % diene monomers, or 6.0 to 7.0 mol. % diene monomers, or 7.0 to 8.0 mol. % diene monomers, or 8.0 to 9.0 mol. % diene monomers, or 9.0 to 10.0 mol. % diene monomers.

Suitable amounts of diene monomers that may be present in the copolymer product may range from 0.1 to 10 mol. %. In more particular embodiments, the copolymer product may comprise 0.1 to 1.0 mol. % diene monomers, or 1.0 to 2.0 mol. % diene monomers, or 2.0 to 3.0 mol. % diene monomers, or 3.0 to 4.0 mol. % diene monomers, or 4.0 to 5.0 mol. % diene monomers, or 5.0 to 6.0 mol. % diene monomers, or 6.0 to 7.0 mol. % diene monomers, or 7.0 to 8.0 mol. % diene monomers, or 8.0 to 9.0 mol. % diene monomers, or 9.0 to 10.0 mol. % diene monomers.

Suitable amounts of ethylene that may be present in the olefinic feed may range from 1 to 35 mol. %. In more particular embodiments, the olefinic feed may comprise 1 to 5 mol. % ethylene, or 5 to 10 mol. % ethylene, or 10 to 15 mol. % ethylene, or 15 to 20 mol. % ethylene, or 20 to 25 mol. % ethylene, or 25 to 30 mol. % ethylene, or 30 to 35 mol. % ethylene.

Suitable amounts of ethylene that may be present in the copolymer product may range from 1 to 35 mol. %. In more particular embodiments, the copolymer product may comprise 1 to 5 mol. % ethylene, or 5 to 10 mol. % ethylene, or 10 to 15 mol. % ethylene, or 15 to 20 mol. % ethylene, or 20 to 25 mol. % ethylene, or 25 to 30 mol. % ethylene, or 30 to 35 mol. % ethylene.

In a preferred embodiment of the invention, the copolymer comprises: $C_3$-$C_{40}$ alpha olefins present at 98.9 to 65 mol. %, preferably 98 to 75 mol. %, or 95 to 80 mol. %; diene monomer present at 0.1 to 10 mol. %, preferably 0.5 to 8 mol. %, or 1 to 5 mol. %; and ethylene present at 1 to 35 mol. %, preferably 2 to 25 mol. %, or 5 to 20 mol. %.

Suitable polymerization reaction conditions for use in the disclosure herein may include, for example, any high-pressure, solution, slurry and/or gas phase polymerization process. According to more specific embodiments, the catalyst systems of the present disclosure may be located in a fixed bed, fluidized bed, ebullated bed, slurry bed, trickle bed, or like reactor system when conducting a polymerization reaction.

Polymerization reactions of the present disclosure can be carried out in any manner known in the art. Any suspension, homogeneous, heterogeneous, bulk, solution, slurry, or gas phase polymerization process known in the art can be used. Such processes can be run in a batch, semi-batch, or continuous mode. The term "continuous" means a system that operates without interruption or cessation. For example a continuous process to produce a polymer is one where the reactants are continually introduced into one or more reactors and polymer product is continually withdrawn. Homogeneous polymerization processes and slurry processes are useful. A homogeneous polymerization process is defined to be a process where at least 90 wt. % of the product is soluble in the reaction media. A solution process is particularly preferred. A solution process is defined to be a process where monomer concentration in all feeds to the reactor is from 0.5 vol. % to 70 vol. %, or preferably from 1 vol. % to 30 vol. %. A bulk polymerization process may also be used. A bulk process is defined to be a process where monomer concentration in all feeds to the reactor is 70 vol. % or more. Alternately, no solvent or diluent is present or added in the reaction medium, (except for the small amounts used as the carrier for the catalyst system or other additives, or amounts typically found with the monomer; e.g., propane in propylene). In another embodiment, the polymerization process is a slurry process. As used herein the term "slurry polymerization process" means a polymerization process where a supported catalyst is employed and monomers are polymerized on the supported catalyst particles. At least 95 wt. % of polymer products derived from the supported catalyst are in granular form as solid particles (not dissolved in the diluent).

Other useful polymerization processes include heterogeneous polymerization processes, such as gas phase and slurry phase processes. A heterogeneous process is defined to be a process where the catalyst system is not soluble in the reaction media. Alternatively, in other embodiments, the polymerization process is not homogeneous.

The polymerization process may be performed in the gas phase, preferably, in a fluidized bed gas phase process. Generally, in fluidized bed gas phase processes for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer (see, for example, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228; all of which are fully incorporated herein by reference.) Other additives may also be used in the polymerization process, as desired, such as one or more scavengers, promoters, modifiers, chain transfer agents (such as diethyl zinc), reducing agents, oxidizing agents, hydrogen, aluminum alkyls, or silanes. Other useful chain transfer agents include alkylalumoxanes, or a compound represented by the formula $AlR_3$ or $ZnR_2$ (where each R is, independently, a $C_1$-$C_8$ aliphatic radical, preferably methyl, ethyl, propyl, butyl, pentyl, hexyl octyl or an isomer thereof) or a combination thereof, such as diethyl zinc, methylalumoxane, trimethylaluminum, triisobutylaluminum, trioctylaluminum, or a combination thereof.

Suitable diluents/solvents for polymerization include non-coordinating, inert liquids. Examples include straight and branched-chain hydrocarbons, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof, such as can be found commercially (Isopar™); perhalogenated hydrocarbons, such as perfluorinated $C_{4-10}$ alkanes, chlorobenzene, and aromatic and alkyl-substituted aromatic compounds, such as benzene, toluene, mesitylene, and xylene. Suitable solvents also include liquid olefins which may act as monomers or co-monomers including ethylene, propylene, 1-butene, 1-hexene, 1-pentene, 3-methyl-1-pentene, 4-methyl-1-pentene, 1-octene, 1-decene, and mixtures thereof. In a preferred embodiment, aliphatic hydrocarbon solvents are used as the solvent, such as isobutane, butane, pentane, isopentane, hexanes, isohexane, heptane, octane, dodecane, and mixtures thereof; cyclic and alicyclic hydrocarbons, such as cyclohexane, cycloheptane, methylcyclohexane, methylcycloheptane, and mixtures thereof. In another embodiment, the solvent is not aromatic, preferably aromatics are present in the solvent at less than 1 wt. %, preferably less than 0.5 wt. %, and more preferably 0 wt. % based upon the weight of the solvents.

Typical temperatures and pressures include a temperature in the range of about 80° C. or greater, about 90° C. or more, about 100° C. or more, about 80° C. to about 200° C., or about 90° C. to about 180° C., or about 95° C. to about 160° C., or about 90° C. to about 120° C., or preferably from about 90° C. to about 110° C. and a pressure in the range of about 0.1 MPa to about 17 MPa, about 0.1 MPa to about 10 MPa, preferably from about 0.5 MPa to about 5 MPa, or preferably from about 1 MPa to about 2.5 MPa.

In some embodiments, polymerizations can be run at any temperature and/or pressure suitable to obtain the desired polymers. Typical temperatures and/or pressures include a temperature in the range of from 0° C. to 300° C., such as 20° C. to 200° C., such as 40° C. to 180° C., such as 50° C. to 160° C., such as from 60° C. to 140° C., or such as from 95° C. to 140° C.; and at a pressure from 0.35 MPa to 16 MPa, such as from 0.45 MPa to 13 MPa, such as from 0.5 MPa to 12 MPa, or such as from 2 MPa to 10 MPa, for example 2.2 MPa. In some embodiments of the invention, the pressure is from 0.35 MPa to 17.23 MPa.

In a typical polymerization, the run time of the reaction may be up to 300 minutes, preferably in the range of from about 5 to 250 minutes, or preferably from about 10 to 120 minutes.

Copolymers produced according to the disclosure herein preferably comprise 1 to 35 mol. % ethylene, 98.9 to 65 mol. % $C_3$-$C_{40}$ alpha olefin, particularly propylene, and 0.1 to 10 mol. % diene monomer, and have a melt flow rate (230° C., 2.16 kg) of about 30 g/10 min or below as determined by ASTM D-1238 (230° C., 2.16 kg), preferably 25 g/10 min or less, preferably 20 g/10 min or less, preferably 15 g/10 min or less, preferably 12 g/10 min or less, preferably 10 g/10 min or less, preferably 8 g/10 min or less, or preferably 5 g/10 min or less.

Copolymers produced in accordance with the disclosure herein have a melt flow rate (230° C., 2.16 kg) of about 30 g/10 min or below as determined by ASTM D-1238 (230° C., 2.16 kg), preferably 25 g/10 min or less, preferably 20 g/10 min or less, preferably 15 g/10 min or less, preferably 12 g/10 min or less, preferably 10 g/10 min or less, preferably 8 g/10 min or less, preferably 5 g/10 min or less, or preferably 0.01 to 5 g/10 min.

Copolymers produced in accordance with the disclosure herein may feature an Mn value of about 60,000 g/mol or above, an Mw value of about 130,000 g/mol or above, and/or an Mz value of about 220,000 g/mol or above as determined by GPC-4D analysis, as explained further herein below.

In some embodiments, copolymers produced using the catalyst systems and methods of the present disclosure may have a weight average molecular weight (Mw) of 130,000 g/mol to 500,000 g/mol, alternately 140,000 g/mol to 400,000 g/mol, alternately 150,000 g/mol to 300,000 g/mol, or alternately 160,000 g/mol to 300,000 g/mol, as determined by GPC-4D analysis, as described below.

In some embodiments, copolymers produced using the catalyst systems and methods of the present disclosure may have a number average molecular weight (Mn) of 60,000 g/mol to 150,000 g/mol, alternately 70,000 g/mol to 140,000 g/mol, or alternately 75,000 g/mol to 130,000 g/mol, as determined by GPC-4D analysis, as described below.

In some embodiments, copolymers produced using the catalyst systems and methods of the present disclosure may have a z average molecular weight (Mz) of 220,000 g/mol to 600,000 g/mol, alternately 275,000 g/mol to 550,000 g/mol, or alternately 300,000 g/mol to 500,000 g/mol, as determined by the GPC-4D analysis, as described below.

In addition to molecular weight and melt flow rates, copolymers produced according to the present disclosure may be characterized by additional physical property measurements, as discussed hereinafter.

In some embodiments, copolymers produced using the catalyst systems and methods of the present disclosure may have a ratio of weight average molecular weight to number average molecular weight (Mw/Mn) of greater than 2 to about 10, or greater than 2.1 to about 8, or greater than 2.2 to about 7, or greater than 2.2 to about 5, as determined by GPC-4D analysis, as described below.

In some embodiments, copolymers produced using the catalyst systems and methods of the present disclosure may have a ratio of z-average molecular weight to weight average molecular weight (Mz/Mw) of greater than 1.5, or greater than 1.6, or greater than 1.7, or from about 1.5 to about 4.0, or from about 1.6 to about 3.8, or from about 1.7 to about 3.6, as determined by GPC-4D analysis, as described below.

In some embodiments, copolymers produced using the catalyst systems and methods of the present disclosure may have a ratio of z-average molecular weight to number average molecular weight (Mz/Mn) of 2 or greater, or from about 3 to about 10, or from about 3 to about 5, as determined by GPC-4D analysis, as described below.

In some embodiments, copolymers produced using the catalyst systems and methods of the present disclosure may have a g'(vis) of 0.900 or greater, alternatively, 0.930 or greater, alternatively, 0.940 or greater, and alternatively 0.980 or greater, as determined by GPC-4D analysis, described below.

The foregoing properties of the copolymers obtained herein may be obtained singularly or in combination with any two or more of each other for a given copolymer.

Processing of the copolymers produced in accordance with the disclosure herein may further take place following the polymerization reaction. Suitable processing operations may include, for example, blending or co-extrusion with any other polymer. Non-limiting examples of other polymers include linear low density polyethylenes, elastomers, plastomers, high pressure low density polyethylene, high density polyethylenes, polypropylenes and the like. The terpolymers formed according to the present disclosure may also be blended with additives to form compositions that can then be used in articles of manufacture. Suitable additives may include antioxidants, nucleating agents, acid scavengers, plasticizers, stabilizers, anticorrosion agents, blowing agents, ultraviolet light absorbers, quenchers, antistatic agents, slip agents, phosphites, phenolics, pigments, dyes and fillers and cure agents such as peroxide. The terpolymers of the present disclosure may be particularly useful as a tire tread additive.

Unless otherwise indicated herein, the distribution and moments of molecular weight (e.g., Mw, Mn, Mz, Mw/Mn, etc.), the co-monomer content ($C_2$, $C_3$, $C_6$, etc.), and the branching index (g') of the polymers produced herein are to be determined by using a high temperature Gel Permeation Chromatography (Polymer Char GPC-IR) instrument equipped with a multi-channel band filter based Infrared detector IR5, an 18-angle light scattering detector, and a viscometer (GPC-4D). For measurements herein, three Agilent PLgel 10-μm Mixed-B LS columns were used to affect polymer separation. Aldrich reagent grade 1,2,4-trichlorobenzene (TCB) containing 300 ppm butylated hydroxytoluene (BHT) as an antioxidant stabilizer was used as the mobile phase. The TCB mixture was filtered through a 0.1-μm Teflon filter and degassed with an online degasser before entering the GPC instrument. The nominal flow rate was 1.0 mL/min, and the nominal injection volume was 200 μL. The whole system including transfer lines, columns, and detectors was housed in an oven maintained at 145° C. To conduct an analysis, a given amount of polymer sample was weighed and sealed in a standard vial with 80 μL of heptane flow marker added to the sealed sample. After loading the vial in the autosampler, the polymer was automatically dissolved in the instrument with 8 mL added TCB solvent. The polymer was dissolved at 160° C. with continuous shaking for about 1 hour for most polyethylene samples or for about 2 hours for polypropylene samples. The TCB densities used to calculate concentrations are 1.463 g/mL at room temperature and 1.284 g/mL at 145° C. The sample concentrations ranged from 0.2 to 2.0 mg/mL, with lower concentrations being used for higher molecular weight samples.

The concentration at each point in the chromatogram was calculated from the baseline-subtracted IR5 broadband signal intensity (I) using Equation 1, $$c = \beta I \qquad \text{(Equation 1)}$$

where c is the concentration and β is the mass constant. The mass recovery was calculated from the ratio of the integrated area of the concentration chromatograph over elution volume and the injection mass, which is equal to the predetermined concentration multiplied by the injection loop volume. The conventional molecular weight (IR MW) was determined by combining a universal calibration relationship with the column calibration, which is performed with a series of monodispersed polystyrene (PS) standards ranging from 700 to 10M g/mole. The molecular weight at each elution volume was calculated with Equation 2, $$\log M = \frac{\log(K_{PS}/K)}{\alpha+1} + \frac{\alpha_{PS}+1}{\alpha+1} \log M_{PS} \qquad \text{(Equation 2)}$$

where the variables with a "PS" subscript stand for polystyrene while those without a subscript are for the test samples. In this method, $\alpha_{PS}$=0.67 and $K_{PS}$=0.000175, while α and K for other materials are as calculated and published in literature (see Sun, T. et al. *Macromolecules* 2001, 34, 6812), except that for purposes of this disclosure and claims thereto, unless otherwise indicated, α=0.695+(0.01*(wt. fraction propylene)) and K=0.000579−(0.0003502*(wt. fraction propylene)) for ethylene-propylene copolymers and ethylene-propylene-diene terpolymers, α=0.695 and K=0.000579 for linear ethylene polymers, α=0.705 and K=0.0002288 for linear propylene polymers, α=0.695 and K=0.000181 for linear butene polymers, α is 0.695 and K is 0.000579*(1−0.0087*w2b+0.000018*(w2b)^2) for ethylene-butene copolymer where w2b is a bulk weight percent of butene comonomer, α is 0.695 and K is 0.000579*(1−0.0075*w2b) for ethylene-hexene copolymer where w2b is a bulk weight percent of hexene comonomer, and α is 0.695 and K is 0.000579*(1−0.0077*w2b) for ethylene-octene copolymer where w2b is a bulk weight percent of octene comonomer. Concentrations are expressed in g/cm³, molecular weight is expressed in g/mole, and intrinsic viscosity (hence K in the Mark-Houwink equation) is expressed in dL/g unless otherwise noted. Values used for certain propylene-ethylene-ENB polymers prepared herein are shown below.

The co-monomer composition may be determined by the ratio of the IR5 detector intensity corresponding to the $CH_2$ and $CH_3$ channel calibrated with a series of PE and PP homopolymer/copolymer standards whose nominal values are predetermined by NMR or FTIR. In particular, this calculation provides the amount of methyl groups per 1000 total carbons ($CH_3$/1000TC) as a function of molecular weight. The short-chain branch (SCB) content per 1000TC (SCB/1000TC) is then computed as a function of molecular weight by applying a chain-end correction to the $CH_3$/1000TC function, assuming each chain to be linear and terminated by a methyl group at each end. The weight percent w2 of co-monomer is then obtained from Equation 3, in which ƒ is 0.3, 0.4, 0.6, 0.8, . . . for C3, C4, C6, C8, . . . co-monomers, respectively.

$$w2 = f * SCB/1000TC \qquad \text{(Equation 3)}$$

Alternately, the co-monomer composition may be determined through analysis of the FTIR spectrum of the copolymer by measuring peak intensities associated with the different co-monomers. Ethylene content may be assessed according to ASTM D3900. Ethylidenenorbornene (ENB) content may be determined using FTIR according to ASTM D6047.

The bulk composition of the polymer from the GPC-IR and GPC-4D analyses was obtained by considering the entire signals of the $CH_3$ and $CH_2$ channels between the integration limits of the concentration chromatogram. First, the following ratio was obtained (Equation 4).

$$\text{Bulk } IR \text{ ratio} = \frac{\text{Area of } CH_3 \text{ signal within integration limits}}{\text{Area of } CH_2 \text{ signal within integration limits}} \qquad \text{(Equation 4)}$$

The same calibration of the $CH_3$ and $CH_2$ signal ratio, as mentioned previously in obtaining the CH3/1000TC as a function of molecular weight, was then applied to obtain the bulk CH3/1000TC. A bulk methyl chain ends per 1000TC (bulk CH3 end/1000TC) was obtained by weight-averaging the chain-end correction over the molecular-weight range using Equations 5 and 6.

$$w2b = f * \text{bulk CH3/1000TC} \qquad \text{(Equation 5)}$$

$$\text{bulk SCB/1000TC} = \text{bulk CH3/1000TC} - \text{bulk CH3end/1000TC} \qquad \text{(Equation 6)}$$

The bulk SCB/1000TC was converted to bulk w2 in the same manner as described above.

The LS detector was an 18-angle Wyatt Technology High Temperature DAWN HELEOSII. The LS molecular weight (M) at each point in the chromatogram was determined by analyzing the LS output using the Zimm model for static light scattering (*Light Scattering from Polymer Solutions*; Huglin, M. B., Ed.; Academic Press, 1972), as shown for Equation 7.

$$\frac{K_o c}{\Delta R(\theta)} = \frac{1}{MP(\theta)} + 2A_2 c \qquad \text{(Equation 7)}$$

In Equation 7, $\Delta R(\theta)$ is the measured excess Rayleigh scattering intensity at scattering angle θ, c is the polymer concentration determined from the IR5 analysis, $A_2$ is the second virial coefficient, $P(\theta)$ is the form factor for a monodisperse random coil, and $K_O$ is the optical constant for the system as expressed by Equation 8

$$K_o = \frac{4\pi^2 n^2 (dn/dc)^2}{\lambda^4 N_A} \qquad \text{(Equation 8)}$$

In Equation 8, NA is Avogadro's number, and (dn/dc) is the refractive index increment for the system. The refractive index, n, is 1.500 for TCB at 145° C. and λ=665 nm. For analyzing polyethylene homopolymers, ethylene-hexene copolymers, and ethylene-octene copolymers, dn/dc=0.1048 ml/mg and $A_2$=0.0015; for analyzing ethylene-butylene copolymers, dn/dc=0.1048[1−0.00126(w2)] ml/mg and $A_2$=0.0015, where w2 is weight percent butylene co-monomer.

A high temperature Agilent (or Viscotek Corporation) viscometer, which has four capillaries arranged in a Wheatstone bridge configuration with two pressure transducers, was used to determine specific viscosity. One transducer measures the total pressure drop across the detector, and the other, positioned between the two sides of the bridge, measures a differential pressure. The specific viscosity, $\eta_s$, for the solution flowing through the viscometer was calculated from their outputs. The intrinsic viscosity, $[\eta]$, at each point in the chromatogram was calculated from the equation $[\eta]=\eta_s/c$, where c is concentration and is determined from the IR5 broadband channel output. The viscosity MW at each point was calculated as $M=K_{PS}M^{\alpha_{PS}+1}/[\eta]$, where $\alpha_{ps}$ is 0.67 and $K_{ps}$ is 0.000175.

The branching index ($g'_{vis}$) was calculated using the output of the GPC-IR5-LS-VIS method as follows. The average intrinsic viscosity, $[\eta]_{avg}$, of the sample was first calculated using Equation 9, $$[\eta]_{avg} = \frac{\sum c_i [\eta]_i}{\sum c_i} \quad \text{(Equation 9)}$$

where the summations are over the chromatographic slices, i, between the integration limits. The branching index $g'_{vis}$ is defined by Equation 10, $$g'_{vis} = \frac{[\eta]_{avg}}{KM_v^{\alpha}} \quad \text{(Equation 10)}$$

where $M_v$ is the viscosity-average molecular weight based on molecular weights determined by LS analysis and K and $\alpha$ are for the reference linear polymer and for purposes of this disclosure and claims thereto are as described above.

This invention further relates to:

A. Polymerization methods. The methods comprise: 1) contacting a catalyst system with an olefinic feed comprising a $C_3$-$C_{40}$ alpha olefin, ethylene, and a diene monomer under polymerization reaction conditions where the $C_3$-$C_{40}$ alpha olefin is present in the olefinic feed in a molar excess relative to a combined molar amount of the ethylene and the diene monomer, the catalyst system comprising a first non-coordinating anion activator, a second non-coordinating anion activator differing from the first non-coordinating anion activator, and a transition metal complex represented by the formula:

$$T_yCp'_mMG_nX_q$$

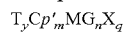

wherein:
M is a group 3, 4, 5, or 6 transition metal;
Cp' is an optionally substituted tetrahydro-s-indacenyl or tetrahydro-as-indacenyl group;
G is a heteroatom group having a formula of $JR'_{z-y}$;
wherein J is N, P, O or S, R' is a $C_1$ to $C_{100}$ optionally substituted hydrocarbyl, halocarbyl, silylcarbyl or germylcarbyl group, and z is 2 when J is N or P, and z is 1 when J is O or S;
T is a bridging group and y is 0 or 1 indicating the absence (y=0) or presence (y=1) of T;
each X is, independently, a leaving group, or two Xs are joined and bound to the metal atom to form a metallocycle ring, or two Xs are joined to form a chelating ligand, a diene ligand, or an alkylidene;
m=1;
n=1, 2 or 3;
q=1, 2 or 3;
wherein a sum of m+n+q is equal to the oxidation state of M; and 2) obtaining a copolymer comprising 1 to 35 mol. % ethylene, 98.9 to 65 mol. % $C_3$-$C_{40}$ olefin, and 0.1 to 10 mol. % diene monomer having an MFR of 30 g/10 min or below.

B. PEDM copolymers. The copolymers comprise: 1 to 35 mol. % ethylene; 98.9 to 65 mol. % $C_3$-$C_{40}$ alpha olefin; and 0.1 to 10 mol. % diene monomer, and having a melt flow rate of 30 g/10 min or more (ASTM D 1238, 230° C., 2.16 kg).

C. Catalyst systems. The catalyst systems comprise: a first non-coordinating anion borate activator; a second non-coordinating anion borate activator differing from the first non-coordinating anion borate activator; and a transition metal complex represented by the formula:

$$T_yCp'_mMG_nX_q$$

wherein:
M is a group 3, 4, 5, or 6 transition metal;
Cp' is an optionally substituted tetrahydro-s-indacenyl or tetrahydro-as-indacenyl group;
G is a heteroatom group having a formula of $JR'_{z-y}$;
wherein J is N, P, O or S, and z is 2 when J is N or P, and z is 1 when J is O or S, and R' is a $C_1$ to $C_{100}$ optionally substituted hydrocarbyl, halocarbyl, silylcarbyl or germylcarbyl group;
T is a bridging group and y is 0 or 1 indicating the absence (y=0) or presence (y=1) of T;
each X is, independently, a leaving group, or two Xs are joined and bound to the metal atom to form a metallocycle ring, or two Xs are joined to form a chelating ligand, a diene ligand, or an alkylidene;
m=1;
n=1, 2 or 3; and
q=1, 2 or 3;
wherein a sum of m+n+q is equal to the oxidation state of M; and
wherein the first non-coordinating anion borate activator and the second non-coordinating anion borate activator are present in a molar ratio such that a melt flow rate for a polymer formed under polymerization reaction conditions in the presence of the catalyst system changes non-linearly as a function of the molar ratio of the first non-coordinating anion borate activator to the second non-coordinating anion borate activator.

Embodiments A-C may have one or more of the following additional elements in any combination:

Element 1: wherein the transition metal complex comprises a tetrahydro-as-indacenyl group represented by the formula:

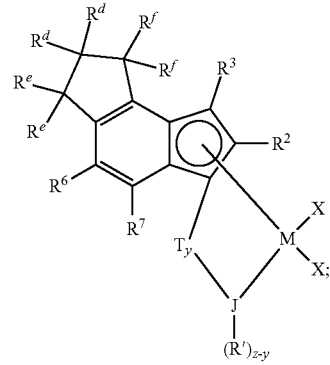

wherein:

M is a group 4 transition metal;

each $R^d$, $R^e$ and $R^f$ is independently hydrogen or a $C_1$-$C_{10}$ alkyl group;

each $R^2$, $R^3$, $R^6$, and $R^7$ is independently hydrogen or a $C_1$-$C_{50}$ optionally substituted hydrocarbyl, halocarbyl, silylcarbyl or germylcarbyl group;

J is N, P, O or S, and z is 2 when J is N or P, and z is 1 when J is O or S, R' is a $C_1$ to $C_{100}$ optionally substituted hydrocarbyl, halocarbyl, silylcarbyl or germylcarbyl group;

T is a bridging group and y is 0 or 1 indicating the absence (y=0) or presence (y=1) of T; and each X is, independently, a leaving group, or two Xs are joined and bound to the metal atom to form a metallocycle ring, or two Xs are joined to form a chelating ligand, a diene ligand, or an alkylidene.

Element 2: wherein the transition metal complex comprises a tetrahydro-s-indacenyl group represented by the formula:

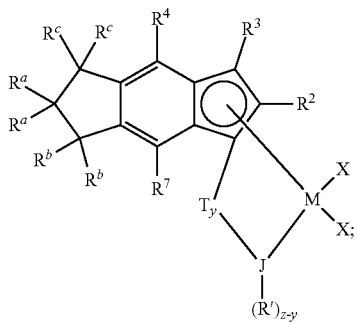

wherein:

M is a group 4 transition metal;

each $R^a$ is independently a $C_1$-$C_{10}$ alkyl group;

each $R^b$ and $R^c$ is independently hydrogen or a $C_1$-$C_{10}$ alkyl group;

each $R^2$, $R^3$, $R^4$ and $R^7$ is independently hydrogen or a $C_1$-$C_{50}$ optionally substituted hydrocarbyl, halocarbyl, silylcarbyl or germylcarbyl group, optionally provided that:

1) $R^3$ and/or $R^4$ are not aryl or substituted aryl,
2) $R^3$ is not directly bonded to a group 15 or 16 heteroatom, and
3) adjacent $R^4$, $R^c$, $R^a$ $R^b$, or $R^7$ do not join together to form a fused ring system;

J is N, P, O or S, and z is 2 when J is N or P, and z is 1 when J is O or S, R' is a $C_1$ to $C_{100}$ optionally substituted hydrocarbyl, halocarbyl, silylcarbyl or germylcarbyl group;

T is a bridging group and y is 0 or 1 indicating the absence (y=0) or presence (y=1) of T; and each X is, independently, a leaving group, or two Xs are joined and bound to the metal atom to form a metallocycle ring, or two Xs are joined to form a chelating ligand, a diene ligand, or an alkylidene.

Element 3: wherein the polymerization reaction occurs at 80° C. or more, preferably 90° C. or more.

Element 4: wherein the molar ratio of the first non-coordinating anion activator to the second non-coordinating anion activator ranges from 1:99 to 99:1, preferably from 1:3 to 3:1.

Element 5: wherein each $R^a$ is methyl and each $R^b$ and $R^c$ are hydrogen.

Element 6: wherein $R^2$ is methyl, ethyl, propyl, butyl, pentyl, hexyl, heptyl, octyl, nonyl, decyl, undecyl, dodecyl or an isomer thereof, and $R^3$, $R^4$ and $R^7$ are all hydrogen.

Element 7: wherein each $R^d$ is methyl and each $R^e$ and $R^f$ are hydrogen.

Element 8: wherein $R^2$ is methyl, ethyl, propyl, butyl, pentyl, hexyl, heptyl, octyl, nonyl, decyl, undecyl, dodecyl or an isomer thereof, and $R^3$, $R^6$, and $R^7$ are all hydrogen.

Element 9: wherein $R^2$ is methyl and y is 1.

Element 10: wherein y is 1 and T is $(CR^8R^9)_x$, $SiR^8R^9$, or $GeR^8R^9$; wherein x is 1 or 2, and $R^8$ and $R^9$ are independently hydrogen or an optionally substituted hydrocarbyl, halocarbyl, silylcarbyl, or germylcarbyl group and $R^8$ and $R^9$ are optionally bonded together to form a ring structure.

Element 11: wherein M is Ti.

Element 12: wherein J is N.

Element 13: wherein R' is methyl, ethyl, propyl, butyl, pentyl, hexyl, heptyl, octyl, nonyl, decyl, undecyl, dodecyl, phenyl or an isomer thereof.

Element 14: wherein R' is t-butyl, neopentyl, cyclohexyl, cyclooctyl, cyclododecyl, adamantyl, or norbornyl.

Element 15: wherein each X is independently selected from the group consisting of a $C_1$-$C_{20}$ hydrocarbyl group, an aryl group, a hydride, an amide, an alkoxide, a sulfide, a phosphide, a halide, an amine, a phosphine, an ether, and any combination thereof.

Element 16: wherein each X is independently selected from the group consisting of a $C_1$-$C_5$ alkyl group, a halide, and an aryl group.

Element 17: wherein the transition metal complex is selected from the group consisting of dimethylsilylene(2,6,6-trimethyl-1,5,6,7-tetrahydro-s-indacen-1-yl)(t-butylamido)M(R)$_2$; dimethylsilylene(6,6-dimethyl-1,5,6,7-tetrahydro-s-indacen-1-yl)(t-butylamido)M(R)$_2$; dimethylsilylene(2,7,7-trimethyl-3,6,7,8-tetrahydro-as-indacen-3-yl)(t-butylamido)M(R)$_2$; dimethylsilylene(7,7-dimethyl-3,6,7,8-tetrahydro-as-indacen-3-yl)(t-butylamido)M(R)$_2$; dimethylsilylene(2,6,6-trimethyl-1,5,6,7-tetrahydro-s-indacen-1-yl)(cyclododecylamido)M(R)$_2$; dimethylsilylene(6,6-dimethyl-1,5,6,7-tetrahydro-s-indacen-1-yl)(cyclododecylamido)M(R)$_2$; dimethylsilylene(2,7,7-trimethyl-3,6,7,8-tetrahydro-as-indacen-3-yl)(cyclododecylamido)M(R)$_2$; dimethylsilylene(7,7-dimethyl-3,6,7,8-tetrahydro-as-indacen-3-yl)(cyclododecylamido)M(R)$_2$; dimethylsilylene(2,6,6-trimethyl-1,5,6,7-tetrahydro-s-indacen-1-yl)(cyclohexylamido)M(R)$_2$; dimethylsilylene(6,6-dimethyl-1,5,6,7-tetrahydro-s-indacen-1-yl)(cyclohexylamido)M(R)$_2$; dimethylsilylene(2,7,7-trimethyl-3,6,7,8-tetrahydro-as-indacen-3-yl)(cyclohexylamido)M(R)$_2$; dimethylsilylene(7,7-dimethyl-3,6,7,8-tetrahydro-as-indacen-3-yl)(cyclohexylamido)M(R)$_2$; dimethylsilylene(2,6,6-trimethyl-1,5,6,7-tetrahydro-s-indacen-1-yl)(adamantylamido)M(R)$_2$; dimethylsilylene(6,6-dimethyl-1,5,6,7-tetrahydro-s-indacen-1-yl)(adamantylamido)M(R)$_2$; dimethylsilylene(2,7,7-trimethyl-3,6,7,8-tetrahydro-as-indacen-3-yl)(adamantylamido)M(R)$_2$; dimethylsilylene(7,7-dimethyl-3,6,7,8-tetrahydro-as-indacen-3-yl)(adamantylamido)M(R)$_2$; dimethylsilylene(2,6,6-trimethyl-1,5,6,7-tetrahydro-s-indacen-1-yl)(neopentylamido)M(R)$_2$; dimethylsilylene(6,6-dimethyl-1,5,6,7-tetrahydro-s-indacen-1-yl)(neopentylamido)M(R)$_2$; dimethylsilylene(2,7,7-trimethyl-3,6,7,8-tetrahydro-as-indacen-3-yl)(neopentylamido)M(R)$_2$; dimethylsilylene(7,7-dimethyl-3,6,7,8-tetrahydro-as-indacen-3-yl)(neopentylamido)M(R)$_2$; dimethylsilylene(2- methyl-6,6-diethyl-1,5,6,7-tetrahydro-s-indacen-1-yl)(t-butylamido)M(R)$_2$; dimethylsilylene(6,6-diethyl-1,5,6,7-tetrahydro-s-indacen-1-yl)(t-butylamido)M(R)$_2$; dimethylsilylene(2-methyl-7,7-diethyl-3,6,7,8-tetrahydro-as-indacen-3-yl)(t-butylamido)M(R)$_2$; dimethylsilylene(7,7-diethyl-3,6,7,8-tetrahydro-as-indacen-3-yl)(t-butylamido)M(R)$_2$; dimethylsilylene(2-methyl-6,6-diethyl-1,5,6,7-tetrahydro-s-indacen-1-yl)(cyclododecylamido)M(R)$_2$; dimethylsilylene(6,6-diethyl-1,5,6,7-tetrahydro-s-indacen-1-yl)(cyclododecylamido)M(R)$_2$; dimethylsilylene(2-methyl-7,7-diethyl-3,6,7,8-tetrahydro-as-indacen-3-yl)(cyclododecylamido)M(R)$_2$; dimethylsilylene(7,7-dimethyl-3,6,7,8-tetrahydro-as-indacen-3-yl)(cyclododecylamido)M(R)$_2$; diethylsilylene(2,6,6-trimethyl-1,5,6,7-tetrahydro-s-indacen-1-yl)(t-butylamido)M(R)$_2$; diethylsilylene(6,6-dimethyl-1,5,6,7-tetrahydro-s-indacen-1-yl)(t-butylamido)M(R)$_2$; diethylsilylene(2,7,7-trimethyl-3,6,7,8-tetrahydro-as-indacen-3-yl)(t-butylamido)M(R)$_2$; diethylsilylene(7,7-dimethyl-3,6,7,8-tetrahydro-as-indacen-3-yl)(t-butylamido)M(R)$_2$; dimethylsilylene(2-methyl-3,6,7,8-tetrahydro-as-indacen-3-yl)(cyclohexylamido)M(R)$_2$; dimethylsilylene(2-methyl-3,6,7,8-tetrahydro-as-indacen-3-yl)(cyclododecylamido)M(R)$_2$; dimethylsilylene(2-methyl-3,6,7,8-tetrahydro-as-indacen-3-yl)(adamantylamido)M(R)$_2$; and dimethylsilylene(2-methyl-3,6,7,8-tetrahydro-as-indacen-3-yl)(t-butylamido)M(R)$_2$; wherein M is Ti, Zr or Hf, and R is a halogen or a $C_1$ to $C_{10}$ hydrocarbyl.

Element 18: wherein the transition metal complex is dimethylsilylene(2,7,7-trimethyl-3,6,7,8-tetrahydro-as-indacen-3-yl)(t-butylamido)titanium dimethyl or dimethylsilylene(2,6,6-trimethyl-1,5,6,7-tetrahydro-s-indacen-1-yl)(t-butylamido)titanium dimethyl.

Element 19: wherein the first non-coordinating anion activator and the second non-coordinating anion activator are selected from the group consisting of: N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl) borate, triphenylcarbenium tetrakis(perfluoronaphthyl) borate, triphenylcarbenium tetrakis(perfluorobiphenyl) borate, triphenylcarbenium tetrakis(3,5-bis(trifluoromethyl) phenyl)borate, triphenylcarbenium tetrakis (perfluorophenyl)borate, [Me$_3$NH$^+$][B(C$_6$F$_5$)$^{4-}$], 1-(4-(tris (pentafluorophenyl)borate)-2,3,5,6-tetrafluorophenyl) pyrrolidinium; [Me$_3$NH$^+$][B(C$_6$F$_5$)$^{4-}$], 1-(4-(tris(pentafluorophenyl)borate)-2,3,5,6-tetrafluorophenyl) pyrrolidinium, sodium tetrakis(pentafluorophenyl)borate, potassium tetrakis(pentafluorophenyl)borate, and 4-(tris(pentafluorophenyl) borate)-2,3,5,6-tetrafluoropyridinium.

Element 20: wherein the first non-coordinating anion activator is N,N-dimethylanilinium tetrakis(pentafluorophenyl)borate and the second non-coordinating anion activator is N,N-dimethylaniliniumtetrakis(perfluoronaphthyl)borate.

Element 21: wherein the first non-coordinating anion activator is present in a molar excess with respect to the second non-coordinating anion activator.

Element 22: wherein the molar ratio of the first non-coordinating anion activator to the second non-coordinating anion activator ranges from 1:99 to 99:1.

Element 23: wherein the molar ratio of the first non-coordinating anion activator to the second non-coordinating anion activator ranges from 1:3 to 3:1.

Element 24: wherein the $C_3$-$C_{40}$ alpha olefin is selected from the group consisting of propylene, 1-butene, 1-pentene, 1-hexene, 1-heptene, 1-octene, 1-nonene, 1-decene, 1-undecene, 1-dodecene, isomers thereof having a terminal carbon-carbon double bond, and any combination thereof.

Element 25: wherein the $C_3$-$C_{20}$ alpha olefin is propylene.

Element 26: wherein the diene monomer is selected from the group consisting of 5-ethylidene-2-norbornene, 1,4-hexadiene, 5-methylene-2-norbornene, 1,6-octadiene, 5-methyl-1,4-hexadiene, 3,7-dimethyl-1,6-octadiene, dicyclopentadiene, and any combination thereof.

Element 27: wherein the diene monomer is 5-ethylidene-2-norbornene.

Element 28: wherein the catalyst system has a catalytic efficiency of at least about 25,000 g terpolymer/g transition metal complex.

Element 29: wherein the copolymer has an Mn value of about 60,000 g/mol or above, a Mw value of about 150,000 g/mol or above, and/or an Mz value of about 220,000 g/mol or above.

Element 30: wherein contacting the olefinic feed with the catalyst system takes place at a temperature of about 80° C. or greater.

Element 31: wherein the first non-coordinating anion activator and the second non-coordinating anion activator interact synergistically under the polymerization reaction conditions such that the melt flow rate changes non-linearly as a function of the molar ratio of the first non-coordinating anion activator to the second non-coordinating anion activator, when measured under the same polymerization conditions, except for having different activator ratios.

Element 32: wherein the copolymer has an Mn value of about 60,000 g/mol or above, a Mw value of about 150,000 g/mol or above, and/or an Mz value of about 220,000 g/mol or above.

Element 33: wherein the copolymer comprises 98.9 to 85 mol. % $C_3$-$C_{40}$ alpha olefin.

Element 34: wherein the $C_3$-$C_{40}$ alpha olefin is selected from the group consisting of propylene, 1-butene, 1-pentene, 1-hexene, 1-heptene, 1-octene, 1-nonene, 1-decene, 1-undecene, 1-dodecene, isomers thereof having a terminal double bond, and any combination thereof.

Element 35: wherein the $C_3$-$C_{20}$ alpha olefin is propylene.

Element 36: wherein the diene monomer is selected from the group consisting of 5-ethylidene-2-norbornene, 1,4-hexadiene, 5-methylene-2-norbornene, 1,6-octadiene, 5-methyl-1,4-hexadiene, 3,7-dimethyl-1,6-octadiene, dicyclopentadiene, and any combination thereof.

Element 37: wherein the diene monomer is 5-ethylidene-2-norbornene.

Element 38: wherein Cp' is a tetrahydro-s-indacenyl group, and wherein: 1) the 3- and/or 4-positions of the tetrahydro-s-indacenyl group are not substituted with an aryl or substituted aryl group, 2) the 3-position of the tetrahydro-s-indacenyl group is not directly bonded to a group 15 or group 16 heteroatom, 3) no additional rings are fused to the tetrahydro-s-indacenyl group, 4) T is not bonded to the 2-position of the tetrahydro-s-indacenyl group, and 5) the 5-, 6-, or 7-position of the tetrahydro-s-indacenyl group is geminally disubstituted.

Element 39: wherein the transition metal complex is represented by the formula:

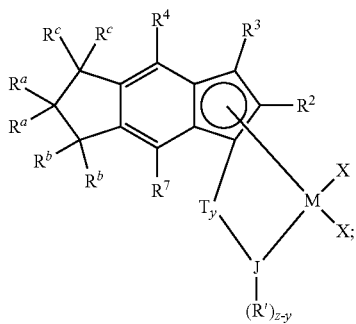

wherein:
M is a group 4 transition metal;
each $R^a$ is independently a $C_1$-$C_{10}$ alkyl group;
each $R^b$ and $R^c$ is independently hydrogen or a $C_1$-$C_{10}$ alkyl group;
each $R^2$, $R^3$, $R^4$ and $R^7$ is independently hydrogen or a $C_1$-$C_{50}$ optionally substituted hydrocarbyl, halocarbyl, silylcarbyl or germylcarbyl group, optionally provided that:
1) $R^3$ and/or $R^4$ are not aryl or substituted aryl,
2) $R^3$ is not directly bonded to a group 15 or 16 heteroatom, and
3) adjacent $R^4$, $R^c$, $R^a$ $R^b$, or $R^7$ do not join together to form a fused ring system;

J is N, P, O or S, and z is 2 when J is N or P, and z is 1 when J is O or S,
R' is a $C_1$ to $C_{100}$ optionally substituted hydrocarbyl, halocarbyl, silylcarbyl or germylcarbyl group;
T is a bridging group and y is 0 or 1 indicating the absence (y=0) or presence (y=1) of T; and
each X is, independently, a leaving group, or two Xs are joined and bound to the metal atom to form a metallocycle ring, or two Xs are joined to form a chelating ligand, a diene ligand, or an alkylidene.

Element 39: wherein each $R^a$ is methyl and $R^b$ and $R^c$ are both hydrogen.
Element 40: The catalyst system of claim 42 or 43, wherein $R^2$ is methyl, ethyl, propyl, butyl, pentyl, hexyl, heptyl, octyl, nonyl, decyl, undecyl, dodecyl or an isomer thereof, and $R^3$, $R^4$ and $R^7$ are all hydrogen.
Element 41: The catalyst system of claim 40, wherein the transition metal complex is represented by the formula:

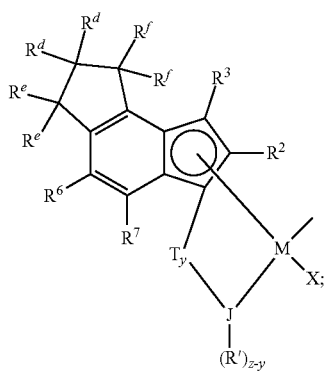

wherein:
M is a group 4 transition metal;
each $R^d$, $R^e$ and $R^f$ is independently hydrogen or a $C_1$-$C_{10}$ alkyl group;
each $R^2$, $R^3$, $R^6$, and $R^7$ is independently hydrogen or a $C_1$-$C_{50}$ optionally substituted hydrocarbyl, halocarbyl, silylcarbyl or germylcarbyl group;
J is N, P, O or S, and z is 2 when J is N or P, and z is 1 when J is O or S,
R' is a $C_1$ to $C_{100}$ optionally substituted hydrocarbyl, halocarbyl, silylcarbyl or germylcarbyl group;
T is a bridging group and y is 0 or 1 indicating the absence (y=0) or presence (y=1) of T; and
each X is, independently, a leaving group, or two Xs are joined and bound to the metal atom to form a metallocycle ring, or two Xs are joined to form a chelating ligand, a diene ligand, or an alkylidene.

Element 44: wherein each $R^d$ is methyl and $R^e$ and $R^f$ are both hydrogen.
Element 45: wherein $R^2$ is methyl, ethyl, propyl, butyl, pentyl, hexyl, heptyl, octyl, nonyl, decyl, undecyl, dodecyl or an isomer thereof, and $R^3$, $R^6$, and $R^7$ are all hydrogen.
Element 46: wherein $R^2$ is methyl.
Element 47: wherein y is 1.
Element 48: wherein y is 1 and T is $(CR^8R^9)_x$, $SiR^8R^9$, or $GeR^8R^9$; wherein x is 1 or 2, and $R^8$ and $R^9$ are independently hydrogen or an optionally substituted hydrocarbyl, halocarbyl, silylcarbyl, or germylcarbyl group, $R^8$ and $R^9$ are optionally bonded together to form a ring structure.
Element 49: wherein M is Ti.
Element 50: wherein J is N.
Element 51: wherein R' is methyl, ethyl, propyl, butyl, pentyl, hexyl, heptyl, octyl, nonyl, decyl, undecyl, dodecyl, phenyl or an isomer thereof.
Element 53: wherein R' is t-butyl, neopentyl, cyclohexyl, cyclooctyl, cyclododecyl, adamantyl, or norbornyl.
Element 54: wherein each X is independently selected from the group consisting of a $C_1$-$C_{20}$ hydrocarbyl group, an aryl group, a hydride, an amide, an alkoxide, a sulfide, a phosphide, a halide, an amine, a phosphine, an ether, and any combination thereof.
Element 55: wherein each X is independently selected from the group consisting of a $C_1$-$C_5$ alkyl group, a halide, and an aryl group.
Element 56: wherein the transition metal complex is selected from the group consisting of dimethylsilylene(2,6,6-trimethyl-1,5,6,7-tetrahydro-s-indacen-1-yl)(t-butylamido)M(R)$_2$; dimethylsilylene(6,6-dimethyl-1,5,6,7-tetrahydro-s-indacen-1-yl)(t-butylamido)M(R)$_2$; dimethylsilylene(2,7,7-trimethyl-3,6,7,8-tetrahydro-as-indacen-3-yl)(t-butylamido)M(R)$_2$; dimethylsilylene(7,7-dimethyl-3,6,7,8-tetrahydro-as-indacen-3-yl)(t-butylamido)M(R)$_2$; dimethylsilylene(2,6,6-trimethyl-1,5,6,7-tetrahydro-s-indacen-1-yl)(cyclododecylamido)M(R)$_2$; dimethylsilylene (6,6-dimethyl-1,5,6,7-tetrahydro-s-indacen-1-yl)(cyclododecylamido)M(R)$_2$; dimethylsilylene(2,7,7-trimethyl-3,6,7,8-tetrahydro-as-indacen-3-yl)(cyclododecylamido)M(R)$_2$; dimethylsilylene(7,7-dimethyl-3,6,7,8-tetrahydro-as-indacen-3-yl)(cyclododecylamido)M(R)$_2$; dimethylsilylene(2,6,6-trimethyl-1,5,6,7-tetrahydro-s-indacen-1-yl)(cyclohexylamido)M(R)$_2$; dimethylsilylene(6,6-dimethyl-1,5,6,7-tetrahydro-s-indacen-1-yl)(cyclohexylamido)M(R)$_2$; dimethylsilylene(2,7,7-trimethyl-3,6,7,8-tetrahydro-as-indacen-3-yl)(cyclohexylamido)M(R)$_2$; dimethylsilylene(7,7-dimethyl-3,6,7,8-tetrahydro-as-indacen-3-yl)(cyclohexylamido)M(R)$_2$; dimethylsilylene(2,6,6-trimethyl-1,5,6,7- tetrahydro-s-indacen-1-yl)(adamantylamido)M(R)$_2$; dimethylsilylene(6,6-dimethyl-1,5,6,7-tetrahydro-s-indacen-1-yl)(adamantylamido)M(R)$_2$; dimethylsilylene(2,7,7-trimethyl-3,6,7,8-tetrahydro-as-indacen-3-yl)(adamantylamido)M(R)$_2$; dimethylsilylene(7,7-dimethyl-3,6,7,8-tetrahydro-as-indacen-3-yl)(adamantylamido)M(R)$_2$; dimethylsilylene(2,6,6-trimethyl-1,5,6,7-tetrahydro-s-indacen-1-yl)(neopentylamido)M(R)$_2$; dimethylsilylene(6,6-dimethyl-1,5,6,7-tetrahydro-s-indacen-1-yl)(neopentylamido)M(R)$_2$; dimethylsilylene(2,7,7-trimethyl-3,6,7,8-tetrahydro-as-indacen-3-yl)(neopentylamido)M(R)$_2$; dimethylsilylene(7,7-dimethyl-3,6,7,8-tetrahydro-as-indacen-3-yl)(neopentylamido)M(R)$_2$; dimethylsilylene(2-methyl-6,6-diethyl-1,5,6,7-tetrahydro-s-indacen-1-yl)(t-butylamido)M(R)$_2$; dimethylsilylene(6,6-diethyl-1,5,6,7-tetrahydro-s-indacen-1-yl)(t-butylamido)M(R)$_2$; dimethylsilylene(2-methyl-7,7-diethyl-3,6,7,8-tetrahydro-as-indacen-3-yl)(t-butylamido)M(R)$_2$; dimethylsilylene(7,7-diethyl-3,6,7,8-tetrahydro-as-indacen-3-yl)(t-butylamido)M(R)$_2$; dimethylsilylene(2-methyl-6,6-diethyl-1,5,6,7-tetrahydro-s-indacen-1-yl)(cyclododecylamido)M(R)$_2$; dimethylsilylene(6,6-diethyl-1,5,6,7-tetrahydro-s-indacen-1-yl)(cyclododecylamido)M(R)$_2$; dimethylsilylene(2-methyl-7,7-diethyl-3,6,7,8-tetrahydro-as-indacen-3-yl)(cyclododecylamido)M(R)$_2$; dimethylsilylene(7,7-dimethyl-3,6,7,8-tetrahydro-as-indacen-3-yl)(cyclododecylamido)M(R)$_2$; diethylsilylene(2,6,6-trimethyl-1,5,6,7-tetrahydro-s-indacen-1-yl)(t-butylamido)M(R)$_2$; diethylsilylene(6,6-dimethyl-1,5,6,7-tetrahydro-s-indacen-1-yl)(t-butylamido)M(R)$_2$; diethylsilylene(2,7,7-trimethyl-3,6,7,8-tetrahydro-as-indacen-3-yl)(t-butylamido)M(R)$_2$; diethylsilylene(7,7-dimethyl-3,6,7,8-tetrahydro-as-indacen-3-yl)(t-butylamido)M(R)$_2$; dimethylsilylene(2-methyl-3,6,7,8-tetrahydro-as-indacen-3-yl)(cyclohexylamido)M(R)$_2$; dimethylsilylene(2-methyl-3,6,7,8-tetrahydro-as-indacen-3-yl)(cyclododecylamido)M(R)$_2$; dimethylsilylene(2-methyl-3,6,7,8-tetrahydro-as-indacen-3-yl)(adamantylamido)M(R)$_2$; and dimethylsilylene(2-methyl-3,6,7,8-tetrahydro-as-indacen-3-yl)(t-butylamido)M(R)$_2$; wherein M is Ti, Zr or Hf, and R is a halogen or a C$_1$ to C$_{10}$ hydrocarbyl.

Element 57: wherein the transition metal complex is dimethylsilylene(2,7,7-trimethyl-3,6,7,8-tetrahydro-as-indacen-3-yl)(t-butylamido)titanium dimethyl or dimethylsilylene(2,6,6-trimethyl-1,5,6,7-tetrahydro-s-indacen-1-yl)(t-butylamido)titanium dimethyl.

Element 58: wherein the first non-coordinating anion borate activator and the second non-coordinating anion borate activator are selected from the group consisting of N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me$_3$NH$^+$][B(C$_6$F$_5$)$_4^-$], 1-(4-(tris(pentafluorophenyl)borate)-2,3,5,6-tetrafluorophenyl) pyrrolidinium; [Me$_3$NH$^+$][B(C$_6$F$_5$)$_4^-$], 1-(4-(tris(pentafluorophenyl)borate)-2,3,5,6-tetrafluorophenyl) pyrrolidinium, sodium tetrakis(pentafluorophenyl)borate, potassium tetrakis(pentafluorophenyl)borate, and 4-(tris(pentafluorophenyl)borate)-2,3,5,6-tetrafluoropyridinium.

Element 59: wherein the first non-coordinating anion borate activator is N,N-dimethylanilinium tetrakis(pentafluorophenyl)borate and the second non-coordinating anion borate activator is N,N-dimethylanilinium tetrakis(perfluoronaphthyl)borate.

Element 60: wherein the first non-coordinating borate anion activator is present in a molar excess with respect to the second non-coordinating anion borate activator.

Element 61: wherein the molar ratio of the first non-coordinating borate activator to the second non-coordinating borate activator ranges from 1:99 to 99:1.

Element 62: wherein the molar ratio of the first non-coordinating borate activator to the second non-coordinating borate activator ranges from 1:3 to 3:1.

Element 63: wherein the two activators have Calculated Total MV's differing by at least 150 Å$^3$, alternatively at least 200 Å$^3$, alternatively at least 250 Å$^3$, alternatively at least 300 Å$^3$.

Element 64: wherein the ratio of the Calculated Total MV of the second non-coordinating borate activator to the Calculated Total MV of first non-coordinating borate activator is about 1.2 or greater, alternatively about 1.3 or greater, alternatively about 1.4 or greater.

Element 65: wherein the Calculated Total MV of the first non-coordinating borate activator is 732 Å$^3$ or 810 Å$^3$, and the Calculated Total MV of the second non-coordinating borate activator is 966 Å$^3$ or greater, preferably 1044 Å$^3$ or greater.

This invention further relates to:
1. A method comprising:
   1) contacting a catalyst system with an olefinic feed comprising a C$_3$-C$_{40}$ alpha olefin, ethylene, and a diene monomer under polymerization reaction conditions where the C$_3$-C$_{40}$ alpha olefin is present in the olefinic feed in a molar excess relative to a combined molar amount of the ethylene and the diene monomer, the catalyst system comprising a first non-coordinating anion activator, a second non-coordinating anion activator differing from the first non-coordinating anion activator, and a transition metal complex represented by the formula:

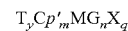

$$T_y Cp'_m M G_n X_q$$

wherein:
   M is a group 3, 4, 5, or 6 transition metal;
   Cp' is an optionally substituted tetrahydro-s-indacenyl or tetrahydro-as-indacenyl group;
   G is a heteroatom group having a formula of JR'$_{z-y}$;
   wherein J is N, P, O or S, R' is a C$_1$ to C$_{100}$ optionally substituted hydrocarbyl, halocarbyl, silylcarbyl or germylcarbyl group, and z is 2 when J is N or P, and z is 1 when J is O or S;
   T is a bridging group and y is 0 or 1 indicating the absence (y=0) or presence (y=1) of T;
   each X is, independently, a leaving group, or two Xs are joined and bound to the metal atom to form a metallocycle ring, or two Xs are joined to form a chelating ligand, a diene ligand, or an alkylidene;
   m=1;
   n=1, 2 or 3;
   q=1, 2 or 3;
   wherein a sum of m+n+q is equal to the oxidation state of M; and
   2) obtaining a copolymer comprising 1 to 35 mol. % ethylene, 98.9 to 65 mol. % C$_3$-C$_{40}$ olefin, and 0.1 to 10 mol. % diene monomer having an MFR of 30 g/10 min or below.

2. The method of paragraph 1, wherein the transition metal complex comprises a tetrahydro-as-indacenyl group represented by the formula:

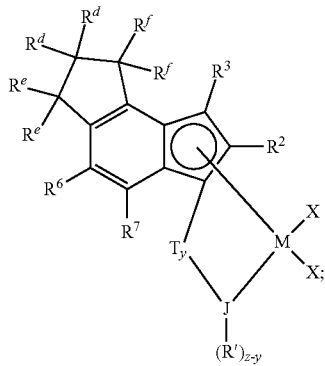

wherein:

M is a group 4 transition metal;

each $R^d$, $R^e$ and $R^f$ is independently hydrogen or a $C_1$-$C_{10}$ alkyl group;

each $R^2$, $R^3$, $R^6$, and $R^7$ is independently hydrogen or a $C_1$-$C_{50}$ optionally substituted hydrocarbyl, halocarbyl, silylcarbyl or germylcarbyl group; J is N, P, O or S, and z is 2 when J is N or P, and z is 1 when J is O or S, R' is a $C_1$ to $C_{100}$ optionally substituted hydrocarbyl, halocarbyl, silylcarbyl or germylcarbyl group;

T is a bridging group and y is 0 or 1 indicating the absence (y=0) or presence (y=1) of T; and each X is, independently, a leaving group, or two Xs are joined and bound to the metal atom to form a metallocycle ring, or two Xs are joined to form a chelating ligand, a diene ligand, or an alkylidene.

3. The method of paragraph 1, wherein the transition metal complex comprises a tetrahydro-s-indacenyl group represented by the formula:

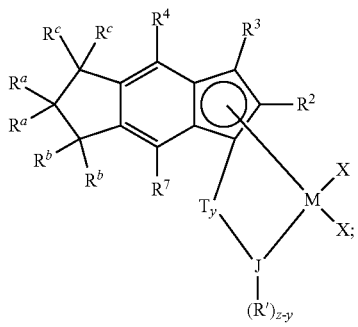

wherein:

M is a group 4 transition metal;

each $R^a$ is independently a $C_1$-$C_{10}$ alkyl group;

each $R^b$ and $R^c$ is independently hydrogen or a $C_1$-$C_{10}$ alkyl group;

each $R^2$, $R^3$, $R^4$ and $R^7$ is independently hydrogen or a $C_1$-$C_{50}$ optionally substituted hydrocarbyl, halocarbyl, silylcarbyl or germylcarbyl group, optionally provided that:

1) $R^3$ and/or $R^4$ are not aryl or substituted aryl,

2) $R^3$ is not directly bonded to a group 15 or 16 heteroatom, and 3) adjacent $R^4$, $R^c$, $R^a$ $R^b$, or $R^7$ do not join together to form a fused ring system;

J is N, P, O or S, and z is 2 when J is N or P, and z is 1 when J is O or S, R' is a $C_1$ to $C_{100}$ optionally substituted hydrocarbyl, halocarbyl, silylcarbyl or germylcarbyl group;

T is a bridging group and y is 0 or 1 indicating the absence (y=0) or presence (y=1) of T; and each X is, independently, a leaving group, or two Xs are joined and bound to the metal atom to form a metallocycle ring, or two Xs are joined to form a chelating ligand, a diene ligand, or an alkylidene.

4. The method of paragraphs 1, 2, or 3, wherein the polymerization reaction occurs at 80° C. or more, preferably 90° C. or more.

5. The method of paragraphs 1, 2, 3, or 4, wherein the molar ratio of the first non-coordinating anion activator to the second non-coordinating anion activator ranges from 1:99 to 99:1, preferably from 1:3 to 3:1.

6. The method of paragraph 3, wherein each $R^a$ is methyl and each $R^b$ and $R^c$ are hydrogen.

7. The method of paragraphs 3 or 5, wherein $R^2$ is methyl, ethyl, propyl, butyl, pentyl, hexyl, heptyl, octyl, nonyl, decyl, undecyl, dodecyl or an isomer thereof, and $R^3$, $R^4$ and $R^7$ are all hydrogen.

8. The method of paragraph 2, wherein each $R^d$ is methyl and each $R^e$ and $R^f$ are hydrogen.

9. The method of paragraphs 2 or 8, wherein $R^2$ is methyl, ethyl, propyl, butyl, pentyl, hexyl, heptyl, octyl, nonyl, decyl, undecyl, dodecyl or an isomer thereof, and $R^3$, $R^6$, and $R^7$ are all hydrogen.

10. The method of any one of paragraphs 2-8, wherein $R^2$ is methyl and y is 1.

11. The method of any one of paragraphs 1-10, wherein y is 1 and T is $(CR^8R^9)_x$, $SiR^8R^9$, or $GeR^8R^9$;

wherein x is 1 or 2, and $R^8$ and $R^9$ are independently hydrogen or an optionally substituted hydrocarbyl, halocarbyl, silylcarbyl, or germylcarbyl group and $R^8$ and $R^9$ are optionally bonded together to form a ring structure.

12. The method of any one of paragraphs 1-11, wherein M is Ti.

13. The method of any one of paragraphs 1-12, wherein J is N.

14. The method of any one of paragraphs 1-13, wherein R' is methyl, ethyl, propyl, butyl, pentyl, hexyl, heptyl, octyl, nonyl, decyl, undecyl, dodecyl, phenyl or an isomer thereof.

15. The method of any one of paragraphs 1-13, wherein R' is t-butyl, neopentyl, cyclohexyl, cyclooctyl, cyclododecyl, adamantyl, or norbornyl.

16. The method of any one of paragraphs 1-15, wherein each X is independently selected from the group consisting of a $C_1$-$C_{20}$ hydrocarbyl group, an aryl group, a hydride, an amide, an alkoxide, a sulfide, a phosphide, a halide, an amine, a phosphine, an ether, and any combination thereof.

17. The method of any one of paragraphs 1-16, wherein each X is independently selected from the group consisting of a $C_1$-$C_5$ alkyl group, a halide, and an aryl group.

18. The method of paragraph 1, wherein the transition metal complex is selected from the group consisting of dimethylsilylene(2,6,6-trimethyl-1,5,6,7-tetrahydro-s-indacen-1-yl)(t-butylamido)M(R)$_2$; dimethylsilylene(6,6-dimethyl-1,5,6,7-tetrahydro-s-indacen-1-yl)(t-butylamido)M(R)$_2$; dimethylsilylene(2,7,7-trimethyl-3,6,7,8-tetrahydro-as-indacen-3-yl)(t-butylamido)M(R)$_2$;

dimethylsilylene(7,7-dimethyl-3,6,7,8-tetrahydro-as-indacen-3-yl)(t-butylamido)M(R)$_2$; dimethylsilylene(2,6,6-trimethyl-1,5,6,7-tetrahydro-s-indacen-1-yl)(cyclododecylamido)M(R)$_2$; dimethylsilylene(6,6-dimethyl-1,5,6,7-tetrahydro-s-indacen-1-yl)(cyclododecylamido)M(R)$_2$; dimethylsilylene(2,7,7-trimethyl-3,6,7,8-tetrahydro-as-indacen-3-yl)(cyclododecylamido)M(R)$_2$; dimethylsilylene(7,7-dimethyl-3,6,7,8-tetrahydro-as-indacen-3-yl)(cyclododecylamido)M(R)$_2$; dimethylsilylene(2,6,6-trimethyl-1,5,6,7-tetrahydro-s-indacen-1-yl)(cyclohexylamido)M(R)$_2$; dimethylsilylene(6,6-dimethyl-1,5,6,7-tetrahydro-s-indacen-1-yl)(cyclohexylamido)M(R)$_2$; dimethylsilylene(2,7,7-trimethyl-3,6,7,8-tetrahydro-as-indacen-3-yl)(cyclohexylamido)M(R)$_2$; dimethylsilylene(7,7-dimethyl-3,6,7,8-tetrahydro-as-indacen-3-yl)(cyclohexylamido)M(R)$_2$; dimethylsilylene(2,6,6-trimethyl-1,5,6,7-tetrahydro-s-indacen-1-yl)(adamantylamido)M(R)$_2$; dimethylsilylene(6,6-dimethyl-1,5,6,7-tetrahydro-s-indacen-1-yl)(adamantylamido)M(R)$_2$; dimethylsilylene(2,7,7-trimethyl-3,6,7,8-tetrahydro-as-indacen-3-yl)(adamantylamido)M(R)$_2$; dimethylsilylene(7,7-dimethyl-3,6,7,8-tetrahydro-as-indacen-3-yl)(adamantylamido)M(R)$_2$; dimethylsilylene(2,6,6-trimethyl-1,5,6,7-tetrahydro-s-indacen-1-yl)(neopentylamido)M(R)$_2$; dimethylsilylene(6,6-dimethyl-1,5,6,7-tetrahydro-s-indacen-1-yl)(neopentylamido)M(R)$_2$; dimethylsilylene(2,7,7-trimethyl-3,6,7,8-tetrahydro-as-indacen-3-yl)(neopentylamido)M(R)$_2$; dimethylsilylene(7,7-dimethyl-3,6,7,8-tetrahydro-as-indacen-3-yl)(neopentylamido)M(R)$_2$; dimethylsilylene(2-methyl-6,6-diethyl-1,5,6,7-tetrahydro-s-indacen-1-yl)(t-butylamido)M(R)$_2$; dimethylsilylene(6,6-diethyl-1,5,6,7-tetrahydro-s-indacen-1-yl)(t-butylamido)M(R)$_2$; dimethylsilylene(2-methyl-7,7-diethyl-3,6,7,8-tetrahydro-as-indacen-3-yl)(t-butylamido)M(R)$_2$; dimethylsilylene(7,7-diethyl-3,6,7,8-tetrahydro-as-indacen-3-yl)(t-butylamido)M(R)$_2$; dimethylsilylene(2-methyl-6,6-diethyl-1,5,6,7-tetrahydro-s-indacen-1-yl)(cyclododecylamido)M(R)$_2$; dimethylsilylene(6,6-diethyl-1,5,6,7-tetrahydro-s-indacen-1-yl)(cyclododecylamido)M(R)$_2$; dimethylsilylene(2-methyl-7,7-diethyl-3,6,7,8-tetrahydro-as-indacen-3-yl)(cyclododecylamido)M(R)$_2$; dimethylsilylene(7,7-dimethyl-3,6,7,8-tetrahydro-as-indacen-3-yl)(cyclododecylamido)M(R)$_2$; diethylsilylene(2,6,6-trimethyl-1,5,6,7-tetrahydro-s-indacen-1-yl)(t-butylamido)M(R)$_2$; diethylsilylene(6,6-dimethyl-1,5,6,7-tetrahydro-s-indacen-1-yl)(t-butylamido)M(R)$_2$; diethylsilylene(2,7,7-trimethyl-3,6,7,8-tetrahydro-as-indacen-3-yl)(t-butylamido)M(R)$_2$; diethylsilylene(7,7-dimethyl-3,6,7,8-tetrahydro-as-indacen-3-yl)(t-butylamido)M(R)$_2$; dimethylsilylene(2-methyl-3,6,7,8-tetrahydro-as-indacen-3-yl)(cyclohexylamido)M(R)$_2$; dimethylsilylene(2-methyl-3,6,7,8-tetrahydro-as-indacen-3-yl)(cyclododecylamido)M(R)$_2$; dimethylsilylene(2-methyl-3,6,7,8-tetrahydro-as-indacen-3-yl)(adamantylamido)M(R)$_2$; and dimethylsilylene(2-methyl-3,6,7,8-tetrahydro-as-indacen-3-yl)(t-butylamido)M(R)$_2$; wherein M is Ti, Zr or Hf, and R is a halogen or a $C_1$ to $C_{10}$ hydrocarbyl.

19. The method of paragraph 1, wherein the transition metal complex is dimethylsilylene(2,7,7-trimethyl-3,6,7,8-tetrahydro-as-indacen-3-yl)(t-butylamido)titanium dimethyl or dimethylsilylene(2,6,6-trimethyl-1,5,6,7-tetrahydro-s-indacen-1-yl)(t-butylamido)titanium dimethyl.

20. The method of any one of paragraphs 1-19, wherein the first non-coordinating anion activator and the second non-coordinating anion activator are selected from the group consisting of: N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me$_3$NH$^+$][B(C$_6$F$_5$)$_4{}^-$], 1-(4-(tris(pentafluorophenyl)borate)-2,3,5,6-tetrafluorophenyl) pyrrolidinium; [Me$_3$NH$^+$][B(C$_6$F$_5$)$_4{}^-$], 1-(4-(tris(pentafluorophenyl)borate)-2,3,5,6-tetrafluorophenyl) pyrrolidinium, sodium tetrakis(pentafluorophenyl)borate, potassium tetrakis(pentafluorophenyl)borate, and 4-(tris(pentafluorophenyl)borate)-2,3,5,6-tetrafluoropyridinium.

21. The method of any one of paragraphs 1-20, wherein the first non-coordinating anion activator is N,N-dimethylanilinium tetrakis(pentafluorophenyl)borate and the second non-coordinating anion activator is N,N-dimethylaniliniumtetrakis(perfluoronaphthyl)borate.

22. The method of paragraph 21, wherein the first non-coordinating anion activator is present in a molar excess with respect to the second non-coordinating anion activator.

23. The method of paragraph 21, wherein the molar ratio of the first non-coordinating anion activator to the second non-coordinating anion activator ranges from 1:99 to 99:1.

24. The method of paragraph 21, wherein the molar ratio of the first non-coordinating anion activator to the second non-coordinating anion activator ranges from 1:3 to 3:1.

25. The method of any one of paragraphs 1-24, wherein the $C_3$-$C_{40}$ alpha olefin is selected from the group consisting of propylene, 1-butene, 1-pentene, 1-hexene, 1-heptene, 1-octene, 1-nonene, 1-decene, 1-undecene, 1-dodecene, isomers thereof having a terminal carbon-carbon double bond, and any combination thereof.

26. The method of any one of paragraphs 1-25, wherein the $C_3$-$C_{20}$ alpha olefin is propylene.

27. The method of any one of paragraphs 1-26, wherein the diene monomer is selected from the group consisting of 5-ethylidene-2-norbornene, 1,4-hexadiene, 5-methylene-2-norbornene, 1,6-octadiene, 5-methyl-1,4-hexadiene, 3,7-dimethyl-1,6-octadiene, dicyclopentadiene, and any combination thereof.

28. The method of any one of paragraphs 1-27, wherein the diene monomer is 5-ethylidene-2-norbornene.

29. The method of any one of paragraphs 1-28, wherein the catalyst system has a catalytic efficiency of at least about 25,000 g terpolymer/g transition metal complex.

30. The method of any one of paragraphs 1-29, wherein the copolymer has an Mn value of about 60,000 g/mol or above, a Mw value of about 150,000 g/mol or above, and/or an Mz value of about 220,000 g/mol or above.

31. The method of any one of paragraphs 1-30, wherein contacting the olefinic feed with the catalyst system takes place at a temperature of about 80° C. or greater.

32. The method of any one of paragraphs 1-31, wherein the first non-coordinating anion activator and the second non-coordinating anion activator interact synergistically under the polymerization reaction conditions such that the melt flow rate changes non-linearly as a function of the molar ratio of the first non-coordinating anion activator to the second non-coordinating anion activator, when measured under the same polymerization conditions, except for having different activator ratios.

33. A copolymer comprising: 1 to 35 mol. % ethylene; 98.9 to 65 mol. % $C_3$-$C_{40}$ alpha olefin; and 0.1 to 10 mol. % diene monomer, and having a melt flow rate of 30 g/10 min or less (ASTM D 1238, 230° C., 2.16 kg).

34. The copolymer of paragraph 33, wherein the copolymer has an Mn value of about 60,000 g/mol or above, a Mw value of about 150,000 g/mol or above, and/or an Mz value of about 220,000 g/mol or above.

35. The copolymer of paragraphs 33 or 34, wherein the copolymer comprises 98.9 to 85 mol. % $C_3$-$C_{40}$ alpha olefin.

36. The copolymer of any one of paragraphs 33-35, wherein the $C_3$-$C_{40}$ alpha olefin is selected from the group consisting of propylene, 1-butene, 1-pentene, 1-hexene, 1-heptene, 1-octene, 1-nonene, 1-decene, 1-undecene, 1-dodecene, isomers thereof having a terminal double bond, and any combination thereof.

37. The copolymer of any one of paragraphs 33-36, wherein the $C_3$-$C_{20}$ alpha olefin is propylene.

38. The copolymer of any one of paragraphs 33-37, wherein the diene monomer is selected from the group consisting of 5-ethylidene-2-norbornene, 1,4-hexadiene, 5-methylene-2-norbornene, 1,6-octadiene, 5-methyl-1,4-hexadiene, 3,7-dimethyl-1,6-octadiene, dicyclopentadiene, and any combination thereof.

39. The copolymer of any one of paragraphs 33-38, wherein the diene monomer is 5-ethylidene-2-norbornene.

40. A catalyst system comprising:
   a first non-coordinating anion borate activator;
   a second non-coordinating anion borate activator differing from the first non-coordinating anion borate activator; and
   a transition metal complex represented by the formula:

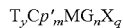

wherein:
   M is a group 3, 4, 5, or 6 transition metal;
   Cp' is an optionally substituted tetrahydro-s-indacenyl or tetrahydro-as-indacenyl group;
   G is a heteroatom group having a formula of $JR'_{z-y}$;
      wherein J is N, P, O or S, and z is 2 when J is N or P, and z is 1 when J is O or S, and R' is a $C_1$ to $C_{100}$ optionally substituted hydrocarbyl, halocarbyl, silylcarbyl or germylcarbyl group;
   T is a bridging group and y is 0 or 1 indicating the absence (y=0) or presence (y=1) of T;
   each X is, independently, a leaving group, or two Xs are joined and bound to the metal atom to form a metallocycle ring, or two Xs are joined to form a chelating ligand, a diene ligand, or an alkylidene;
   m=1;
   n=1, 2 or 3; and
   q=1, 2 or 3;
   wherein a sum of m+n+q is equal to the oxidation state of M; and
   wherein the first non-coordinating anion borate activator and the second non-coordinating anion borate activator are present in a molar ratio such that a melt flow rate for a polymer formed under polymerization reaction conditions in the presence of the catalyst system changes non-linearly as a function of the molar ratio of the first non-coordinating anion borate activator to the second non-coordinating anion borate activator.

41. The catalyst system of paragraph 40, wherein Cp' is a tetrahydro-s-indacenyl group, and wherein:

1) the 3- and/or 4-positions of the tetrahydro-s-indacenyl group are not substituted with an aryl or substituted aryl group,
   2) the 3-position of the tetrahydro-s-indacenyl group is not directly bonded to a group 15 or group 16 heteroatom,
   3) no additional rings are fused to the tetrahydro-s-indacenyl group,
   4) T is not bonded to the 2-position of the tetrahydro-s-indacenyl group, and
   5) the 5-, 6-, or 7-position of the tetrahydro-s-indacenyl group is geminally disubstituted.

42. The catalyst system of paragraph 40, wherein the transition metal complex is represented by the formula:

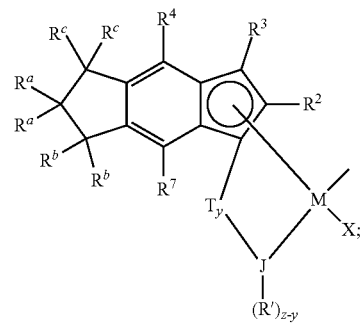

wherein:
   M is a group 4 transition metal;
   each $R^a$ is independently a $C_1$-$C_{10}$ alkyl group;
   each $R^b$ and $R^c$ is independently hydrogen or a $C_1$-$C_{10}$ alkyl group;
   each $R^2$, $R^3$, $R^4$ and $R^7$ is independently hydrogen or a $C_1$-$C_{50}$ optionally substituted hydrocarbyl, halocarbyl, silylcarbyl or germylcarbyl group, optionally provided that:
      1) $R^3$ and/or $R^4$ are not aryl or substituted aryl,
      2) $R^3$ is not directly bonded to a group 15 or 16 heteroatom, and
      3) adjacent $R^4$, $R^c$, $R^a$ $R^b$, or $R^7$ do not join together to form a fused ring system;
   J is N, P, O or S, and z is 2 when J is N or P, and z is 1 when J is O or S,
   R' is a $C_1$ to $C_{100}$ optionally substituted hydrocarbyl, halocarbyl, silylcarbyl or germylcarbyl group;
   T is a bridging group and y is 0 or 1 indicating the absence (y=0) or presence (y=1) of T; and
   each X is, independently, a leaving group, or two Xs are joined and bound to the metal atom to form a metallocycle ring, or two Xs are joined to form a chelating ligand, a diene ligand, or an alkylidene.

43. The catalyst system of paragraph 42, wherein each $R^a$ is methyl and $R^b$ and $R^c$ are both hydrogen.

44. The catalyst system of paragraphs 42 or 43, wherein $R^2$ is methyl, ethyl, propyl, butyl, pentyl, hexyl, heptyl, octyl, nonyl, decyl, undecyl, dodecyl or an isomer thereof, and $R^3$, $R^4$ and $R^7$ are all hydrogen.

45. The catalyst system of paragraph 40, wherein the transition metal complex is represented by the formula:

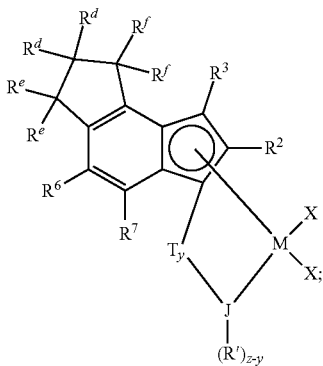

wherein:

M is a group 4 transition metal;

each $R^d$, $R^e$ and $R^f$ is independently hydrogen or a $C_1$-$C_{10}$ alkyl group; each $R^2$, $R^3$, $R^6$, and $R^7$ is independently hydrogen or a $C_1$-$C_{50}$ optionally substituted hydrocarbyl, halocarbyl, silylcarbyl or germylcarbyl group;

J is N, P, O or S, and z is 2 when J is N or P, and z is 1 when J is O or S, R' is a $C_1$ to $C_{100}$ optionally substituted hydrocarbyl, halocarbyl, silylcarbyl or germylcarbyl group;

T is a bridging group and y is 0 or 1 indicating the absence (y=0) or presence (y=1) of T; and each X is, independently, a leaving group, or two Xs are joined and bound to the metal atom to form a metallocycle ring, or two Xs are joined to form a chelating ligand, a diene ligand, or an alkylidene.

46. The catalyst system of paragraph 45, wherein each $R^d$ is methyl and $R^e$ and $R^f$ are both hydrogen.

47. The catalyst system of paragraphs 45 or 46, wherein $R^2$ is methyl, ethyl, propyl, butyl, pentyl, hexyl, heptyl, octyl, nonyl, decyl, undecyl, dodecyl or an isomer thereof, and $R^3$, $R^6$, and $R^7$ are all hydrogen.

48. The catalyst system of any one of paragraphs 42-47, wherein $R^2$ is methyl.

49. The catalyst system of any one of paragraphs 40-48, wherein y is 1.

50. The catalyst system of any one of paragraphs 40-49, wherein y is 1 and T is $(CR^8R^9)_x$, $SiR^8R^9$, or $GeR^8R^9$; wherein x is 1 or 2, and $R^8$ and $R^9$ are independently hydrogen or an optionally substituted hydrocarbyl, halocarbyl, silylcarbyl, or germylcarbyl group, $R^8$ and $R^9$ are optionally bonded together to form a ring structure.

51. The catalyst system of any one of paragraphs 40-50, wherein M is Ti.

52. The catalyst system of any one of paragraphs 40-51, wherein J is N.

53. The catalyst system of any one of paragraphs 40-52, wherein R' is methyl, ethyl, propyl, butyl, pentyl, hexyl, heptyl, octyl, nonyl, decyl, undecyl, dodecyl, phenyl or an isomer thereof.

54. The catalyst system of any one of paragraphs 40-52, wherein R' is t-butyl, neopentyl, cyclohexyl, cyclooctyl, cyclododecyl, adamantyl, or norbornyl.

55. The catalyst system of any one of paragraphs 40-54, wherein each X is independently selected from the group consisting of a $C_1$-$C_{20}$ hydrocarbyl group, an aryl group, a hydride, an amide, an alkoxide, a sulfide, a phosphide, a halide, an amine, a phosphine, an ether, and any combination thereof.

56. The catalyst system of any one of paragraphs 40-55, wherein each X is independently selected from the group consisting of a $C_1$-$C_5$ alkyl group, a halide, and an aryl group.

57. The catalyst system of paragraph 40, wherein the transition metal complex is selected from the group consisting of dimethylsilylene(2,6,6-trimethyl-1,5,6,7-tetrahydro-s-indacen-1-yl)(t-butylamido)M(R)$_2$; dimethylsilylene(6,6-dimethyl-1,5,6,7-tetrahydro-s-indacen-1-yl)(t-butylamido)M(R)$_2$; dimethylsilylene(2,7,7-trimethyl-3,6,7,8-tetrahydro-as-indacen-3-yl)(t-butylamido)M(R)$_2$; dimethylsilylene(7,7-dimethyl-3,6,7,8-tetrahydro-as-indacen-3-yl)(t-butylamido)M(R)$_2$; dimethylsilylene(2,6,6-trimethyl-1,5,6,7-tetrahydro-s-indacen-1-yl)(cyclododecylamido)M(R)$_2$; dimethylsilylene(6,6-dimethyl-1,5,6,7-tetrahydro-s-indacen-1-yl)(cyclododecylamido)M(R)$_2$; dimethylsilylene(2,7,7-trimethyl-3,6,7,8-tetrahydro-as-indacen-3-yl)(cyclododecylamido)M(R)$_2$; dimethylsilylene(7,7-dimethyl-3,6,7,8-tetrahydro-as-indacen-3-yl)(cyclododecylamido)M(R)$_2$; dimethylsilylene(2,6,6-trimethyl-1,5,6,7-tetrahydro-s-indacen-1-yl)(cyclohexylamido)M(R)$_2$; dimethylsilylene(6,6-dimethyl-1,5,6,7-tetrahydro-s-indacen-1-yl)(cyclohexylamido)M(R)$_2$; dimethylsilylene(2,7,7-trimethyl-3,6,7,8-tetrahydro-as-indacen-3-yl)(cyclohexylamido)M(R)$_2$; dimethylsilylene(7,7-dimethyl-3,6,7,8-tetrahydro-as-indacen-3-yl)(cyclohexylamido)M(R)$_2$; dimethylsilylene(2,6,6-trimethyl-1,5,6,7-tetrahydro-s-indacen-1-yl)(adamantylamido)M(R)$_2$; dimethylsilylene(6,6-dimethyl-1,5,6,7-tetrahydro-s-indacen-1-yl)(adamantylamido)M(R)$_2$; dimethylsilylene(2,7,7-trimethyl-3,6,7,8-tetrahydro-as-indacen-3-yl)(adamantylamido)M(R)$_2$; dimethylsilylene(7,7-dimethyl-3,6,7,8-tetrahydro-as-indacen-3-yl)(adamantylamido)M(R)$_2$; dimethylsilylene(2,6,6-trimethyl-1,5,6,7-tetrahydro-s-indacen-1-yl)(neopentylamido)M(R)$_2$; dimethylsilylene(6,6-dimethyl-1,5,6,7-tetrahydro-s-indacen-1-yl)(neopentylamido)M(R)$_2$; dimethylsilylene(2,7,7-trimethyl-3,6,7,8-tetrahydro-as-indacen-3-yl)(neopentylamido)M(R)$_2$; dimethylsilylene(7,7-dimethyl-3,6,7,8-tetrahydro-as-indacen-3-yl)(neopentylamido)M(R)$_2$; dimethylsilylene(2-methyl-6,6-diethyl-1,5,6,7-tetrahydro-s-indacen-1-yl)(t-butylamido)M(R)$_2$; dimethylsilylene(6,6-diethyl-1,5,6,7-tetrahydro-s-indacen-1-yl)(t-butylamido)M(R)$_2$; dimethylsilylene(2-methyl-7,7-diethyl-3,6,7,8-tetrahydro-as-indacen-3-yl)(t-butylamido)M(R)$_2$; dimethylsilylene(7,7-diethyl-3,6,7,8-tetrahydro-as-indacen-3-yl)(t-butylamido)M(R)$_2$; dimethylsilylene(2-methyl-6,6-diethyl-1,5,6,7-tetrahydro-s-indacen-1-yl)(cyclododecylamido)M(R)$_2$; dimethylsilylene(6,6-diethyl-1,5,6,7-tetrahydro-s-indacen-1-yl)(cyclododecylamido)M(R)$_2$; dimethylsilylene(2-methyl-7,7-diethyl-3,6,7,8-tetrahydro-as-indacen-3-yl)(cyclododecylamido)M(R)$_2$; dimethylsilylene(7,7-dimethyl-3,6,7,8-tetrahydro-as-indacen-3-yl)(cyclododecylamido)M(R)$_2$; diethylsilylene(2,6,6-trimethyl-1,5,6,7-tetrahydro-s-indacen-1-yl)(t-butylamido)M(R)$_2$; diethylsilylene(6,6-dimethyl-1,5,6,7-tetrahydro-s-indacen-1-yl)(t-butylamido)M(R)$_2$; diethylsilylene(2,7,7-trimethyl-3,6,7,8-tetrahydro-as-indacen-3-yl)(t-butylamido)M(R)$_2$; diethylsilylene(7,7-dimethyl-3,6,7,8-tetrahydro-as-indacen-3-yl)(t-butylamido)M(R)$_2$; dimethylsilylene(2-methyl-3,6,7,8-tetrahydro-as-indacen-3-yl)(cyclohexylamido)M(R)$_2$; dimethylsilylene(2-methyl-3,6,7,8-tetrahydro-as-indacen-3-yl)(cyclododecylamido)M(R)$_2$; dimethylsilylene(2-methyl-3,6,7,8-tetrahydro-as-indacen-3-yl)(adamantylamido)M(R)$_2$; and dimethylsilylene(2-methyl-3,6,7,8-tetrahydro-as-indacen-3-yl)(t-butylamido)M(R)$_2$;
wherein M is Ti, Zr or Hf, and R is a halogen or a C$_1$ to C$_{10}$ hydrocarbyl.

58. The catalyst system of paragraph 40, wherein the transition metal complex is dimethylsilylene(2,7,7-trimethyl-3,6,7,8-tetrahydro-as-indacen-3-yl)(t-butylamido)titanium dimethyl or dimethylsilylene(2,6,6-trimethyl-1,5,6,7-tetrahydro-s-indacen-1-yl)(t-butylamido)titanium dimethyl.

59. The catalyst system of any one of paragraphs 40-58, wherein the first non-coordinating anion borate activator and the second non-coordinating anion borate activator are selected from the group consisting of N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me$_3$NH$^+$][B(C$_6$F$_5$)$^{4-}$], 1-(4-(tris(pentafluorophenyl)borate)-2,3,5,6-tetrafluorophenyl) pyrrolidinium; [Me$_3$NH$^+$][B(C$_6$F$_5$)$^{4-}$], 1-(4-(tris(pentafluorophenyl)borate)-2,3,5,6-tetrafluorophenyl) pyrrolidinium, sodium tetrakis(pentafluorophenyl)borate, potassium tetrakis(pentafluorophenyl)borate, and 4-(tris(pentafluorophenyl)borate)-2,3,5,6-tetrafluoropyridinium.

60. The catalyst system of any one of paragraphs 40-58, wherein the first non-coordinating anion borate activator is N,N-dimethylanilinium tetrakis(pentafluorophenyl)borate and the second non-coordinating anion borate activator is N,N-dimethylanilinium tetrakis(perfluoronaphthyl)borate.

61. The catalyst system of paragraph 60, wherein the first non-coordinating borate anion activator is present in a molar excess with respect to the second non-coordinating anion borate activator.

62. The catalyst system of paragraph 60, wherein the molar ratio of the first non-coordinating borate activator to the second non-coordinating borate activator ranges from 1:99 to 99:1.

63. The catalyst system of paragraph 60, wherein the molar ratio of the first non-coordinating borate activator to the second non-coordinating borate activator ranges from 1:3 to 3:1.

64. The method of paragraph 1, wherein the two activators have Calculated Total MV's differing by at least 150 Å$^3$, alternatively at least 200 Å$^3$, alternatively at least 250 Å$^3$, alternatively at least 300 Å$^3$.

65. The method of paragraph 1, wherein the ratio of the Calculated Total MV of the second non-coordinating borate activator to the Calculated Total MV of first non-coordinating borate activator is about 1.2 or greater, alternatively about 1.3 or greater, alternatively about 1.4 or greater.

66. The method of paragraph 1, wherein the Calculated Total MV of the first non-coordinating borate activator is 732 Å$^3$ or 810 Å$^3$, and the Calculated Total MV of the second non-coordinating borate activator is 966 Å$^3$ or greater, preferably 1044 Å$^3$ or greater.

This invention also relates to:

1A. A method comprising:
1) contacting a catalyst system with an olefinic feed comprising a C$_3$-C$_{40}$ alpha olefin, ethylene, and a diene monomer under polymerization reaction conditions where the C$_3$-C$_{40}$ alpha olefin is present in the olefinic feed in a molar excess relative to a combined molar amount of the ethylene and the diene monomer, the catalyst system comprising a first non-coordinating anion activator, a second non-coordinating anion activator differing from the first non-coordinating anion activator, and a transition metal complex represented by the formula:

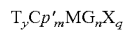

$$T_yCp'_mMG_nX_q$$

wherein:
M is a group 3, 4, 5, or 6 transition metal;
Cp' is an optionally substituted tetrahydro-s-indacenyl or tetrahydro-as-indacenyl group;
G is a heteroatom group having a formula of JR'$_{z-y}$;
wherein J is N, P, O or S, R' is a C$_1$ to C$_{100}$ optionally substituted hydrocarbyl, halocarbyl, silylcarbyl or germylcarbyl group, and z is 2 when J is N or P, and z is 1 when J is O or S;
T is a bridging group and y is 0 or 1 indicating the absence (y=0) or presence (y=1) of T;
each X is, independently, a leaving group, or two Xs are joined and bound to the metal atom to form a metallocycle ring, or two Xs are joined to form a chelating ligand, a diene ligand, or an alkylidene;
m=1;
n=1, 2 or 3;
q=1, 2 or 3;
wherein a sum of m+n+q is equal to the oxidation state of M; and 2) obtaining a copolymer comprising 1 to 35 mol. % ethylene, 98.9 to 65 mol. % C$_3$-C$_{40}$ olefin, and 0.1 to 10 mol. % diene monomer having an MFR of 30 g/10 min or below.

2A. The method of paragraph 1A, wherein the transition metal complex comprises a tetrahydro-as-indacenyl group represented by the formula:

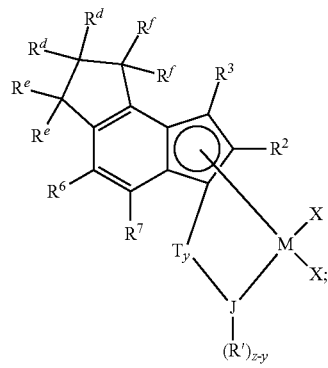

wherein:
M is a group 4 transition metal;
each R$^d$, R$^e$ and R$^f$ is independently hydrogen or a C$_1$-C$_{10}$ alkyl group;
each R$^2$, R$^3$, R$^6$, and R$^7$ is independently hydrogen or a C$_1$-C$_{50}$ optionally substituted hydrocarbyl, halocarbyl, silylcarbyl or germylcarbyl group;
J is N, P, O or S, and z is 2 when J is N or P, and z is 1 when J is O or S, R' is a C$_1$ to C$_{100}$ optionally substituted hydrocarbyl, halocarbyl, silylcarbyl or germylcarbyl group;

T is a bridging group and y is 0 or 1 indicating the absence (y=0) or presence (y=1) of T; and each X is, independently, a leaving group, or two Xs are joined and bound to the metal atom to form a metallocycle ring, or two Xs are joined to form a chelating ligand, a diene ligand, or an alkylidene.

3A. The method of paragraph 1A, wherein the transition metal complex comprises a tetrahydro-s-indacenyl group represented by the formula:

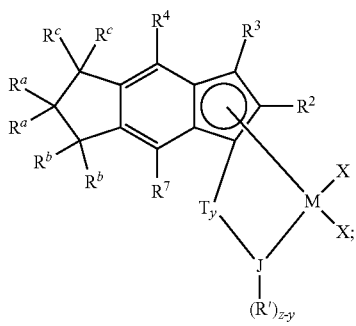

wherein

M is a group 4 transition metal;

each $R^a$ is independently a $C_1$-$C_{10}$ alkyl group;

each $R^b$ and $R^c$ is independently hydrogen or a $C_1$-$C_{10}$ alkyl group;

each $R^2$, $R^3$, $R^4$ and $R^7$ is independently hydrogen or a $C_1$-$C_{50}$ optionally substituted hydrocarbyl, halocarbyl, silylcarbyl or germylcarbyl group, optionally provided that:
1) $R^3$ and/or $R^4$ are not aryl or substituted aryl,
2) $R^3$ is not directly bonded to a group 15 or 16 heteroatom, and
3) adjacent $R^4$, $R^c$, $R^a$ $R^b$, or $R^7$ do not join together to form a fused ring system;

J is N, P, O or S, and z is 2 when J is N or P, and z is 1 when J is O or S, R' is a $C_1$ to $C_{100}$ optionally substituted hydrocarbyl, halocarbyl, silylcarbyl or germylcarbyl group;

T is a bridging group and y is 0 or 1 indicating the absence (y=0) or presence (y=1) of T; and each X is, independently, a leaving group, or two Xs are joined and bound to the metal atom to form a metallocycle ring, or two Xs are joined to form a chelating ligand, a diene ligand, or an alkylidene.

4A. The method of paragraph 1A, wherein the polymerization reaction occurs at 80° C. or more, preferably 90° C. or more.

5A. The method of paragraph 1A, wherein the molar ratio of the first non-coordinating anion activator to the second non-coordinating anion activator ranges from 1:99 to 99:1, preferably from 1:3 to 3:1.

6A. The method of paragraph 3A, wherein each $R^a$ is methyl and each $R^b$ and $R^c$ are hydrogen.

7A. The method of paragraph 3A, wherein $R^2$ is methyl, ethyl, propyl, butyl, pentyl, hexyl, heptyl, octyl, nonyl, decyl, undecyl, dodecyl or an isomer thereof, and $R^3$, $R^4$ and $R^7$ are all hydrogen.

8A. The method of paragraph 2A, wherein each $R^d$ is methyl and each $R^e$ and $R^f$ are hydrogen.

9A. The method of paragraph 2A, wherein $R^2$ is methyl, ethyl, propyl, butyl, pentyl, hexyl, heptyl, octyl, nonyl, decyl, undecyl, dodecyl or an isomer thereof, and $R^3$, $R^6$, and $R^7$ are all hydrogen.

10A. The method of paragraph 2A, wherein $R^2$ is methyl and y is 1.

11A. The method of paragraph 1A, wherein y is 1 and T is $(CR^8R^9)_x$, $SiR^8R^9$, or $GeR^8R^9$; wherein x is 1 or 2, and $R^8$ and $R^9$ are independently hydrogen or an optionally substituted hydrocarbyl, halocarbyl, silylcarbyl, or germylcarbyl group and $R^8$ and $R^9$ are optionally bonded together to form a ring structure.

12A. The method of paragraph 1A, wherein M is Ti.

13A. The method of paragraph 1A, wherein J is N.

14A. The method of paragraph 1A, wherein R' is methyl, ethyl, propyl, butyl, pentyl, hexyl, heptyl, octyl, nonyl, decyl, undecyl, dodecyl, phenyl or an isomer thereof.

15A. The method of paragraph 1A, wherein R' is t-butyl, neopentyl, cyclohexyl, cyclooctyl, cyclododecyl, adamantyl, or norbornyl.

16A. The method of paragraph 1A, wherein each X is independently selected from the group consisting of a $C_1$-$C_{20}$ hydrocarbyl group, an aryl group, a hydride, an amide, an alkoxide, a sulfide, a phosphide, a halide, an amine, a phosphine, an ether, and any combination thereof.

17A. The method of paragraph 1A, wherein each X is independently selected from the group consisting of a $C_1$-$C_5$ alkyl group, a halide, and an aryl group.

18A. The method of paragraph 1A, wherein the transition metal complex is selected from the group consisting of dimethylsilylene(2,6,6-trimethyl-1,5,6,7-tetrahydro-s-indacen-1-yl)(t-butylamido)M(R)$_2$; dimethylsilylene(6,6-dimethyl-1,5,6,7-tetrahydro-s-indacen-1-yl)(t-butylamido)M(R)$_2$; dimethylsilylene(2,7,7-trimethyl-3,6,7,8-tetrahydro-as-indacen-3-yl)(t-butylamido)M(R)$_2$; dimethylsilylene(7,7-dimethyl-3,6,7,8-tetrahydro-as-indacen-3-yl)(t-butylamido)M(R)$_2$; dimethylsilylene(2,6,6-trimethyl-1,5,6,7-tetrahydro-s-indacen-1-yl)(cyclododecylamido)M(R)$_2$; dimethylsilylene(6,6-dimethyl-1,5,6,7-tetrahydro-s-indacen-1-yl)(cyclododecylamido)M(R)$_2$; dimethylsilylene(2,7,7-trimethyl-3,6,7,8-tetrahydro-as-indacen-3-yl)(cyclododecylamido)M(R)$_2$; dimethylsilylene(7,7-dimethyl-3,6,7,8-tetrahydro-as-indacen-3-yl)(cyclododecylamido)M(R)$_2$; dimethylsilylene(2,6,6-trimethyl-1,5,6,7-tetrahydro-s-indacen-1-yl)(cyclohexylamido)M(R)$_2$; dimethylsilylene(6,6-dimethyl-1,5,6,7-tetrahydro-s-indacen-1-yl)(cyclohexylamido)M(R)$_2$; dimethylsilylene(2,7,7-trimethyl-3,6,7,8-tetrahydro-as-indacen-3-yl)(cyclohexylamido)M(R)$_2$; dimethylsilylene(7,7-dimethyl-3,6,7,8-tetrahydro-as-indacen-3-yl)(cyclohexylamido)M(R)$_2$; dimethylsilylene(2,6,6-trimethyl-1,5,6,7-tetrahydro-s-indacen-1-yl)(adamantylamido)M(R)$_2$; dimethylsilylene(6,6-dimethyl-1,5,6,7-tetrahydro-s-indacen-1-yl)(adamantylamido)M(R)$_2$; dimethylsilylene(2,7,7-trimethyl-3,6,7,8-tetrahydro-as-indacen-3-yl)(adamantylamido)M(R)$_2$; dimethylsilylene(7,7-dimethyl-3,6,7,8-tetrahydro-as-indacen-3-yl)(adamantylamido)M(R)$_2$; dimethylsilylene(2,6,6-trimethyl-1,5,6,7-tetrahydro-s-indacen-1-yl)(neopentylamido)M(R)$_2$; dimethylsilylene(6,6-dimethyl-1,5,6,7-tetrahydro-s-indacen-1-yl)(neopentylamido)M(R)$_2$; dimethylsilylene(2,7,7-trimethyl-3,6,7,8-tetrahydro-as-indacen-3-yl)(neopentylamido)M(R)$_2$; dimethylsilylene(7,7-dimethyl-3,6,7,8-tetrahydro-as-indacen-3-yl)(neopentylamido)M(R)$_2$; dimethylsilylene(2-methyl-6,6-diethyl-1,5,6,7-tetrahydro-s-indacen-1-yl)(t-butylamido)M(R)$_2$; dimethylsilylene(6,6-diethyl-1,5,6,7-tetrahydro-s-indacen-1-yl)(t-butylamido)M(R)$_2$; dimethylsilylene(2-methyl-7,7-diethyl-3,6,7,8-tetrahydro-as-indacen-3-yl)(t- butylamido)M(R)$_2$; dimethylsilylene(7,7-diethyl-3,6,7,8-tetrahydro-as-indacen-3-yl)(t-butylamido)M(R)$_2$; dimethylsilylene(2-methyl-6,6-diethyl-1,5,6,7-tetrahydro-s-indacen-1-yl)(cyclododecylamido)M(R)$_2$; dimethylsilylene(6,6-diethyl-1,5,6,7-tetrahydro-s-indacen-1-yl)(cyclododecylamido)M(R)$_2$; dimethylsilylene(2-methyl-7,7-diethyl-3,6,7,8-tetrahydro-as-indacen-3-yl)(cyclododecylamido)M(R)$_2$; dimethylsilylene(7,7-dimethyl-3,6,7,8-tetrahydro-as-indacen-3-yl)(cyclododecylamido)M(R)$_2$; diethylsilylene(2,6,6-trimethyl-1,5,6,7-tetrahydro-s-indacen-1-yl)(t-butylamido)M(R)$_2$; diethylsilylene(6,6-dimethyl-1,5,6,7-tetrahydro-s-indacen-1-yl)(t-butylamido)M(R)$_2$; diethylsilylene(2,7,7-trimethyl-3,6,7,8-tetrahydro-as-indacen-3-yl)(t-butylamido)M(R)$_2$; diethylsilylene(7,7-dimethyl-3,6,7,8-tetrahydro-as-indacen-3-yl)(t-butylamido)M(R)$_2$; dimethylsilylene(2-methyl-3,6,7,8-tetrahydro-as-indacen-3-yl)(cyclohexylamido)M(R)$_2$; dimethylsilylene(2-methyl-3,6,7,8-tetrahydro-as-indacen-3-yl)(cyclododecylamido)M(R)$_2$; dimethylsilylene(2-methyl-3,6,7,8-tetrahydro-as-indacen-3-yl)(adamantylamido)M(R)$_2$; and dimethylsilylene(2-methyl-3,6,7,8-tetrahydro-as-indacen-3-yl)(t-butylamido)M(R)$_2$; wherein M is Ti, Zr or Hf, and R is a halogen or a $C_1$ to $C_{10}$ hydrocarbyl.

19A. The method of paragraph 1A, wherein the transition metal complex is dimethylsilylene(2,7,7-trimethyl-3,6,7,8-tetrahydro-as-indacen-3-yl)(t-butylamido)titanium dimethyl or dimethylsilylene(2,6,6-trimethyl-1,5,6,7-tetrahydro-s-indacen-1-yl)(t-butylamido)titanium dimethyl.

20A. The method of paragraph 1A, wherein the first non-coordinating anion activator and the second non-coordinating anion activator are selected from the group consisting of: N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me$_3$NH$^+$][B(C$_6$F$_5$)$^{4-}$], 1-(4-(tris(pentafluorophenyl)borate)-2,3,5,6-tetrafluorophenyl) pyrrolidinium; [Me$_3$NH$^+$][B(C$_6$F$_5$)$^{4-}$], 1-(4-(tris(pentafluorophenyl)borate)-2,3,5,6-tetrafluorophenyl) pyrrolidinium, sodium tetrakis(pentafluorophenyl)borate, potassium tetrakis(pentafluorophenyl)borate, and 4-(tris(pentafluorophenyl)borate)-2,3,5,6-tetrafluoropyridinium.

21A. The method of paragraph 1A, wherein the first non-coordinating anion activator is N,N-dimethylanilinium tetrakis(pentafluorophenyl)borate and the second non-coordinating anion activator is N,N-dimethylaniliniumtetrakis(perfluoronaphthyl)borate.

22A. The method of paragraph 21A, wherein the first non-coordinating anion activator is present in a molar excess with respect to the second non-coordinating anion activator.

23A. The method of paragraph 21A, wherein the molar ratio of the first non-coordinating anion activator to the second non-coordinating anion activator ranges from 1:99 to 99:1.

24A. The method of paragraph 21A, wherein the molar ratio of the first non-coordinating anion activator to the second non-coordinating anion activator ranges from 1:3 to 3:1.

25A. The method of paragraph 1A, wherein the $C_3$-$C_{40}$ alpha olefin is selected from the group consisting of propylene, 1-butene, 1-pentene, 1-hexene, 1-heptene, 1-octene, 1-nonene, 1-decene, 1-undecene, 1-dodecene, isomers thereof having a terminal carbon-carbon double bond, and any combination thereof.

26A. The method of paragraph 1A, wherein the $C_3$-$C_{20}$ alpha olefin is propylene.

27A. The method of paragraph 1A, wherein the diene monomer is selected from the group consisting of 5-ethylidene-2-norbornene, 1,4-hexadiene, 5-methylene-2-norbornene, 1,6-octadiene, 5-methyl-1,4-hexadiene, 3,7-dimethyl-1,6-octadiene, dicyclopentadiene, and any combination thereof.

28A. The method of paragraph 1A, wherein the diene monomer is 5-ethylidene-2-norbornene.

29A. The method of paragraph 1A, wherein the catalyst system has a catalytic efficiency of at least about 25,000 g terpolymer/g transition metal complex.

30A. The method of paragraph 1A, wherein the copolymer has an Mn value of about 60,000 g/mol or above, a Mw value of about 150,000 g/mol or above, and/or an Mz value of about 220,000 g/mol or above.

31A. The method of paragraph 1A, wherein contacting the olefinic feed with the catalyst system takes place at a temperature of about 80° C. or greater.

32A. The method of paragraph 1A, wherein the first non-coordinating anion activator and the second non-coordinating anion activator interact synergistically under the polymerization reaction conditions such that the melt flow rate changes non-linearly as a function of the molar ratio of the first non-coordinating anion activator to the second non-coordinating anion activator, when measured under the same polymerization conditions, except for having different activator ratios.

33A. A copolymer comprising: 1 to 35 mol. % ethylene; 98.9 to 65 mol. % $C_3$-$C_{40}$ alpha olefin; and 0.1 to 10 mol. % diene monomer, and having a melt flow rate of 30 g/10 min or less (ASTM D 1238, 230° C., 2.16 kg).

34A. The copolymer of paragraph 33A, wherein the copolymer has an Mn value of about 60,000 g/mol or above, a Mw value of about 150,000 g/mol or above, and/or an Mz value of about 220,000 g/mol or above.

35A. The copolymer of paragraphs 33A, wherein the copolymer comprises 98.9 to 85 mol. % $C_3$-$C_{40}$ alpha olefin.

36A. The copolymer of paragraph 35A, wherein the $C_3$-$C_{40}$ alpha olefin is selected from the group consisting of propylene, 1-butene, 1-pentene, 1-hexene, 1-heptene, 1-octene, 1-nonene, 1-decene, 1-undecene, 1-dodecene, isomers thereof having a terminal double bond, and any combination thereof.

37A. The copolymer of paragraph 35A, wherein the $C_3$-$C_{20}$ alpha olefin is propylene.

38A. The copolymer of paragraph 33A, wherein the diene monomer is selected from the group consisting of 5-ethylidene-2-norbornene, 1,4-hexadiene, 5-methylene-2-norbornene, 1,6-octadiene, 5-methyl-1,4-hexadiene, 3,7-dimethyl-1,6-octadiene, dicyclopentadiene, and any combination thereof.

39A. The copolymer of paragraph 33A, wherein the diene monomer is 5-ethylidene-2-norbornene.

40A. A catalyst system comprising:
a first non-coordinating anion borate activator;
a second non-coordinating anion borate activator differing from the first non-coordinating anion borate activator; and a transition metal complex represented by the formula:

$$T_yCp'_mMG_nX_q$$

wherein:

M is a group 3, 4, 5, or 6 transition metal;

Cp' is an optionally substituted tetrahydro-s-indacenyl or tetrahydro-as-indacenyl group;

G is a heteroatom group having a formula of $JR'_{z-y}$;
wherein J is N, P, O or S, and z is 2 when J is N or P, and z is 1 when J is O or S, and R' is a $C_1$ to $C_{100}$ optionally substituted hydrocarbyl, halocarbyl, silylcarbyl or germylcarbyl group;

T is a bridging group and y is 0 or 1 indicating the absence (y=0) or presence (y=1) of T;

each X is, independently, a leaving group, or two Xs are joined and bound to the metal atom to form a metallocycle ring, or two Xs are joined to form a chelating ligand, a diene ligand, or an alkylidene;

m=1;

n=1, 2 or 3; and q=1, 2 or 3;

wherein a sum of m+n+q is equal to the oxidation state of M; and wherein the first non-coordinating anion borate activator and the second non-coordinating anion borate activator are present in a molar ratio such that a melt flow rate for a polymer formed under polymerization reaction conditions in the presence of the catalyst system changes non-linearly as a function of the molar ratio of the first non-coordinating anion borate activator to the second non-coordinating anion borate activator.

41A. The catalyst system of paragraph 40A, wherein Cp' is a tetrahydro-s-indacenyl group, and wherein:
1) the 3- and/or 4-positions of the tetrahydro-s-indacenyl group are not substituted with an aryl or substituted aryl group,
2) the 3-position of the tetrahydro-s-indacenyl group is not directly bonded to a group 15 or group 16 heteroatom,
3) no additional rings are fused to the tetrahydro-s-indacenyl group,
4) T is not bonded to the 2-position of the tetrahydro-s-indacenyl group, and
5) the 5-, 6-, or 7-position of the tetrahydro-s-indacenyl group is geminally disubstituted.

42A. The catalyst system of paragraph 40A, wherein the transition metal complex is represented by the formula:

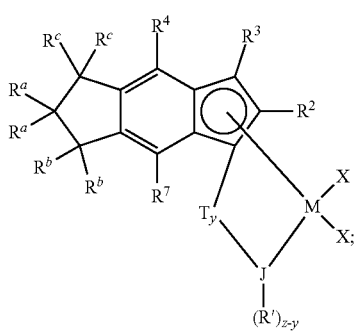

wherein:

M is a group 4 transition metal;

each $R^a$ is independently a $C_1$-$C_{10}$ alkyl group;

each $R^b$ and $R^c$ is independently hydrogen or a $C_1$-$C_{10}$ alkyl group;

each $R^2$, $R^3$, $R^4$ and $R^7$ is independently hydrogen or a $C_1$-$C_{50}$ optionally substituted hydrocarbyl, halocarbyl, silylcarbyl or germylcarbyl group, optionally provided that:
1) $R^3$ and/or $R^4$ are not aryl or substituted aryl,
2) $R^3$ is not directly bonded to a group 15 or 16 heteroatom, and
3) adjacent $R^4$, $R^c$, $R^a$ $R^b$, or $R^7$ do not join together to form a fused ring system;

J is N, P, O or S, and z is 2 when J is N or P, and z is 1 when J is O or S, R' is a $C_1$ to $C_{100}$ optionally substituted hydrocarbyl, halocarbyl, silylcarbyl or germylcarbyl group;

T is a bridging group and y is 0 or 1 indicating the absence (y=0) or presence (y=1) of T; and each X is, independently, a leaving group, or two Xs are joined and bound to the metal atom to form a metallocycle ring, or two Xs are joined to form a chelating ligand, a diene ligand, or an alkylidene.

43A. The catalyst system of paragraph 42A, wherein each $R^a$ is methyl and $R^b$ and $R^c$ are both hydrogen.

44A. The catalyst system of paragraph 42A, wherein $R^2$ is methyl, ethyl, propyl, butyl, pentyl, hexyl, heptyl, octyl, nonyl, decyl, undecyl, dodecyl or an isomer thereof, and $R^3$, $R^4$ and $R^7$ are all hydrogen.

45A. The catalyst system of paragraph 40A, wherein the transition metal complex is represented by the formula:

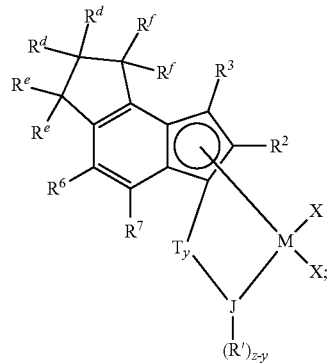

wherein:

M is a group 4 transition metal;

each $R^d$, $R^e$ and $R^f$ is independently hydrogen or a $C_1$-$C_{10}$ alkyl group;

each $R^2$, $R^3$, $R^6$, and $R^7$ is independently hydrogen or a $C_1$-$C_{50}$ optionally substituted hydrocarbyl, halocarbyl, silylcarbyl or germylcarbyl group;

J is N, P, O or S, and z is 2 when J is N or P, and z is 1 when J is O or S,

R' is a $C_1$ to $C_{100}$ optionally substituted hydrocarbyl, halocarbyl, silylcarbyl or germylcarbyl group;

T is a bridging group and y is 0 or 1 indicating the absence (y=0) or presence (y=1) of T; and each X is, independently, a leaving group, or two Xs are joined and bound to the metal atom to form a metallocycle ring, or two Xs are joined to form a chelating ligand, a diene ligand, or an alkylidene.

46A. The catalyst system of paragraph 45A, wherein each $R^d$ is methyl and $R^e$ and $R^f$ are both hydrogen.

47A. The catalyst system of paragraph 45A, wherein $R^2$ is methyl, ethyl, propyl, butyl, pentyl, hexyl, heptyl, octyl, nonyl, decyl, undecyl, dodecyl or an isomer thereof, and $R^3$, $R^6$, and $R^7$ are all hydrogen.

48A. The catalyst system of paragraph 42A, wherein $R^2$ is methyl.

49A. The catalyst system of paragraph 40A, wherein y is 1.

50A. The catalyst system of paragraph 40A, wherein y is 1 and T is $(CR^8R^9)_x$, $SiR^8R^9$, or $GeR^8R^9$; wherein x is 1 or 2, and $R^8$ and $R^9$ are independently hydrogen or an optionally substituted hydrocarbyl, halocarbyl, silylcarbyl, or germylcarbyl group, $R^8$ and $R^9$ are optionally bonded together to form a ring structure.

51A. The catalyst system of paragraph 40A, wherein M is Ti.

52A. The catalyst system of paragraph 40A, wherein J is N.

53A. The catalyst system of paragraph 42A, wherein R' is methyl, ethyl, propyl, butyl, pentyl, hexyl, heptyl, octyl, nonyl, decyl, undecyl, dodecyl, phenyl or an isomer thereof.

54A. The catalyst system of paragraph 42A, wherein R' is t-butyl, neopentyl, cyclohexyl, cyclooctyl, cyclododecyl, adamantyl, or norbornyl.

55A. The catalyst system of paragraph 40A, wherein each X is independently selected from the group consisting of a $C_1$-$C_{20}$ hydrocarbyl group, an aryl group, a hydride, an amide, an alkoxide, a sulfide, a phosphide, a halide, an amine, a phosphine, an ether, and any combination thereof.

56A. The catalyst system of paragraph 40A, wherein each X is independently selected from the group consisting of a $C_1$-$C_5$ alkyl group, a halide, and an aryl group.

57A. The catalyst system of paragraph 40A, wherein the transition metal complex is selected from the group consisting of dimethylsilylene(2,6,6-trimethyl-1,5,6,7-tetrahydro-s-indacen-1-yl)(t-butylamido)M(R)$_2$; dimethylsilylene(6,6-dimethyl-1,5,6,7-tetrahydro-s-indacen-1-yl)(t-butylamido)M(R)$_2$; dimethylsilylene(2,7,7-trimethyl-3,6,7,8-tetrahydro-as-indacen-3-yl)(t-butylamido)M(R)$_2$; dimethylsilylene(7,7-dimethyl-3,6,7,8-tetrahydro-as-indacen-3-yl)(t-butylamido)M(R)$_2$; dimethylsilylene(2,6,6-trimethyl-1,5,6,7-tetrahydro-s-indacen-1-yl)(cyclododecylamido)M(R)$_2$; dimethylsilylene(6,6-dimethyl-1,5,6,7-tetrahydro-s-indacen-1-yl)(cyclododecylamido)M(R)$_2$; dimethylsilylene(2,7,7-trimethyl-3,6,7,8-tetrahydro-as-indacen-3-yl)(cyclododecylamido)M(R)$_2$; dimethylsilylene(7,7-dimethyl-3,6,7,8-tetrahydro-as-indacen-3-yl)(cyclododecylamido)M(R)$_2$; dimethylsilylene(2,6,6-trimethyl-1,5,6,7-tetrahydro-s-indacen-1-yl)(cyclohexylamido)M(R)$_2$; dimethylsilylene(6,6-dimethyl-1,5,6,7-tetrahydro-s-indacen-1-yl)(cyclohexylamido)M(R)$_2$; dimethylsilylene(2,7,7-trimethyl-3,6,7,8-tetrahydro-as-indacen-3-yl)(cyclohexylamido)M(R)$_2$; dimethylsilylene(7,7-dimethyl-3,6,7,8-tetrahydro-as-indacen-3-yl)(cyclohexylamido)M(R)$_2$; dimethylsilylene(2,6,6-trimethyl-1,5,6,7-tetrahydro-s-indacen-1-yl)(adamantylamido)M(R)$_2$; dimethylsilylene(6,6-dimethyl-1,5,6,7-tetrahydro-s-indacen-1-yl)(adamantylamido)M(R)$_2$; dimethylsilylene(2,7,7-trimethyl-3,6,7,8-tetrahydro-as-indacen-3-yl)(adamantylamido)M(R)$_2$; dimethylsilylene(7,7-dimethyl-3,6,7,8-tetrahydro-as-indacen-3-yl)(adamantylamido)M(R)$_2$; dimethylsilylene(2,6,6-trimethyl-1,5,6,7-tetrahydro-s-indacen-1-yl)(neopentylamido)M(R)$_2$; dimethylsilylene(6,6-dimethyl-1,5,6,7-tetrahydro-s-indacen-1-yl)(neopentylamido)M(R)$_2$; dimethylsilylene(2,7,7-trimethyl-3,6,7,8-tetrahydro-as-indacen-3-yl)(neopentylamido)M(R)$_2$; dimethylsilylene(7,7-dimethyl-3,6,7,8-tetrahydro-as-indacen-3-yl)(neopentylamido)M(R)$_2$; dimethylsilylene(2-methyl-6,6-diethyl-1,5,6,7-tetrahydro-s-indacen-1-yl)(t-butylamido)M(R)$_2$; dimethylsilylene(6,6-diethyl-1,5,6,7-tetrahydro-s-indacen-1-yl)(t-butylamido)M(R)$_2$; dimethylsilylene(2-methyl-7,7-diethyl-3,6,7,8-tetrahydro-as-indacen-3-yl)(t-butylamido)M(R)$_2$; dimethylsilylene(7,7-diethyl-3,6,7,8-tetrahydro-as-indacen-3-yl)(t-butylamido)M(R)$_2$; dimethylsilylene(2-methyl-6,6-diethyl-1,5,6,7-tetrahydro-s-indacen-1-yl)(cyclododecylamido)M(R)$_2$; dimethylsilylene(6,6-diethyl-1,5,6,7-tetrahydro-s-indacen-1-yl)(cyclododecylamido)M(R)$_2$; dimethylsilylene(2-methyl-7,7-diethyl-3,6,7,8-tetrahydro-as-indacen-3-yl)(cyclododecylamido)M(R)$_2$; dimethylsilylene(7,7-dimethyl-3,6,7,8-tetrahydro-as-indacen-3-yl)(cyclododecylamido)M(R)$_2$; diethylsilylene(2,6,6-trimethyl-1,5,6,7-tetrahydro-s-indacen-1-yl)(t-butylamido)M(R)$_2$; diethylsilylene(6,6-dimethyl-1,5,6,7-tetrahydro-s-indacen-1-yl)(t-butylamido)M(R)$_2$; diethylsilylene(2,7,7-trimethyl-3,6,7,8-tetrahydro-as-indacen-3-yl)(t-butylamido)M(R)$_2$; diethylsilylene(7,7-dimethyl-3,6,7,8-tetrahydro-as-indacen-3-yl)(t-butylamido)M(R)$_2$; dimethylsilylene(2-methyl-3,6,7,8-tetrahydro-as-indacen-3-yl)(cyclohexylamido)M(R)$_2$; dimethylsilylene(2-methyl-3,6,7,8-tetrahydro-as-indacen-3-yl)(cyclododecylamido)M(R)$_2$; dimethylsilylene(2-methyl-3,6,7,8-tetrahydro-as-indacen-3-yl)(adamantylamido)M(R)$_2$; and dimethylsilylene(2-methyl-3,6,7,8-tetrahydro-as-indacen-3-yl)(t-butylamido)M(R)$_2$; wherein M is Ti, Zr or Hf, and R is a halogen or a $C_1$ to $C_{10}$ hydrocarbyl.

58A. The catalyst system of paragraph 40A, wherein the transition metal complex is dimethylsilylene(2,7,7-trimethyl-3,6,7,8-tetrahydro-as-indacen-3-yl)(t-butylamido) titanium dimethyl or dimethylsilylene(2,6,6-trimethyl-1,5,6,7-tetrahydro-s-indacen-1-yl)(t-butylamido)titanium dimethyl.

59A. The catalyst system of paragraph 40A, wherein the first non-coordinating anion borate activator and the second non-coordinating anion borate activator are selected from the group consisting of N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me$_3$NH$^+$][B(C$_6$F$_5$)$_4^-$], 1-(4-(tris(pentafluorophenyl)borate)-2,3,5,6-tetrafluorophenyl) pyrrolidinium; [Me$_3$NH$^+$][B(C$_6$F$_5$)$_4^-$], 1-(4-(tris(pentafluorophenyl)borate)-2,3,5,6-tetrafluorophenyl) pyrrolidinium, sodium tetrakis(pentafluorophenyl)borate, potassium tetrakis(pentafluorophenyl)borate, and 4-(tris(pentafluorophenyl)borate)-2,3,5,6-tetrafluoropyridinium.

60A. The catalyst system of paragraph 40A, wherein the first non-coordinating anion borate activator is N,N-dimethylanilinium tetrakis(pentafluorophenyl)borate and the second non-coordinating anion borate activator is N,N-dimethylanilinium tetrakis(perfluoronaphthyl)borate.

61A. The catalyst system of paragraph 60A, wherein the first non-coordinating borate anion activator is present in a molar excess with respect to the second non-coordinating anion borate activator.

62A. The catalyst system of paragraph 60A, wherein the molar ratio of the first non-coordinating borate activator to the second non-coordinating borate activator ranges from 1:99 to 99:1.

63A. The catalyst system of paragraph 60A, wherein the molar ratio of the first non-coordinating borate activator to the second non-coordinating borate activator ranges from 1:3 to 3:1.

64A. The method of paragraph 1A, wherein the two activators have Calculated Total MV's differing by at least 150 Å$^3$, alternatively at least 200 Å$^3$, alternatively at least 250 Å$^3$, alternatively at least 300 Å$^3$.

65A. The method of paragraph 1A, wherein the ratio of the Calculated Total MV of the second non-coordinating borate activator to the Calculated Total MV of first non-coordinating borate activator is about 1.2 or greater, alternatively about 1.3 or greater, alternatively about 1.4 or greater.

66A. The method of paragraph 1A, wherein the Calculated Total MV of the first non-coordinating borate activator is 732 Å$^3$ or 810 Å$^3$, and the Calculated Total MV of the second non-coordinating borate activator is 966 Å$^3$ or greater, preferably 1044 Å$^3$ or greater.

This invention also relates to:

1B. A method comprising:
1) contacting a catalyst system with an olefinic feed comprising a $C_3$-$C_{40}$ alpha olefin, ethylene, and a diene monomer under polymerization reaction conditions where the $C_3$-$C_{40}$ alpha olefin is present in the olefinic feed in a molar excess relative to a combined molar amount of the ethylene and the diene monomer, the catalyst system comprising a first non-coordinating anion activator, a second non-coordinating anion activator differing from the first non-coordinating anion activator, and a transition metal complex represented by the formula:

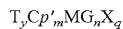

wherein:
M is a group 3, 4, 5, or 6 transition metal;
Cp' is an optionally substituted tetrahydro-s-indacenyl or tetrahydro-as-indacenyl group;
G is a heteroatom group having a formula of $JR'_{z-y}$;
wherein J is N, P, O or S, R' is a $C_1$ to $C_{100}$ optionally substituted hydrocarbyl, halocarbyl, silylcarbyl or germylcarbyl group, and z is 2 when J is N or P, and z is 1 when J is O or S;
T is a bridging group and y is 0 or 1 indicating the absence (y=0) or presence (y=1) of T;
each X is, independently, a leaving group, or two Xs are joined and bound to the metal atom to form a metallocycle ring, or two Xs are joined to form a chelating ligand, a diene ligand, or an alkylidene;
m=1;
n=1, 2 or 3;
q=1, 2 or 3;
wherein a sum of m+n+q is equal to the oxidation state of M; and
2) obtaining a copolymer comprising 1 to 35 mol. % ethylene, 98.9 to 65 mol. % $C_3$-$C_{40}$ olefin, and 0.1 to 10 mol. % diene monomer having an MFR of 30 g/10 min or below.

2B. The method of paragraph 1B, wherein the transition metal complex comprises a tetrahydro-as-indacenyl group represented by the formula:

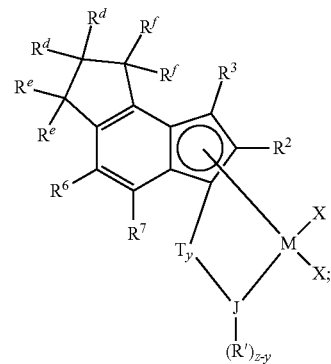

wherein:
M is a group 4 transition metal;
each $R^d$, $R^e$ and $R^f$ is independently hydrogen or a $C_1$-$C_{10}$ alkyl group;
each $R^2$, $R^3$, $R^6$, and $R^7$ is independently hydrogen or a $C_1$-$C_{50}$ optionally substituted hydrocarbyl, halocarbyl, silylcarbyl or germylcarbyl group;
J is N, P, O or S, and z is 2 when J is N or P, and z is 1 when J is O or S, R' is a $C_1$ to $C_{100}$ optionally substituted hydrocarbyl, halocarbyl, silylcarbyl or germylcarbyl group;
T is a bridging group and y is 0 or 1 indicating the absence (y=0) or presence (y=1) of T; and
each X is, independently, a leaving group, or two Xs are joined and bound to the metal atom to form a metallocycle ring, or two Xs are joined to form a chelating ligand, a diene ligand, or an alkylidene.

3B. The method of paragraph 1B, wherein the transition metal complex comprises a tetrahydro-s-indacenyl group represented by the formula:

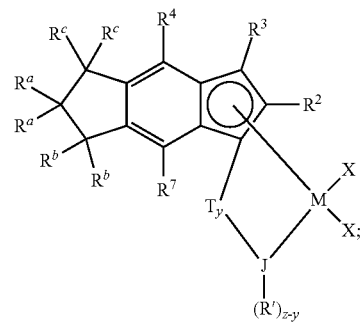

wherein:
M is a group 4 transition metal;
each $R^a$ is independently a $C_1$-$C_{10}$ alkyl group;
each $R^b$ and $R^c$ is independently hydrogen or a $C_1$-$C_{10}$ alkyl group;
each $R^2$, $R^3$, $R^4$ and $R^7$ is independently hydrogen or a $C_1$-$C_{50}$ optionally substituted hydrocarbyl, halocarbyl, silylcarbyl or germylcarbyl group, optionally provided that:
1) $R^3$ and/or $R^4$ are not aryl or substituted aryl,
2) $R^3$ is not directly bonded to a group 15 or 16 heteroatom, and
3) adjacent $R^4$, $R^c$, $R^a$ $R^b$, or $R^7$ do not join together to form a fused ring system;

J is N, P, O or S, and z is 2 when J is N or P, and z is 1 when J is O or S, R' is a $C_1$ to $C_{100}$ optionally substituted hydrocarbyl, halocarbyl, silylcarbyl or germylcarbyl group;

T is a bridging group and y is 0 or 1 indicating the absence (y=0) or presence (y=1) of T; and each X is, independently, a leaving group, or two Xs are joined and bound to the metal atom to form a metallocycle ring, or two Xs are joined to form a chelating ligand, a diene ligand, or an alkylidene.

4B. The method of paragraphs 1B, 2B or 3B, wherein the polymerization reaction occurs at 80° C. or more, preferably 90° C. or more.

5B. The method of paragraphs 1B, 2B or 3B, wherein the molar ratio of the first non-coordinating anion activator to the second non-coordinating anion activator ranges from 1:99 to 99:1, preferably from 1:3 to 3:1.

6B. The method of paragraph 3B, wherein each $R^a$ is methyl and each $R^b$ and $R^c$ are hydrogen.

7B. The method of paragraph 3B, wherein $R^2$ is methyl, ethyl, propyl, butyl, pentyl, hexyl, heptyl, octyl, nonyl, decyl, undecyl, dodecyl or an isomer thereof, and $R^3$, $R^4$ and $R^7$ are all hydrogen.

8B. The method of paragraph 2B, wherein each $R^d$ is methyl and each $R^e$ and $R^f$ are hydrogen.

9B. The method of paragraphs 2B or 8B, wherein $R^2$ is methyl, ethyl, propyl, butyl, pentyl, hexyl, heptyl, octyl, nonyl, decyl, undecyl, dodecyl or an isomer thereof, and $R^3$, $R^6$, and $R^7$ are all hydrogen.

10B. The method of paragraphs 2B or 8B, wherein $R^2$ is methyl and y is 1.

11B. The method of paragraphs 1B, 2B or 3B, wherein y is 1 and T is $(CR^8R^9)_x$, $SiR^8R^9$, or $GeR^8R^9$; wherein x is 1 or 2, and $R^8$ and $R^9$ are independently hydrogen or an optionally substituted hydrocarbyl, halocarbyl, silylcarbyl, or germylcarbyl group and $R^8$ and $R^9$ are optionally bonded together to form a ring structure.

12B. The method of paragraphs 1B, 2B or 3B, wherein M is Ti.

13B. The method of paragraphs 1B, 2B or 3B, wherein J is N.

14B. The method of paragraphs 1B, 2B or 3B, wherein R' is methyl, ethyl, propyl, butyl, pentyl, hexyl, heptyl, octyl, nonyl, decyl, undecyl, dodecyl, phenyl or an isomer thereof.

15B. The method of paragraphs 1B, 2B or 3B, wherein R' is t-butyl, neopentyl, cyclohexyl, cyclooctyl, cyclododecyl, adamantyl, or norbornyl.

16B. The method of paragraphs 1B, 2B or 3B, wherein each X is independently selected from the group consisting of a $C_1$-$C_{20}$ hydrocarbyl group, an aryl group, a hydride, an amide, an alkoxide, a sulfide, a phosphide, a halide, an amine, a phosphine, an ether, and any combination thereof.

17B. The method of paragraphs 1B, 2B or 3B, wherein each X is independently selected from the group consisting of a $C_1$-$C_5$ alkyl group, a halide, and an aryl group.

18B. The method of paragraph 1B, wherein the transition metal complex is selected from the group consisting of dimethylsilylene(2,6,6-trimethyl-1,5,6,7-tetrahydro-s-indacen-1-yl)(t-butylamido)M(R)$_2$; dimethylsilylene(6,6-dimethyl-1,5,6,7-tetrahydro-s-indacen-1-yl)(t-butylamido)M(R)$_2$; dimethylsilylene(2,7,7-trimethyl-3,6,7,8-tetrahydro-as-indacen-3-yl)(t-butylamido)M(R)$_2$; dimethylsilylene(7,7-dimethyl-3,6,7,8-tetrahydro-as-indacen-3-yl)(t-butylamido)M(R)$_2$; dimethylsilylene(2,6,6-trimethyl-1,5,6,7-tetrahydro-s-indacen-1-yl)(cyclododecylamido)M(R)$_2$; dimethylsilylene(6,6-dimethyl-1,5,6,7-tetrahydro-s-indacen-1-yl)(cyclododecylamido)M(R)$_2$; dimethylsilylene(2,7,7-trimethyl-3,6,7,8-tetrahydro-as-indacen-3-yl)(cyclododecylamido)M(R)$_2$; dimethylsilylene(7,7-dimethyl-3,6,7,8-tetrahydro-as-indacen-3-yl)(cyclododecylamido)M(R)$_2$; dimethylsilylene(2,6,6-trimethyl-1,5,6,7-tetrahydro-s-indacen-1-yl)(cyclohexylamido)M(R)$_2$; dimethylsilylene(6,6-dimethyl-1,5,6,7-tetrahydro-s-indacen-1-yl)(cyclohexylamido)M(R)$_2$; dimethylsilylene(2,7,7-trimethyl-3,6,7,8-tetrahydro-as-indacen-3-yl)(cyclohexylamido)M(R)$_2$; dimethylsilylene(7,7-dimethyl-3,6,7,8-tetrahydro-as-indacen-3-yl)(cyclohexylamido)M(R)$_2$; dimethylsilylene(2,6,6-trimethyl-1,5,6,7-tetrahydro-s-indacen-1-yl)(adamantylamido)M(R)$_2$; dimethylsilylene(6,6-dimethyl-1,5,6,7-tetrahydro-s-indacen-1-yl)(adamantylamido)M(R)$_2$; dimethylsilylene(2,7,7-trimethyl-3,6,7,8-tetrahydro-as-indacen-3-yl)(adamantylamido)M(R)$_2$; dimethylsilylene(7,7-dimethyl-3,6,7,8-tetrahydro-as-indacen-3-yl)(adamantylamido)M(R)$_2$; dimethylsilylene(2,6,6-trimethyl-1,5,6,7-tetrahydro-s-indacen-1-yl)(neopentylamido)M(R)$_2$; dimethylsilylene(6,6-dimethyl-1,5,6,7-tetrahydro-s-indacen-1-yl)(neopentylamido)M(R)$_2$; dimethylsilylene(2,7,7-trimethyl-3,6,7,8-tetrahydro-as-indacen-3-yl)(neopentylamido)M(R)$_2$; dimethylsilylene(7,7-dimethyl-3,6,7,8-tetrahydro-as-indacen-3-yl)(neopentylamido)M(R)$_2$; dimethylsilylene(2-methyl-6,6-diethyl-1,5,6,7-tetrahydro-s-indacen-1-yl)(t-butylamido)M(R)$_2$; dimethylsilylene(6,6-diethyl-1,5,6,7-tetrahydro-s-indacen-1-yl)(t-butylamido)M(R)$_2$; dimethylsilylene(2-methyl-7,7-diethyl-3,6,7,8-tetrahydro-as-indacen-3-yl)(t-butylamido)M(R)$_2$; dimethylsilylene(7,7-diethyl-3,6,7,8-tetrahydro-as-indacen-3-yl)(t-butylamido)M(R)$_2$; dimethylsilylene(2-methyl-6,6-diethyl-1,5,6,7-tetrahydro-s-indacen-1-yl)(cyclododecylamido)M(R)$_2$; dimethylsilylene(6,6-diethyl-1,5,6,7-tetrahydro-s-indacen-1-yl)(cyclododecylamido)M(R)$_2$; dimethylsilylene(2-methyl-7,7-diethyl-3,6,7,8-tetrahydro-as-indacen-3-yl)(cyclododecylamido)M(R)$_2$; dimethylsilylene(7,7-dimethyl-3,6,7,8-tetrahydro-as-indacen-3-yl)(cyclododecylamido)M(R)$_2$; diethylsilylene(2,6,6-trimethyl-1,5,6,7-tetrahydro-s-indacen-1-yl)(t-butylamido)M(R)$_2$; diethylsilylene(6,6-dimethyl-1,5,6,7-tetrahydro-s-indacen-1-yl)(t-butylamido)M(R)$_2$; diethylsilylene(2,7,7-trimethyl-3,6,7,8-tetrahydro-as-indacen-3-yl)(t-butylamido)M(R)$_2$; diethylsilylene(7,7-dimethyl-3,6,7,8-tetrahydro-as-indacen-3-yl)(t-butylamido)M(R)$_2$; dimethylsilylene(2-methyl-3,6,7,8-tetrahydro-as-indacen-3-yl)(cyclohexylamido)M(R)$_2$; dimethylsilylene(2-methyl-3,6,7,8-tetrahydro-as-indacen-3-yl)(cyclododecylamido)M(R)$_2$; dimethylsilylene(2-methyl-3,6,7,8-tetrahydro-as-indacen-3-yl)(adamantylamido)M(R)$_2$; and dimethylsilylene(2-methyl-3,6,7,8-tetrahydro-as-indacen-3-yl)(t-butylamido)M(R)$_2$; wherein M is Ti, Zr or Hf, and R is a halogen or a $C_1$ to $C_{10}$ hydrocarbyl.

19B. The method of paragraph 1B, wherein the transition metal complex is dimethylsilylene(2,7,7-trimethyl-3,6,7,8-tetrahydro-as-indacen-3-yl)(t-butylamido)titanium dimethyl or dimethylsilylene(2,6,6-trimethyl-1,5,6,7-tetrahydro-s-indacen-1-yl)(t-butylamido)titanium dimethyl.

20B. The method of paragraphs 1B, 2B or 3B, wherein the first non-coordinating anion activator and the second non-coordinating anion activator are selected from the group consisting of: N,N-dimethylanilinium tetrakis(perfluoronaphthyl)borate, N,N-dimethylanilinium tetrakis (perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, $[Me_3NH^+][B(C_6F_5)^{4-}]$, 1-(4-(tris(pentafluorophenyl)borate)-2,3,5,6-tetrafluorophenyl) pyrrolidinium; $[Me_3NH^+][B(C_6F_5)^{4-}]$, 1-(4-(tris(pentafluorophenyl)borate)-2,3,5,6-tetrafluorophenyl) pyrrolidinium, sodium tetrakis(pentafluorophenyl)borate, potassium tetrakis(pentafluorophenyl)borate, and 4-(tris(pentafluorophenyl)borate)-2,3,5,6-tetrafluoropyridinium.

21B. The method of paragraphs 1B, 2B or 3B, wherein the first non-coordinating anion activator is N,N-dimethylanilinium tetrakis(pentafluorophenyl)borate and the second non-coordinating anion activator is N,N-dimethylaniliniumtetrakis(perfluoronaphthyl)borate.

22B. The method of paragraph 21B, wherein the first non-coordinating anion activator is present in a molar excess with respect to the second non-coordinating anion activator.

23B. The method of paragraph 21B, wherein the molar ratio of the first non-coordinating anion activator to the second non-coordinating anion activator ranges from 1:99 to 99:1.

24B. The method of paragraph 21B, wherein the molar ratio of the first non-coordinating anion activator to the second non-coordinating anion activator ranges from 1:3 to 3:1.

25B. The method of paragraphs 1B, 2B or 3B, wherein the $C_3$-$C_{40}$ alpha olefin is selected from the group consisting of propylene, 1-butene, 1-pentene, 1-hexene, 1-heptene, 1-octene, 1-nonene, 1-decene, 1-undecene, 1-dodecene, isomers thereof having a terminal carbon-carbon double bond, and any combination thereof.

26B. The method of paragraphs 1B, 2B or 3B, wherein the $C_3$-$C_{20}$ alpha olefin is propylene.

27B. The method of paragraphs 1B, 2B or 3B, wherein the diene monomer is selected from the group consisting of 5-ethylidene-2-norbornene, 1,4-hexadiene, 5-methylene-2-norbornene, 1,6-octadiene, 5-methyl-1,4-hexadiene, 3,7-dimethyl-1,6-octadiene, dicyclopentadiene, and any combination thereof.

28B. The method of paragraphs 1B, 2B or 3B, wherein the diene monomer is 5-ethylidene-2-norbornene.

29B. The method of paragraphs 1B, 2B or 3B, wherein the catalyst system has a catalytic efficiency of at least about 25,000 g terpolymer/g transition metal complex.

30B. The method of paragraphs 1B, 2B or 3B, wherein the copolymer has an Mn value of about 60,000 g/mol or above, a Mw value of about 150,000 g/mol or above, and/or an Mz value of about 220,000 g/mol or above.

31B. The method of paragraphs 1B, 2B or 3B, wherein contacting the olefinic feed with the catalyst system takes place at a temperature of about 80° C. or greater.

32B. The method of paragraphs 1B, 2B or 3B, wherein the first non-coordinating anion activator and the second non-coordinating anion activator interact synergistically under the polymerization reaction conditions such that the melt flow rate changes non-linearly as a function of the molar ratio of the first non-coordinating anion activator to the second non-coordinating anion activator, when measured under the same polymerization conditions, except for having different activator ratios.

33B. A copolymer comprising: 1 to 35 mol. % ethylene; 98.9 to 65 mol. % $C_3$-$C_{40}$ alpha olefin; and 0.1 to 10 mol. % diene monomer, and having a melt flow rate of 30 g/10 min or less (ASTM D 1238, 230° C., 2.16 kg).

34B. The copolymer of paragraph 33B, wherein the copolymer has an Mn value of about 60,000 g/mol or above, a Mw value of about 150,000 g/mol or above, and/or an Mz value of about 220,000 g/mol or above.

35B. The copolymer of paragraphs 33B or 34B, wherein the copolymer comprises 98.9 to 85 mol. % $C_3$-$C_{40}$ alpha olefin.

36B. The copolymer of paragraph 35B, wherein the $C_3$-$C_{40}$ alpha olefin is selected from the group consisting of propylene, 1-butene, 1-pentene, 1-hexene, 1-heptene, 1-octene, 1-nonene, 1-decene, 1-undecene, 1-dodecene, isomers thereof having a terminal double bond, and any combination thereof.

37B. The copolymer of paragraph 35B or 36B, wherein the $C_3$-$C_{20}$ alpha olefin is propylene.

38B. The copolymer of paragraph 33B or 34B, wherein the diene monomer is selected from the group consisting of 5-ethylidene-2-norbornene, 1,4-hexadiene, 5-methylene-2-norbornene, 1,6-octadiene, 5-methyl-1,4-hexadiene, 3,7-dimethyl-1,6-octadiene, dicyclopentadiene, and any combination thereof.

39B. The copolymer of paragraph 33B or 34B, wherein the diene monomer is 5-ethylidene-2-norbornene.

40B. A catalyst system comprising:
a first non-coordinating anion borate activator;
a second non-coordinating anion borate activator differing from the first non-coordinating anion borate activator; and
a transition metal complex represented by the formula:

$$T_y Cp'_m MG_n X_q$$

wherein:
M is a group 3, 4, 5, or 6 transition metal;
Cp' is an optionally substituted tetrahydro-s-indacenyl or tetrahydro-as-indacenyl group;
G is a heteroatom group having a formula of $JR'_{z-y}$;
wherein J is N, P, O or S, and z is 2 when J is N or P, and z is 1 when J is O or S, and R' is a $C_1$ to $C_{100}$ optionally substituted hydrocarbyl, halocarbyl, silylcarbyl or germylcarbyl group;
T is a bridging group and y is 0 or 1 indicating the absence (y=0) or presence (y=1) of T;
each X is, independently, a leaving group, or two Xs are joined and bound to the metal atom to form a metallocycle ring, or two Xs are joined to form a chelating ligand, a diene ligand, or an alkylidene;
m=1;
n=1, 2 or 3; and
q=1, 2 or 3;
wherein a sum of m+n+q is equal to the oxidation state of M; and
wherein the first non-coordinating anion borate activator and the second non-coordinating anion borate activator are present in a molar ratio such that a melt flow rate for a polymer formed under polymerization reaction conditions in the presence of the catalyst system changes non-linearly as a function of the molar ratio of the first non-coordinating anion borate activator to the second non-coordinating anion borate activator.

41B. The catalyst system of paragraph 40B, wherein Cp' is a tetrahydro-s-indacenyl group, and wherein: 1) the 3- and/or 4-positions of the tetrahydro-s-indacenyl group are not substituted with an aryl or substituted aryl group, 2) the 3-position of the tetrahydro-s-indacenyl group is not directly bonded to a group 15 or group 16 heteroatom, 3)

no additional rings are fused to the tetrahydro-s-indacenyl group, 4) T is not bonded to the 2-position of the tetrahydro-s-indacenyl group, and 5) the 5-, 6-, or 7-position of the tetrahydro-s-indacenyl group is geminally disubstituted.

42B. The catalyst system of paragraph 40B, wherein the transition metal complex is represented by the formula:

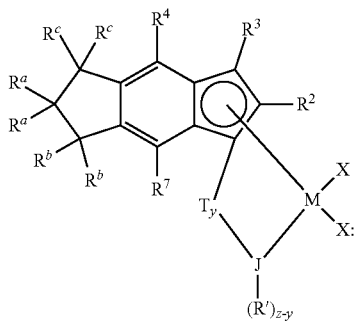

wherein:

M is a group 4 transition metal;

each $R^a$ is independently a $C_1$-$C_{10}$ alkyl group;

each $R^b$ and $R^c$ is independently hydrogen or a $C_1$-$C_{10}$ alkyl group;

each $R^2$, $R^3$, $R^4$ and $R^7$ is independently hydrogen or a $C_1$-$C_{50}$ optionally substituted hydrocarbyl, halocarbyl, silylcarbyl or germylcarbyl group, optionally provided that:

1) $R^3$ and/or $R^4$ are not aryl or substituted aryl,

2) $R^3$ is not directly bonded to a group 15 or 16 heteroatom, and 3) adjacent $R^4$, $R^c$, $R^a$ $R^b$, or $R^7$ do not join together to form a fused ring system;

J is N, P, O or S, and z is 2 when J is N or P, and z is 1 when J is O or S, R' is a $C_1$ to $C_{100}$ optionally substituted hydrocarbyl, halocarbyl, silylcarbyl or germylcarbyl group;

T is a bridging group and y is 0 or 1 indicating the absence (y=0) or presence (y=1) of T; and each X is, independently, a leaving group, or two Xs are joined and bound to the metal atom to form a metallocycle ring, or two Xs are joined to form a chelating ligand, a diene ligand, or an alkylidene.

43B. The catalyst system of paragraph 42B, wherein each $R^a$ is methyl and $R^b$ and $R^c$ are both hydrogen.

44B. The catalyst system of paragraph 42B, wherein $R^2$ is methyl, ethyl, propyl, butyl, pentyl, hexyl, heptyl, octyl, nonyl, decyl, undecyl, dodecyl or an isomer thereof, and $R^3$, $R^4$ and $R^7$ are all hydrogen.

45B. The catalyst system of paragraph 40B, wherein the transition metal complex is represented by the formula:

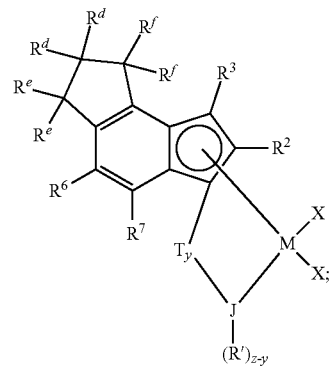

wherein:

M is a group 4 transition metal;

each $R^d$, $R^e$ and $R^f$ is independently hydrogen or a $C_1$-$C_{10}$ alkyl group;

each $R^2$, $R^3$, $R^6$, and $R^7$ is independently hydrogen or a $C_1$-$C_{50}$ optionally substituted hydrocarbyl, halocarbyl, silylcarbyl or germylcarbyl group;

J is N, P, O or S, and z is 2 when J is N or P, and z is 1 when J is O or S, R' is a $C_1$ to $C_{100}$ optionally substituted hydrocarbyl, halocarbyl, silylcarbyl or germylcarbyl group;

T is a bridging group and y is 0 or 1 indicating the absence (y=0) or presence (y=1) of T; and each X is, independently, a leaving group, or two Xs are joined and bound to the metal atom to form a metallocycle ring, or two Xs are joined to form a chelating ligand, a diene ligand, or an alkylidene.

46B. The catalyst system of paragraph 45B, wherein each $R^d$ is methyl and $R^e$ and $R^f$ are both hydrogen.

47B. The catalyst system of paragraph 45B, wherein $R^2$ is methyl, ethyl, propyl, butyl, pentyl, hexyl, heptyl, octyl, nonyl, decyl, undecyl, dodecyl or an isomer thereof, and $R^3$, $R^6$, and $R^7$ are all hydrogen.

48B. The catalyst system of paragraphs 42B or 45B, wherein $R^2$ is methyl.

49B. The catalyst system of paragraphs 40B, 42B or 45B, wherein y is 1.

50B. The catalyst system of paragraphs 40B, 42B or 45B, wherein y is 1 and T is $(CR^8R^9)_x$, $SiR^8R^9$, or $GeR^8R^9$; wherein x is 1 or 2, and $R^8$ and $R^9$ are independently hydrogen or an optionally substituted hydrocarbyl, halocarbyl, silylcarbyl, or germylcarbyl group, $R^8$ and $R^9$ are optionally bonded together to form a ring structure.

51B. The catalyst system of paragraphs 40B. 42B or 45B, wherein M is Ti.

52B. The catalyst system of paragraphs 40B, 42B or 45B, wherein J is N.

53B. The catalyst system of paragraphs 42B or 45B, wherein R' is methyl, ethyl, propyl, butyl, pentyl, hexyl, heptyl, octyl, nonyl, decyl, undecyl, dodecyl, phenyl or an isomer thereof.

54B. The catalyst system of paragraphs 42B or 45B, wherein R' is t-butyl, neopentyl, cyclohexyl, cyclooctyl, cyclododecyl, adamantyl, or norbornyl.

55B. The catalyst system of paragraphs 40B, 42B or 45B, wherein each X is independently selected from the group consisting of a $C_1$-$C_{20}$ hydrocarbyl group, an aryl group, a hydride, an amide, an alkoxide, a sulfide, a phosphide, a halide, an amine, a phosphine, an ether, and any combination thereof.

56B. The catalyst system of paragraphs 40B, 42B or 45B, wherein each X is independently selected from the group consisting of a $C_1$-$C_5$ alkyl group, a halide, and an aryl group.

57B. The catalyst system of paragraph 40B, wherein the transition metal complex is selected from the group consisting of dimethylsilylene(2,6,6-trimethyl-1,5,6,7-tetrahydro-s-indacen-1-yl)(t-butylamido)M(R)$_2$; dimethylsilylene(6,6-dimethyl-1,5,6,7-tetrahydro-s-indacen-1-yl)(t-butylamido)M(R)$_2$; dimethylsilylene(2,7,7-trimethyl-3,6,7,8-tetrahydro-as-indacen-3-yl)(t-butylamido)M(R)$_2$; dimethylsilylene(7,7-dimethyl-3,6,7,8-tetrahydro-as-indacen-3-yl)(t-butylamido)M(R)$_2$; dimethylsilylene(2,6,6-trimethyl-1,5,6,7-tetrahydro-s-indacen-1-yl)(cyclododecylamido)M(R)$_2$; dimethylsilylene(6,6-dimethyl-1,5,6,7-tetrahydro-s-indacen-1-yl)(cyclododecylamido)M(R)$_2$; dimethylsilylene(2,7,7-trimethyl-3,6,7,8-tetrahydro-as-indacen-3-yl)(cyclododecylamido)M(R)$_2$; dimethylsilylene(7,7-dimethyl-3,6,7,8-tetrahydro-as-indacen-3-yl)(cyclododecylamido)M(R)$_2$; dimethylsilylene(2,6,6-trimethyl-1,5,6,7-tetrahydro-s-indacen-1-yl)(cyclohexylamido)M(R)$_2$; dimethylsilylene(6,6-dimethyl-1,5,6,7-tetrahydro-s-indacen-1-yl)(cyclohexylamido)M(R)$_2$; dimethylsilylene(2,7,7-trimethyl-3,6,7,8-tetrahydro-as-indacen-3-yl)(cyclohexylamido)M(R)$_2$; dimethylsilylene(7,7-dimethyl-3,6,7,8-tetrahydro-as-indacen-3-yl)(cyclohexylamido)M(R)$_2$; dimethylsilylene(2,6,6-trimethyl-1,5,6,7-tetrahydro-s-indacen-1-yl)(adamantylamido)M(R)$_2$; dimethylsilylene(6,6-dimethyl-1,5,6,7-tetrahydro-s-indacen-1-yl)(adamantylamido)M(R)$_2$; dimethylsilylene(2,7,7-trimethyl-3,6,7,8-tetrahydro-as-indacen-3-yl)(adamantylamido)M(R)$_2$; dimethylsilylene(7,7-dimethyl-3,6,7,8-tetrahydro-as-indacen-3-yl)(adamantylamido)M(R)$_2$; dimethylsilylene(2,6,6-trimethyl-1,5,6,7-tetrahydro-s-indacen-1-yl)(neopentylamido)M(R)$_2$; dimethylsilylene(6,6-dimethyl-1,5,6,7-tetrahydro-s-indacen-1-yl)(neopentylamido)M(R)$_2$; dimethylsilylene(2,7,7-trimethyl-3,6,7,8-tetrahydro-as-indacen-3-yl)(neopentylamido)M(R)$_2$; dimethylsilylene(7,7-dimethyl-3,6,7,8-tetrahydro-as-indacen-3-yl)(neopentylamido)M(R)$_2$; dimethylsilylene(2-methyl-6,6-diethyl-1,5,6,7-tetrahydro-s-indacen-1-yl)(t-butylamido)M(R)$_2$; dimethylsilylene(6,6-diethyl-1,5,6,7-tetrahydro-s-indacen-1-yl)(t-butylamido)M(R)$_2$; dimethylsilylene(2-methyl-7,7-diethyl-3,6,7,8-tetrahydro-as-indacen-3-yl)(t-butylamido)M(R)$_2$; dimethylsilylene(7,7-diethyl-3,6,7,8-tetrahydro-as-indacen-3-yl)(t-butylamido)M(R)$_2$; dimethylsilylene(2-methyl-6,6-diethyl-1,5,6,7-tetrahydro-s-indacen-1-yl)(cyclododecylamido)M(R)$_2$; dimethylsilylene(6,6-diethyl-1,5,6,7-tetrahydro-s-indacen-1-yl)(cyclododecylamido)M(R)$_2$; dimethylsilylene(2-methyl-7,7-diethyl-3,6,7,8-tetrahydro-as-indacen-3-yl)(cyclododecylamido)M(R)$_2$; dimethylsilylene(7,7-dimethyl-3,6,7,8-tetrahydro-as-indacen-3-yl)(cyclododecylamido)M(R)$_2$; diethylsilylene(2,6,6-trimethyl-1,5,6,7-tetrahydro-s-indacen-1-yl)(t-butylamido)M(R)$_2$; diethylsilylene(6,6-dimethyl-1,5,6,7-tetrahydro-s-indacen-1-yl)(t-butylamido)M(R)$_2$; diethylsilylene(2,7,7-trimethyl-3,6,7,8-tetrahydro-as-indacen-3-yl)(t-butylamido)M(R)$_2$; diethylsilylene(7,7-dimethyl-3,6,7,8-tetrahydro-as-indacen-3-yl)(t-butylamido)M(R)$_2$; dimethylsilylene(2-methyl-3,6,7,8-tetrahydro-as-indacen-3-yl)(cyclohexylamido)M(R)$_2$; dimethylsilylene(2-methyl-3,6,7,8-tetrahydro-as-indacen-3-yl)(cyclododecylamido)M(R)$_2$; dimethylsilylene(2-methyl-3,6,7,8-tetrahydro-as-indacen-3-yl)(adamantylamido)M(R)$_2$; and dimethylsilylene(2-methyl-3,6,7,8-tetrahydro-as-indacen-3-yl)(t-butylamido)M(R)$_2$; wherein M is Ti, Zr or Hf, and R is a halogen or a $C_1$ to $C_{10}$ hydrocarbyl.

58B. The catalyst system of paragraph 40B, wherein the transition metal complex is dimethylsilylene(2,7,7-trimethyl-3,6,7,8-tetrahydro-as-indacen-3-yl)(t-butylamido) titanium dimethyl or dimethylsilylene(2,6,6-trimethyl-1,5,6,7-tetrahydro-s-indacen-1-yl)(t-butylamido)titanium dimethyl.

59B. The catalyst system of paragraphs 40B, 42B or 45B, wherein the first non-coordinating anion borate activator and the second non-coordinating anion borate activator are selected from the group consisting of N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me$_3$NH$^+$][B(C$_6$F$_5$)$^{4-}$], 1-(4-(tris(pentafluorophenyl)borate)-2,3,5,6-tetrafluorophenyl) pyrrolidinium; [Me$_3$NH$^+$][B(C$_6$F$_5$)$^{4-}$], 1-(4-(tris(pentafluorophenyl)borate)-2,3,5,6-tetrafluorophenyl) pyrrolidinium, sodium tetrakis(pentafluorophenyl)borate, potassium tetrakis(pentafluorophenyl)borate, and 4-(tris(pentafluorophenyl)borate)-2,3,5,6-tetrafluoropyridinium.

60B. The catalyst system of paragraphs 40B, 42B or 45B, wherein the first non-coordinating anion borate activator is N,N-dimethylanilinium tetrakis(pentafluorophenyl)borate and the second non-coordinating anion borate activator is N,N-dimethylanilinium tetrakis(perfluoronaphthyl)borate.

61B. The catalyst system of paragraph 60B, wherein the first non-coordinating borate anion activator is present in a molar excess with respect to the second non-coordinating anion borate activator.

62B. The catalyst system of paragraph 60B, wherein the molar ratio of the first non-coordinating borate activator to the second non-coordinating borate activator ranges from 1:99 to 99:1.

63B. The catalyst system of paragraph 60B, wherein the molar ratio of the first non-coordinating borate activator to the second non-coordinating borate activator ranges from 1:3 to 3:1.

64B. The method of paragraph 1B, wherein the two activators have Calculated Total MV's differing by at least 150 Å$^3$, alternatively at least 200 Å$^3$, alternatively at least 250 Å$^3$, alternatively at least 300 Å$^3$.

65B. The method of paragraph 1B, wherein the ratio of the Calculated Total MV of the second non-coordinating borate activator to the Calculated Total MV of first non-coordinating borate activator is about 1.2 or greater, alternatively about 1.3 or greater, alternatively about 1.4 or greater.

66B. The method of paragraph 1B, wherein the Calculated Total MV of the first non-coordinating borate activator is 732 Å$^3$ or 810 Å$^3$, and the Calculated Total MV of the second non-coordinating borate activator is 966 Å$^3$ or greater, preferably 1044 Å$^3$ or greater.

To facilitate a better understanding of the embodiments described herein, the following examples of various representative embodiments are given. In no way should the following examples be read to limit, or to define, the scope of the present disclosure.

Experimental

Test Methods

Ethylene content of the copolymer in the examples below is determined using FTIR according to ASTM D3900 and is not corrected for diene content unless otherwise mentioned. ENB content is determined using FTIR according to ASTM D6047.

For purposes of the present disclosure, the mole fractions of ethylene, $C_3$-$C_{40}$ olefin, and diene are calculated using Equations 11, 12, and 13, respectively:

$$C_2 \text{ mole fraction} = \frac{\frac{\text{wt. \% } C_2}{Mw(C_2)}}{\frac{\text{wt. \% } C_2}{Mw(C_2)} + \frac{100 - \text{wt. \% } C_2 - \text{wt. \% diene}}{Mw(C_3 - C_{40}) \text{ olefin}} + \frac{\text{wt. \% diene}}{Mw(\text{diene})}} \quad \text{(Equation 11)}$$

$$C_3 - C_{40} \text{ mole fraction} = \frac{\frac{100 - \text{wt. \% } C_2 - \text{wt. \% diene}}{Mw(C_3 - C_{40} \text{ olefin})}}{\frac{\text{wt. \% } C_2}{Mw(C_2)} + \frac{100 - \text{wt. \% } C_2 - \text{wt. \% diene}}{Mw(C_3 - C_{40}) \text{ olefin}} + \frac{\text{wt. \% diene}}{Mw(\text{diene})}} \quad \text{(Equation 12)}$$

$$\text{Diene mole fraction} = \frac{\frac{\text{wt. \% diene}}{Mw(\text{diene})}}{\frac{\text{wt. \% } C_2}{Mw(C_2)} + \frac{100 - \text{wt. \% } C_2 - \text{wt. \% diene}}{Mw(C_3 - C_{40}) \text{ olefin}} + \frac{\text{wt. \% diene}}{Mw(\text{diene})}} \quad \text{(Equation 13)}$$

where "Mw($C_2$)" is the molecular weight of ethylene in g/mol, "Mw($C_3$-$C_{40}$ olefin)" is the molecular weight of the $C_3$-$C_{40}$ olefin in g/mol, and "Mw(diene)" is the molecular weight of diene in g/mol.

Wt. % of $C_2$, wt. % of $C_3$-$C_{40}$ olefin and wt. % of diene can be measured by $^{13}C$ NMR and in some cases by $^1H$ NMR. Wt. % numbers throughout this document are corrected numbers wherein wt. % of $C_2$ plus wt. % of $C_3$-$C_{40}$ olefin plus wt. % of diene equals 100%, unless specifically referred to as being uncorrected. Uncorrected values ignore the diene component of the polymer (i.e., wt. % of $C_2$ plus wt. % of $C_3$-$C_{40}$ olefin equals 100%).

For ethylene-propylene and ethylene-propylene-diene copolymers, FTIR is typically used to measure ethylene and diene content (when present), using ASTM D3900 and ASTM D6047. The former provides uncorrected $C_2$ wt. % values. The wt. % of $C_2$ can be calculated from uncorrected wt. % $C_2$ using Equation 14:

wt. % $C_2$=[uncorrected wt. % $C_2$×(100−wt. % diene)]/100 (Equation 14)

where the wt. % of ethylene and wt. % of diene are determined by FTIR or by NMR methods. When the $C_3$-$C_{40}$ olefin is propylene, ASTM D3900 is followed to determine propylene content. When the diene is ENB, ASTM D6047 is followed to determine ENB content. If ASTM established IR methods are not available for other $C_3$-$C_{40}$ olefins, and/or other dienes, $^{13}C$ NMR may be used (in event of conflict between FTIR and $^{13}C$ NMR, the $^{13}C$ NMR shall be used).

The mole percents (mol. %) of ethylene, $C_3$-$C_{40}$ olefin, and diene are then calculated by multiplying the mole fraction of ethylene, $C_3$-$C_{40}$ olefin, and diene, respectively, by 100.

Melt Flow Rate (MFR) is determined according to ASTM D1238 D, at 230° C. and 2.16 kg load, and is expressed as dg/min or g/10 min.

Polymerizations

In the examples below, the catalyst used was dimethylsilylene(2,6,6-trimethyl-1,5,6,7-tetrahydro-s-indacen-1-yl)(tert-butylamido)titanium dimethyl

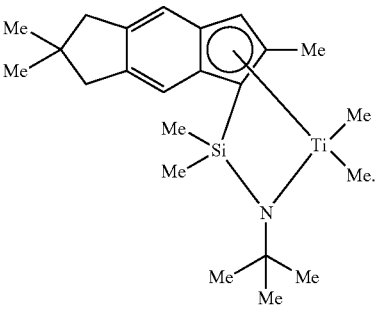

In the examples below, Activator 2 (A2) is N,N-dimethylanilinium tetrakis(perfluoronaphthyl)borate, and Activator 1 (A1) is N,N-dimethylanilinium tetrakis(perfluorophenyl)borate.

All examples were produced using a solution process in a 1.0-liter continuous stirred-tank reactor (autoclave reactor). The autoclave reactor was equipped with a stirrer, a water-cooling/steam-heating element with a temperature controller, and a pressure controller. Solvents and monomers were purified by passing through purification columns packed with molecular sieves. Isohexane (solvent) was passed through four columns in series whereas ethylene, propylene, and toluene were each purified by passing through two columns in series. Purification columns are regenerated periodically (~twice/year) or whenever there is evidence of low catalyst activity. 5-ethylidene-2-norbornene (ENB) was purified in a glove box by passing through a bed of basic alumina under a steady nitrogen gas purge. Tri-n-octylaluminum (TNOAL, available from Sigma Aldrich, Milwaukee, Wis.) solution was diluted to a concentration of 1.843×$10^{-6}$ using isohexane.

Isohexane and TNOAL solutions were fed using Pulsa pumps and their flow rate was controlled using a pump calibration curve. Purified propylene and 5-ethylidene-2-norbornene (ENB) were also fed using Pulsa pumps but their flow rate was controlled using mass-flow controllers. The feed rate of purified ethylene was also regulated using a mass flow controller. Ethylene and propylene combined into a single line before entering a manifold upstream of the reactor. Isohexane, TNOAL solution, and ENB solution lines also combined in a single line before entering the same manifold. The resulting two lines merged further downstream and the combined mixture of monomers and solvent was fed into the reactor using a single tube.

Both the catalyst and activators (or mixture of activators) were first dissolved in toluene and the solution was kept in an inert atmosphere. The solutions of catalyst and activator (or mixture of activators) were premixed and fed into the reactor using an ISCO syringe pump. The catalyst to activator feed ratio (molar) was set at 0.98:1. The catalyst was supplied to the reactor at a rate of $2.68 \times 10^{-7}$ mol/min using a toluene solution having a concentration of $1.34 \times 10^{-7}$ units/mL. Tri-n-octylaluminum was supplied to the reactor at a rate of $7.37 \times 10^{-6}$ mol/min. Isohexane solvent was supplied at a feed rate of 61 g/min. Ethylene was supplied at a feed rate of 0.7 g/min, propylene was supplied at a feed rate of 12 g/min, and ENB was supplied at a feed rate of 0.33 g/min.

Composition was controlled by adjusting the feed ratio of the monomers. To establish a comparative process, samples were produced under similar process conditions with the only difference being the type of activator/mixture of activators used. The collected samples were first placed on a boiling-water steam table in a hood to evaporate a large fraction of the solvent and unreacted monomers, and then dried in a vacuum oven at a temperature of about 90° C. for about 12 hours. The vacuum oven dried samples were weighed to obtain yields. Catalyst activity (also referred to as catalyst productivity) was calculated based the yield and the feed rate of catalyst. All the reactions were carried out at a temperature of 100° C. and a gauge pressure of about 2.2 MPa. Reaction conditions and data are reported in Table 3.

TABLE 3

| Example | Activator A1 (mol/min) | Activator A2 (mol/min) | Mol. % A2 (%) | Overall Monomer Conv. (wt. %) | Polymer Production (g/min) | Cat. Eff. ($g_{poly}/g_{cat}$) | FTIR Uncorr. $C_2$ (wt. %) | ENB (wt. %) |
|---|---|---|---|---|---|---|---|---|
| Group I |
| 1 | 0 | $2.73 \times 10^{-7}$ | 100 | 21.6 | 2.8 | 26,111 | 8.6 | 2.7 |
| 2 | $6.83 \times 10^{-8}$ | $2.05 \times 10^{-7}$ | 75 | 27.4 | 3.6 | 33,056 | 7.5 | 2.4 |
| 3 | $1.37 \times 10^{-7}$ | $1.37 \times 10^{-7}$ | 50 | 27.5 | 3.6 | 33,241 | 7.7 | 2.3 |
| 4 | $2.05 \times 10^{-7}$ | $6.83 \times 10^{-8}$ | 25 | 29.0 | 3.8 | 35,000 | 7.4 | 2.5 |
| 5[a] | $2.73 \times 10^{-7}$ | 0 | 0 | 27.1 | 3.6 | 32,685 | 7.9 | 2.3 |
| Group II |
| 6[b] | $2.73 \times 10^{-7}$ | 0 | 0 | 19.0 | 2.5 | 22,901 | 8.2 | 2.5 |
| 7[b] | $2.05 \times 10^{-7}$ | $6.83 \times 10^{-8}$ | 25 | 21.7 | 2.8 | 26,173 | 7.8 | 2.4 |
| 8 | $1.37 \times 10^{-7}$ | $1.37 \times 10^{-7}$ | 50 | 22.9 | 3.0 | 27,654 | 7.9 | 2.3 |
| 9 | $6.83 \times 10^{-8}$ | $2.05 \times 10^{-7}$ | 75 | 32.5 | 4.2 | 39,259 | 6.7 | 2.2 |
| 10 | 0 | $2.73 \times 10^{-7}$ | 100 | 26.4 | 3.4 | 31,852 | 8.5 | 2.4 |

| Example | Mol. % A2 (%) | MFR (g/10 min) | GPC-4D* Mn (g/mol) | Mw (g/mol) | Mz (g/mol) | Mw/Mn | Bulk $C_2$ (wt. %) |
|---|---|---|---|---|---|---|---|
| Group I |
| 1 | 100 | 4.4 | 124,017 | 275,266 | 479,181 | 2.22 | 10.12 |
| 2 | 75 | 1.1 | 114,061 | 249,360 | 430,057 | 2.19 | 9.24 |
| 3 | 50 | 3.5 | 84,775 | 187,166 | 328,955 | 2.21 | 9.66 |
| 4 | 25 | 5.3 | 76,977 | 168,395 | 295,709 | 2.19 | 9.51 |
| 5[a] | 0 | 85.9 | 41,906 | 91,773 | 159,525 | 2.19 | 9.34 |
| Group II |
| 6[b] | 0 | 55.3 | 42,192 | 91,496 | 154,075 | 2.17 | 10.01 |
| 7 | 25 | 12.4 | 62,963 | 135,152 | 228,741 | 2.15 | 9.84 |
| 8 | 50 | 9.2 | 67,874 | 146,036 | 249,876 | 2.15 | 9.85 |
| 9 | 75 | 5.8 | 75,775 | 167,280 | 292,896 | 2.21 | 8.48 |
| 10 | 100 | 1.2 | 111,561 | 242,196 | 422,205 | 2.17 | 9.79 |

[a]average of three samples
[b]average of two samples
*Molecular weight data reported is from the GPC-IR detector or the GPC-4D as described above.

A small amount of A2 resulted in polymers with on-spec MFR. To confirm this observation, the experiments were repeated in reverse order in Group II. Specifically, the first run was conducted using 100% A1 as an activator, and subsequent runs were made with increasing A2/A1 ratios. Both sets of experiments (Examples 1 to 5-Group I and Examples 6 to 10-Group II) were conducted on different days. While the numbers from the two groups of experiments do not exactly match with each other, the trends are consistent and unexpected.

FIG. 1 shows a plot of catalytic efficiency in the presence of various amounts of Activator 1 and Activator 2 for Examples 1-5. As shown in FIG. 1 and Table 1, Activator 1 and Activator 2 afforded similar values for catalyst efficiency under the polymerization conditions specified above. As such, there are no additional costs associated with the catalyst compound when practicing the disclosure herein.

Figure 2A:
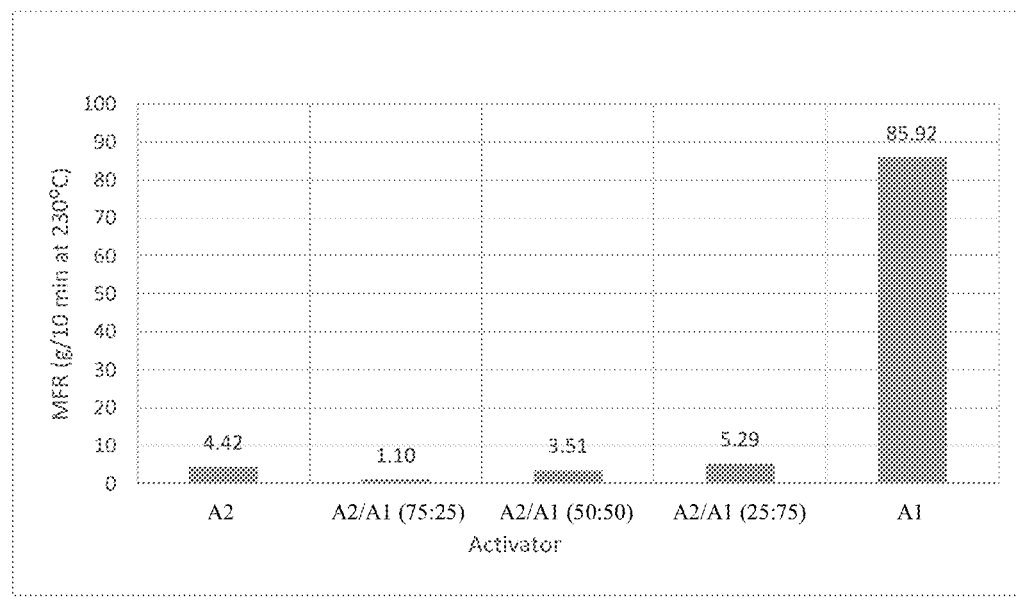
FIG. 2A shows a plot of melt flow rate (MFR) for propylene-ethylene-diene monomer (PEDM) polymers formed in the presence of various quantities of Activator 1 ($[Me_2NH]^+[(F_5Ph)_4B]^-$) and Activator 2 ($[Me_2NH]^+[(F_7Naph)_4B]^-$) for Examples 1 through 5.
Figure 2B:
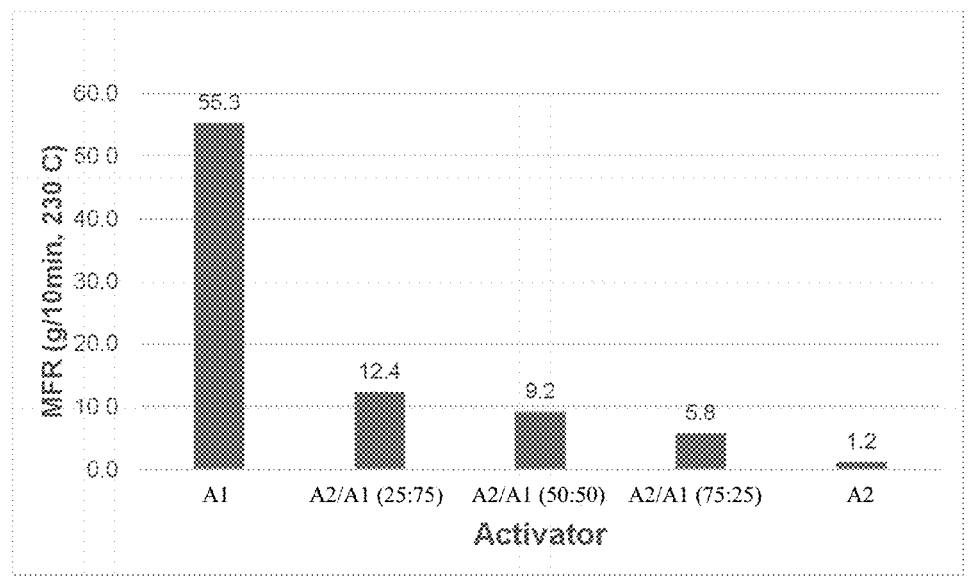
FIG. 2B shows a plot of melt flow rate (MFR) for propylene-ethylene-diene monomer (PEDM) polymers formed in the presence of various quantities of Activator 1 ($[Me_2NH]^+[(F_5Ph)_4B]^-$) and Activator 2 ($[Me_2NH]^+[(F_7Naph)_4B]^-$) for Examples 6 through 10.

FIG. 2A shows a plot of melt flow rate (MFR) for propylene-ethylene-diene monomer (PEDM) polymers formed in the presence of various quantities of Activator 1 and Activator 2 for Examples 1 through 5. FIG. 2B shows a plot of melt flow rate (MFR) for propylene-ethylene-diene monomer (PEDM) polymers formed in the presence of various quantities of Activator 1 and Activator 2 for Examples 6 through 10. In contrast to the catalyst compound, the disclosure herein affords considerable economic benefits associated with the non-coordinating borate activator. As shown in FIGS. 2A and 2B and Table 3, the melt flow rate was considerably above 10 g/10 min (230° C., 2.16 kg) when only Activator 1 was present. The melt flow rate was considerably lower when only Activator 2 was present. One would expect a weighted average linear increase in the MFR upon combining increasing amounts of Activator 2 with Activator 1 and polymerizing, if the two activators were operating independently of one another. In contrast, the MFR dependence is non-linear. This result suggests an unexpected synergistic interaction between Activator 1 and Activator 2.

All documents described herein are incorporated by reference herein for purposes of all jurisdictions where such practice is allowed, including any priority documents and/or testing procedures to the extent they are not inconsistent with this text. As is apparent from the foregoing general description and the specific embodiments, while forms of the disclosure have been illustrated and described, various modifications can be made without departing from the spirit and scope of the disclosure. Accordingly, it is not intended that the disclosure be limited thereby. For example, the compositions described herein may be free of any component, or composition not expressly recited or disclosed herein. Any method may lack any step not recited or disclosed herein. Likewise, the term "comprising" is considered synonymous with the term "including." Whenever a method, composition, element or group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

Unless otherwise indicated, all numbers expressing quantities of ingredients, properties such as molecular weight, reaction conditions, and so forth used in the present specification and associated claims are to be understood as being modified in all instances by the term "about."

Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values.

What is claimed is:

1. A method comprising:
   1) contacting a catalyst system with an olefinic feed comprising a $C_3$-$C_{40}$ alpha olefin, ethylene, and a diene monomer under polymerization reaction conditions where the $C_3$-$C_{40}$ alpha olefin is present in the olefinic feed in a molar excess relative to a combined molar amount of the ethylene and the diene monomer, the catalyst system comprising a first non-coordinating anion activator, a second non-coordinating anion activator differing from the first non-coordinating anion activator, and a transition metal complex represented by the formula:

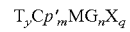

wherein:
   M is a group 3, 4, 5, or 6 transition metal;
   Cp' is an optionally substituted tetrahydro-s-indacenyl or tetrahydro-as-indacenyl group;
   G is a heteroatom containing group having a formula of $JR'_{z-y}$;
   wherein J is N, P, O or S, R' is a $C_1$ to $C_{100}$ optionally substituted hydrocarbyl, halocarbyl, silylcarbyl, or germylcarbyl group, and z is 2 when J is N or P, and z is 1 when J is O or S;
   T is a bridging group and y is 0 or 1 indicating an absence (y=0) or a presence (y=1) of T, wherein when y is 1 Cp' and G are bonded to the bridging group;
   each X is, independently, a leaving group, or two Xs are joined and bound to the metal atom to form a metallocycle ring, or two Xs are joined to form a chelating ligand, a diene ligand, or an alkylidene;
   m=1;
   n=1, 2 or 3;
   q=1, 2 or 3;
   wherein a sum of m+n+q is equal to the oxidation state of M; and
   2) obtaining a copolymer comprising 1 to 35 mol. % ethylene, 98.9 to 65 mol. % $C_3$-$C_{40}$ olefin, and 0.1 to 10 mol. % diene monomer having an MFR of 30 g/10 min or below,
   wherein the first non-coordinating anion activator and the second non-coordinating anion activator interact synergistically under the polymerization reaction conditions such that melt flow rate of the copolymer changes non-linearly as a function of molar ratio of the first non-coordinating anion activator to the second non-coordinating anion activator, when measured under same polymerization conditions, except for having different activator ratios.

2. The method of claim 1, wherein the transition metal complex comprises a tetrahydro-as-indacenyl group represented by the formula:

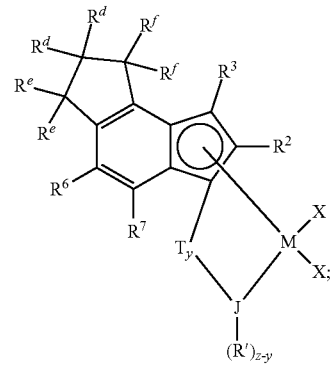

wherein:
M is a group 4 transition metal;
each $R^d$, $R^e$ and $R^f$ is independently hydrogen or a $C_1$-$C_{10}$ alkyl group;

each $R^2$, $R^3$, $R^6$, and $R^7$ is independently hydrogen or a $C_1$-$C_{50}$ optionally substituted hydrocarbyl, halocarbyl, silylcarbyl or germylcarbyl group; and J is N, P, O or S, and z is 2 when J is N or P, and z is 1 when J is O or S, R' is a $C_1$ to $C_{100}$ optionally substituted hydrocarbyl, halocarbyl, silylcarbyl or germylcarbyl group.

3. The method of claim 1, wherein the transition metal complex comprises a tetrahydro-s-indacenyl group represented by the formula:

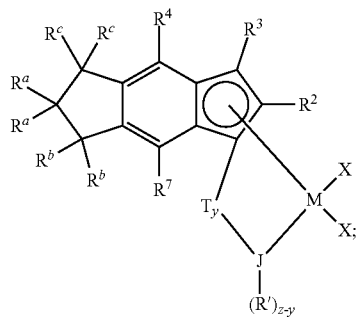

wherein:
M is a group 4 transition metal;
each $R^a$ is independently a $C_1$-$C_{10}$ alkyl group;
each $R^b$ and $R^c$ is independently hydrogen or a $C_1$-$C_{50}$ alkyl group;
each $R^2$, $R^3$, $R^4$ and $R^7$ is independently hydrogen or a $C_1$-$C_{50}$ optionally substituted hydrocarbyl, halocarbyl, silylcarbyl or germylcarbyl group, optionally provided that:
1) $R^3$ and/or $R^4$ are not aryl or substituted aryl,
2) $R^3$ is not directly bonded to a group 15 or 16 heteroatom, and
3) adjacent $R^4$, $R^c$, $R^a$ $R^b$, or $R^7$ do not join together to form a fused ring system; and
J is N, P, O or S, and z is 2 when J is N or P, and z is 1 when J is O or S, R' is a $C_1$ to $C_{100}$ optionally substituted hydrocarbyl, halocarbyl, silylcarbyl or germylcarbyl group.

4. The method of claim 1, wherein the polymerization reaction occurs at 80° C. or more.

5. The method of claim 1, wherein the molar ratio of the first non-coordinating anion activator to the second non-coordinating anion activator ranges from 1:99 to 99:1.

6. The method of claim 3, wherein each $R^a$ is methyl and each $R^b$ and $R^c$ are hydrogen.

7. The method of claim 3, wherein $R^2$ is methyl, ethyl, propyl, butyl, pentyl, hexyl, heptyl, octyl, nonyl, decyl, undecyl, dodecyl or an isomer thereof, and $R^3$, $R^4$ and $R^7$ are all hydrogen.

8. The method of claim 2, wherein each $R^d$ is methyl and each $R^c$ and $R^f$ are hydrogen.

9. The method of claim 2, wherein $R^2$ is methyl, ethyl, propyl, butyl, pentyl, hexyl, heptyl, octyl, nonyl, decyl, undecyl, dodecyl or an isomer thereof, and $R^3$, $R^6$, and $R^7$ are all hydrogen.

10. The method of claim 2, wherein $R^2$ is methyl and y is 1.

11. The method of claim 1, wherein y is 1 and T is $(CR^8R^9)_x$, $SiR^8R^9$, or $GeR^8R^9$;
wherein x is 1 or 2, and $R^8$ and $R^9$ are independently hydrogen or an optionally substituted hydrocarbyl, halocarbyl, silylcarbyl, or germylcarbyl group and $R^8$ and $R^9$ are optionally bonded together to form a ring structure.

12. The method of claim 1, wherein M is Ti.

13. The method of claim 1, wherein J is N.

14. The method of claim 1, wherein R' is methyl, ethyl, propyl, butyl, pentyl, hexyl, heptyl, octyl, nonyl, decyl, undecyl, dodecyl, phenyl or an isomer thereof.

15. The method of claim 1, wherein R' is t-butyl, neopentyl, cyclohexyl, cyclooctyl, cyclododecyl, adamantyl, or norbornyl.

16. The method of claim 1, wherein each X is independently selected from the group consisting of a $C_1$-$C_{20}$ hydrocarbyl group, an aryl group, a hydride, an amide, an alkoxide, a sulfide, a phosphide, and a halide.

17. The method of claim 1, wherein each X is independently selected from the group consisting of a $C_1$-$C_5$ alkyl group, a halide, and an aryl group.

18. The method of claim 1, wherein the transition metal complex is selected from the group consisting of dimethylsilylene(2,6,6-trimethyl-1,5,6,7-tetrahydro-s-indacen-1-yl)(t-butylamido)M(R)$_2$; dimethylsilylene(6,6-dimethyl-1,5,6,7-tetrahydro-s-indacen-1-yl)(t-butylamido)M(R)$_2$; dimethylsilylene(2,7,7-trimethyl-3,6,7,8-tetrahydro-as-indacen-3-yl)(t-butylamido)M(R)$_2$; dimethylsilylene(7,7-dimethyl-3,6,7,8-tetrahydro-as-indacen-3-yl)(t-butylamido)M(R)$_2$; dimethylsilylene(2,6,6-trimethyl-1,5,6,7-tetrahydro-s-indacen-1-yl)(cyclododecylamido)M(R)$_2$; dimethylsilylene(6,6-dimethyl-1,5,6,7-tetrahydro-s-indacen-1-yl)(cyclododecylamido)M(R)$_2$; dimethylsilylene(2,7,7-trimethyl-3,6,7,8-tetrahydro-as-indacen-3-yl)(cyclododecylamido)M(R)$_2$; dimethylsilylene(7,7-dimethyl-3,6,7,8-tetrahydro-as-indacen-3-yl)(cyclododecylamido)M(R)$_2$; dimethylsilylene(2,6,6-trimethyl-1,5,6,7-tetrahydro-s-indacen-1-yl)(cyclohexylamido)M(R)$_2$; dimethylsilylene(6,6-dimethyl-1,5,6,7-tetrahydro-s-indacen-1-yl)(cyclohexylamido)M(R)$_2$; dimethylsilylene(2,7,7-trimethyl-3,6,7,8-tetrahydro-as-indacen-3-yl)(cyclohexylamido)M(R)$_2$; dimethylsilylene(7,7-dimethyl-3,6,7,8-tetrahydro-as-indacen-3-yl)(cyclohexylamido)M(R)$_2$; dimethylsilylene(2,6,6-trimethyl-1,5,6,7-tetrahydro-s-indacen-1-yl)(adamantylamido)M(R)$_2$; dimethylsilylene(6,6-dimethyl-1,5,6,7-tetrahydro-s-indacen-1-yl)(adamantylamido)M(R)$_2$; dimethylsilylene(2,7,7-trimethyl-3,6,7,8-tetrahydro-as-indacen-3-yl)(adamantylamido)M(R)$_2$; dimethylsilylene(7,7-dimethyl-3,6,7,8-tetrahydro-as-indacen-3-yl)(adamantylamido)M(R)$_2$; dimethylsilylene(2,6,6-trimethyl-1,5,6,7-tetrahydro-s-indacen-1-yl)(neopentylamido)M(R)$_2$; dimethylsilylene(6,6-dimethyl-1,5,6,7-tetrahydro-s-indacen-1-yl)(neopentylamido)M(R)$_2$; dimethylsilylene(2,7,7-trimethyl-3,6,7,8-tetrahydro-as-indacen-3-yl)(neopentylamido)M(R)$_2$; dimethylsilylene(7,7-dimethyl-3,6,7,8-tetrahydro-as-indacen-3-yl)(neopentylamido)M(R)$_2$; dimethylsilylene(2-methyl-6,6-diethyl-1,5,6,7-tetrahydro-s-indacen-1-yl)(t-butylamido)M(R)$_2$; dimethylsilylene(6,6-diethyl-1,5,6,7-tetrahydro-s-indacen-1-yl)(t-butylamido)M(R)$_2$; dimethylsilylene(2-methyl-7,7-diethyl-3,6,7,8-tetrahydro-as-indacen-3-yl)(t-butylamido)M(R)$_2$; dimethylsilylene(7,7-diethyl-3,6,7,8-tetrahydro-as-indacen-3-yl)(t-butylamido)M(R)$_2$; dimethylsilylene(2-methyl-6,6-diethyl-1,5,6,7-tetrahydro-s-indacen-1-yl)(cyclododecylamido)M(R)$_2$; dimethylsilylene(6,6-diethyl-1,5,6,7-tetrahydro-s-indacen-1-yl)(cyclododecylamido)M(R)$_2$; dimethylsilylene(2-methyl-7,7-diethyl-3,6,7,8-tetrahydro-as-indacen-3-yl)(cyclododecylamido)M(R)$_2$; dimethylsilylene(7,7-dimethyl-3,6,7,8-tetrahydro-as-indacen-3-yl)(cyclododecylamido)M (R)$_2$; diethylsilylene(2,6,6-trimethyl-1,5,6,7-tetrahydro-s-indacen-1-yl)(t-butylamido)M(R)$_2$; diethylsilylene(6,6-dimethyl-1,5,6,7-tetrahydro-s-indacen-1-yl)(t-butylamido)M(R)$_2$; diethylsilylene(2,7,7-trimethyl-3,6,7,8-tetrahydro-as-indacen-3-yl)(t-butylamido)M(R)$_2$; diethylsilylene(7,7-dimethyl-3,6,7,8-tetrahydro-as-indacen-3-yl)(t-butylamido)M(R)$_2$; dimethylsilylene(2-methyl-3,6,7,8-tetrahydro-as-indacen-3-yl)(cyclohexylamido)M(R)$_2$; dimethylsilylene(2-methyl-3,6,7,8-tetrahydro-as-indacen-3-yl)(cyclododecylamido)M(R)$_2$; dimethylsilylene(2-methyl-3,6,7,8-tetrahydro-as-indacen-3-yl)(adamantylamido)M(R)$_2$; and dimethylsilylene(2-methyl-3,6,7,8-tetrahydro-as-indacen-3-yl)(t-butylamido)M(R)$_2$; wherein M is Ti, Zr or Hf, and R is a halogen or a $C_1$ to $C_{10}$ hydrocarbyl.

19. The method of claim 1, wherein the transition metal complex is dimethylsilylene(2,7,7-trimethyl-3,6,7,8-tetrahydro-as-indacen-3-yl)(t-butylamido)titanium dimethyl or dimethylsilylene(2,6,6-trimethyl-1,5,6,7-tetrahydro-s-indacen-1-yl)(t-butylamido)titanium dimethyl.

20. The method of claim 1, wherein the first non-coordinating anion activator and the second non-coordinating anion activator are selected from the group consisting of: N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, [Me$_3$NH$^+$][B(C$_6$F$_5$)$^{4-}$], 1-(4-(tris(pentafluorophenyl)borate)-2,3,5,6-tetrafluorophenyl) pyrrolidinium; [Me$_3$NH$^+$][B(C$_6$F$_5$)$^{4-}$], 1-(4-(tris(pentafluorophenyl)borate)-2,3,5,6-tetrafluorophenyl) pyrrolidinium, sodium tetrakis(pentafluorophenyl)borate, potassium tetrakis(pentafluorophenyl)borate, and 4-(tris(pentafluorophenyl)borate)-2,3,5,6-tetrafluoropyridinium.

21. The method of claim 1, wherein the first non-coordinating anion activator is N,N-dimethylanilinium tetrakis(pentafluorophenyl)borate and the second non-coordinating anion activator is N,N-dimethylaniliniumtetrakis(perfluoronaphthyl)borate.

22. The method of claim 21, wherein the first non-coordinating anion activator is present in a molar excess with respect to the second non-coordinating anion activator.

23. The method of claim 21, wherein the molar ratio of the first non-coordinating anion activator to the second non-coordinating anion activator ranges from 1:99 to 99:1.

24. The method of claim 21, wherein the molar ratio of the first non-coordinating anion activator to the second non-coordinating anion activator ranges from 1:3 to 3:1.

25. The method of claim 1, wherein the $C_3$-$C_{40}$ alpha olefin is selected from the group consisting of propylene, 1-butene, 1-pentene, 1-hexene, 1-heptene, 1-octene, 1-nonene, 1-decene, 1-undecene, 1-dodecene, and isomers thereof having a terminal carbon-carbon double bond.

26. The method of claim 1, wherein the $C_3$-$C_{20}$ alpha olefin is propylene.

27. The method of claim 1, wherein the diene monomer is selected from the group consisting of 5-ethylidene-2-norbornene, 1,4-hexadiene, 5-methylene-2-norbornene, 1,6-octadiene, 5-methyl-1,4-hexadiene, 3,7-dimethyl-1,6-octadiene, and dicyclopentadiene.

28. The method of claim 1, wherein the diene monomer is 5-ethylidene-2-norbornene.

29. The method of claim 1, wherein the catalyst system has a catalytic efficiency of at least about 25,000 g terpolymer/g transition metal complex.

30. The method of claim 1, wherein the copolymer has an Mn value of about 60,000 g/mol or above, a Mw value of about 150,000 g/mol or above, and/or an Mz value of about 220,000 g/mol or above.

31. The method of claim 1, wherein contacting the olefinic feed with the catalyst system takes place at a temperature of about 80° C. or greater.

32. A catalyst system comprising:
a first non-coordinating anion borate activator;
a second non-coordinating anion borate activator differing from the first non-coordinating anion borate activator; and
a transition metal complex represented by the formula:

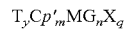

wherein:
M is a group 3, 4, 5, or 6 transition metal;
Cp' is an optionally substituted tetrahydro-s-indacenyl or tetrahydro-as-indacenyl group;
G is a heteroatom containing group having a formula of JR'$_{z-y}$;
wherein J is N, P, O or S, and z is 2 when J is N or P, and z is 1 when J is O or S, and R' is a $C_1$ to $C_{100}$ optionally substituted hydrocarbyl, halocarbyl, silylcarbyl, or germylcarbyl group;
T is a bridging group and y is 0 or 1 indicating an absence (y=0) or presence (y=1) of T, wherein when y is 1 Cp' and G are bonded to the bridging group;
each X is, independently, a leaving group, or two Xs are joined and bound to the metal atom to form a metallocycle ring, or two Xs are joined to form a chelating ligand, a diene ligand, or an alkylidene;
m=1;
n=1, 2 or 3;
q=1, 2 or 3;
wherein a sum of m+n+q is equal to the oxidation state of M; and
wherein the first non-coordinating anion activator and the second non-coordinating anion activator interact synergistically under the polymerization reaction conditions such that melt flow rate for a copolymer, including 1 to 35 mol. % ethylene, 98.9 to 65 mol. % $C_3$-$C_{40}$ olefin, and 0.1 to 10 mol. % diene monomer having an MFR of 30 g/10 min or below, formed under polymerization conditions in a presence of the catalyst system changes non-linearly as a function of molar ratio of the first non-coordinating anion activator to the second non-coordinating anion activator, when measured under same polymerization conditions, except for having different activator ratios.

33. The catalyst system of claim 32, wherein Cp' is a tetrahydro-s-indacenyl group, and wherein:
1) the 3- and/or 4-positions of the tetrahydro-s-indacenyl group are not substituted with an aryl or substituted aryl group,
2) the 3-position of the tetrahydro-s-indacenyl group is not directly bonded to a group 15 or group 16 heteroatom,
3) no additional rings are fused to the tetrahydro-s-indacenyl group,
4) T is not bonded to the 2-position of the tetrahydro-s-indacenyl group, and
5) the 5-, 6-, or 7-position of the tetrahydro-s-indacenyl group is geminally disubstituted.

34. The catalyst system of claim 32, wherein the transition metal complex is represented by the formula:

$$\text{[structure with } R^a, R^b, R^c, R^2, R^3, R^4, R^7, M, X, T_y, J, (R')_{z-y}\text{]}$$

wherein:
M is a group 4 transition metal;
each $R^a$ is independently a $C_1$-$C_{10}$ alkyl group;
each $R^b$ and $R^c$ is independently hydrogen or a $C_1$-$C_{10}$ alkyl group;
each $R^2$, $R^3$, $R^4$ and $R^7$ is independently hydrogen or a $C_1$-$C_{50}$ optionally substituted hydrocarbyl, halocarbyl, silylcarbyl or germylcarbyl group, optionally provided that:
1) $R^3$ and/or $R^4$ are not aryl or substituted aryl,
2) $R^3$ is not directly bonded to a group 15 or 16 heteroatom, and
3) adjacent $R^4$, $R^c$, $R^a$ $R^b$, or $R^7$ do not join together to form a fused ring system; and J is N, P, O or S, and z is 2 when J is N or P, and z is 1 when J is O or S, and
R' is a $C_1$ to $C_{100}$ optionally substituted hydrocarbyl, halocarbyl, silylcarbyl or germylcarbyl group.

35. The catalyst system of claim 34, wherein each $R^a$ is methyl and $R^b$ and $R^c$ are both hydrogen.

36. The catalyst system of claim 34, wherein $R^2$ is methyl, ethyl, propyl, butyl, pentyl, hexyl, heptyl, octyl, nonyl, decyl, undecyl, dodecyl or an isomer thereof, and $R^3$, $R^4$ and $R^7$ are all hydrogen.

37. The catalyst system of claim 32, wherein the transition metal complex is represented by the formula:

$$\text{[structure with } R^d, R^e, R^f, R^2, R^3, R^6, R^7, M, X, T_y, J, (R')_{z-y}\text{]}$$

wherein:
M is a group 4 transition metal;
each $R^d$, $R^e$ and $R^f$ is independently hydrogen or a $C_1$-$C_{10}$ alkyl group;
each $R^2$, $R^3$, $R^6$, and $R^7$ is independently hydrogen or a $C_1$-$C_{50}$ optionally substituted hydrocarbyl, halocarbyl, silylcarbyl or germylcarbyl group;

J is N, P, O or S, and z is 2 when J is N or P, and z is 1 when J is O or S, and
R' is a $C_1$ to $C_{100}$ optionally substituted hydrocarbyl, halocarbyl, silylcarbyl or germylcarbyl group.

38. The catalyst system of claim 37, wherein each $R^d$ is methyl and $R^e$ and $R^f$ are both hydrogen.

39. The catalyst system of claim 37, wherein $R^2$ is methyl, ethyl, propyl, butyl, pentyl, hexyl, heptyl, octyl, nonyl, decyl, undecyl, dodecyl or an isomer thereof, and $R^3$, $R^6$, and $R^7$ are all hydrogen.

40. The catalyst system of claim 34, wherein $R^2$ is methyl.

41. The catalyst system of claim 32, wherein y is 1.

42. The catalyst system of claim 32, wherein y is 1 and T is $(CR^8R^9)_x$, $SiR^8R^9$, or $GeR^8R^9$; wherein x is 1 or 2, and $R^8$ and $R^9$ are independently hydrogen or an optionally substituted hydrocarbyl, halocarbyl, silylcarbyl, or germylcarbyl group, $R^8$ and $R^9$ are optionally bonded together to form a ring structure.

43. The catalyst system of claim 32, wherein M is Ti.

44. The catalyst system of claim 32, wherein J is N.

45. The catalyst system of claim 34, wherein R' is methyl, ethyl, propyl, butyl, pentyl, hexyl, heptyl, octyl, nonyl, decyl, undecyl, dodecyl, phenyl or an isomer thereof.

46. The catalyst system of claim 34, wherein R' is t-butyl, neopentyl, cyclohexyl, cyclooctyl, cyclododecyl, adamantyl, or norbornyl.

47. The catalyst system of claim 32, wherein each X is independently selected from the group consisting of a $C_1$-$C_{20}$ hydrocarbyl group, an aryl group, a hydride, an amide, an alkoxide, a sulfide, a phosphide, a halide, an amine, a phosphine, an ether, and any combination thereof.

48. The catalyst system of claim 32, wherein each X is independently selected from the group consisting of a $C_1$-$C_5$ alkyl group, a halide, and an aryl group.

49. The catalyst system of claim 32, wherein the transition metal complex is selected from the group consisting of dimethylsilylene(2,6,6-trimethyl-1,5,6,7-tetrahydro-s-indacen-1-yl)(t-butylamido)M(R)$_2$; dimethylsilylene(6,6-dimethyl-1,5,6,7-tetrahydro-s-indacen-1-yl)(t-butylamido)M(R)$_2$; dimethylsilylene(2,7,7-trimethyl-3,6,7,8-tetrahydro-as-indacen-3-yl)(t-butylamido)M(R)$_2$; dimethylsilylene(7,7-dimethyl-3,6,7,8-tetrahydro-as-indacen-3-yl)(t-butylamido)M(R)$_2$; dimethylsilylene(2,6,6-trimethyl-1,5,6,7-tetrahydro-s-indacen-1-yl)(cyclododecylamido)M(R)$_2$; dimethylsilylene(6,6-dimethyl-1,5,6,7-tetrahydro-s-indacen-1-yl)(cyclododecylamido)M(R)$_2$; dimethylsilylene(2,7,7-trimethyl-3,6,7,8-tetrahydro-as-indacen-3-yl)(cyclododecylamido)M(R)$_2$; dimethylsilylene(7,7-dimethyl-3,6,7,8-tetrahydro-as-indacen-3-yl)(cyclododecylamido)M(R)$_2$; dimethylsilylene(2,6,6-trimethyl-1,5,6,7-tetrahydro-s-indacen-1-yl)(cyclohexylamido)M(R)$_2$; dimethylsilylene(6,6-dimethyl-1,5,6,7-tetrahydro-s-indacen-1-yl)(cyclohexylamido)M(R)$_2$; dimethylsilylene(2,7,7-trimethyl-3,6,7,8-tetrahydro-as-indacen-3-yl)(cyclohexylamido)M(R)$_2$; dimethylsilylene(7,7-dimethyl-3,6,7,8-tetrahydro-as-indacen-3-yl)(cyclohexylamido)M(R)$_2$; dimethylsilylene(2,6,6-trimethyl-1,5,6,7-tetrahydro-s-indacen-1-yl)(adamantylamido)M(R)$_2$; dimethylsilylene(6,6-dimethyl-1,5,6,7-tetrahydro-s-indacen-1-yl)(adamantylamido)M(R)$_2$; dimethylsilylene(2,7,7-trimethyl-3,6,7,8-tetrahydro-as-indacen-3-yl)(adamantylamido)M(R)$_2$; dimethylsilylene(7,7-dimethyl-3,6,7,8-tetrahydro-as-indacen-3-yl)(adamantylamido)M(R)$_2$; dimethylsilylene(2,6,6-trimethyl-1,5,6,7-tetrahydro-s-indacen-1-yl)(neopentylamido)M(R)$_2$; dimethylsilylene(6,6-dimethyl-1,5,6,7-tetrahydro-s-indacen-1-yl)(neopentylamido)M(R)$_2$; dimethylsilylene(2,7,7-trimethyl-3,6,7,8-tetrahydro-as-indacen-3-yl)(neopentylamido)M(R)₂; dimethylsilylene(7,7-dimethyl-3,6,7,8-tetrahydro-as-indacen-3-yl)(neopentylamido)M(R)₂; dimethylsilylene(2-methyl-6,6-diethyl-1,5,6,7-tetrahydro-s-indacen-1-yl)(t-butylamido)M(R)₂; dimethylsilylene(6,6-diethyl-1,5,6,7-tetrahydro-s-indacen-1-yl)(t-butylamido)M(R)₂; dimethylsilylene(2-methyl-7,7-diethyl-3,6,7,8-tetrahydro-as-indacen-3-yl)(t-butylamido)M(R)₂; dimethylsilylene(7,7-diethyl-3,6,7,8-tetrahydro-as-indacen-3-yl)(t-butylamido)M(R)₂; dimethylsilylene(2-methyl-6,6-diethyl-1,5,6,7-tetrahydro-s-indacen-1-yl)(cyclododecylamido)M(R)₂; dimethylsilylene(6,6-diethyl-1,5,6,7-tetrahydro-s-indacen-1-yl)(cyclododecylamido)M(R)₂; dimethylsilylene(2-methyl-7,7-diethyl-3,6,7,8-tetrahydro-as-indacen-3-yl)(cyclododecylamido)M(R)₂; dimethylsilylene(7,7-dimethyl-3,6,7,8-tetrahydro-as-indacen-3-yl)(cyclododecylamido)M(R)₂; diethylsilylene(2,6,6-trimethyl-1,5,6,7-tetrahydro-s-indacen-1-yl)(t-butylamido)M(R)₂; diethylsilylene(6,6-dimethyl-1,5,6,7-tetrahydro-s-indacen-1-yl)(t-butylamido)M(R)₂; diethylsilylene(2,7,7-trimethyl-3,6,7,8-tetrahydro-as-indacen-3-yl)(t-butylamido)M(R)₂; diethylsilylene(7,7-dimethyl-3,6,7,8-tetrahydro-as-indacen-3-yl)(t-butylamido)M(R)₂; dimethylsilylene(2-methyl-3,6,7,8-tetrahydro-as-indacen-3-yl)(cyclohexylamido)M(R)₂; dimethylsilylene(2-methyl-3,6,7,8-tetrahydro-as-indacen-3-yl)(cyclododecylamido)M(R)₂; dimethylsilylene(2-methyl-3,6,7,8-tetrahydro-as-indacen-3-yl)(adamantylamido)M(R)₂; and dimethylsilylene(2-methyl-3,6,7,8-tetrahydro-as-indacen-3-yl)(t-butylamido)M(R)₂; wherein M is Ti, Zr or Hf, and R is a halogen or a $C_1$ to $C_{10}$ hydrocarbyl.

50. The catalyst system of claim 32, wherein the transition metal complex is dimethylsilylene(2,7,7-trimethyl-3,6,7,8-tetrahydro-as-indacen-3-yl)(t-butylamido)titanium dimethyl or dimethylsilylene(2,6,6-trimethyl-1,5,6,7-tetrahydro-s-indacen-1-yl)(t-butylamido)titanium dimethyl.

51. The catalyst system of claim 32, wherein the first non-coordinating anion borate activator and the second non-coordinating anion borate activator are selected from the group consisting of N,N-dimethylanilinium tetrakis(perfluoronaphthyl)borate, N,N-dimethylanilinium tetrakis(perfluorobiphenyl)borate, N,N-dimethylanilinium tetrakis(perfluorophenyl)borate, N,N-dimethylanilinium tetrakis(3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis(3,5-bis(trifluoromethyl)phenyl)borate, triphenylcarbenium tetrakis(perfluorophenyl)borate, $[Me_3NH^+][B(C_6F_5)^{4-}]$, 1-(4-(tris(pentafluorophenyl)borate)-2,3,5,6-tetrafluorophenyl) pyrrolidinium; $[Me_3NH^+][B(C_6F_5)^{4-}]$, 1-(4-(tris(pentafluorophenyl)borate)-2,3,5,6-tetrafluorophenyl) pyrrolidinium, sodium tetrakis(pentafluorophenyl)borate, potassium tetrakis(pentafluorophenyl)borate, and 4-(tris(pentafluorophenyl)borate)-2,3,5,6-tetrafluoropyridinium.

52. The catalyst system of claim 32, wherein the first non-coordinating anion borate activator is N,N-dimethylanilinium tetrakis(pentafluorophenyl)borate and the second non-coordinating anion borate activator is N,N-dimethylanilinium tetrakis(perfluoronaphthyl)borate.

53. The catalyst system of claim 52, wherein the first non-coordinating borate anion activator is present in a molar excess with respect to the second non-coordinating anion borate activator.

54. The catalyst system of claim 52, wherein the molar ratio of the first non-coordinating borate activator to the second non-coordinating borate activator ranges from 1:99 to 99:1.

55. The catalyst system of claim 52, wherein the molar ratio of the first non-coordinating borate activator to the second non-coordinating borate activator ranges from 1:3 to 3:1.

56. The method of claim 1, wherein the two activators have Calculated Total MV's differing by at least 150 Å³.

57. The method of claim 1, wherein a ratio of Calculated Total MV of the second non-coordinating borate activator to Calculated Total MV of the first non-coordinating borate activator is about 1.2 or greater.

58. The method of claim 1, wherein Calculated Total MV of the first non-coordinating borate activator is 732 Å³ or 810 Å³, and Calculated Total MV of the second non-coordinating borate activator is 966 Å³ or greater.

* * * * *